(12) United States Patent
Alioto et al.

(10) Patent No.: US 11,657,728 B2
(45) Date of Patent: May 23, 2023

(54) PLUGIN SYSTEM AND PATHWAY ARCHITECTURE

(71) Applicant: Pearson Education, Inc., Bloomington, MN (US)

(72) Inventors: Franklin Alioto, San Rafael, CA (US); Jeffrey Argast, Palo Alto, CA (US); Zack Belinson, Malabar (AU); David Copeman, Sydney (AU); Samir Derradji, Sydney (AU); Amanda Newlin, San Francisco, CA (US); David Rowe, Lane Cove (AU); Kristin Sardina, Larkspur, CA (US); Brian Weck, North Manly (AU)

(73) Assignee: PEARSON EDUCATION, INC., Bloomington, MN (US)

( * ) Notice: Subject to any disclaimer, the term of this patent is extended or adjusted under 35 U.S.C. 154(b) by 33 days.

(21) Appl. No.: 17/508,586

(22) Filed: Oct. 22, 2021

(65) Prior Publication Data

US 2022/0130268 A1    Apr. 28, 2022

Related U.S. Application Data

(60) Provisional application No. 63/105,125, filed on Oct. 23, 2020.

(51) Int. Cl.
*G06F 9/44* (2018.01)
*G09B 7/00* (2006.01)
*G06F 9/445* (2018.01)

(52) U.S. Cl.
CPC ........... *G09B 7/00* (2013.01); *G06F 9/44526* (2013.01)

(58) Field of Classification Search
CPC .............................. G09B 7/00; G06F 9/44526
See application file for complete search history.

(56) References Cited

U.S. PATENT DOCUMENTS

| | | | | |
|---|---|---|---|---|
| 5,287,489 | A * | 2/1994 | Nimmo | G09B 19/0053 703/13 |
| 6,170,014 | B1 * | 1/2001 | Darago | H04L 67/06 709/217 |
| 2003/0008266 | A1 * | 1/2003 | LoSasso | G09B 7/02 434/118 |
| 2006/0057551 | A1 * | 3/2006 | Vashi | G09B 7/00 434/350 |

(Continued)

OTHER PUBLICATIONS

Do Prado et al., iPlan: a model of lesson plans to help teaching process in Web learning environment, IEEE 2014.

(Continued)

*Primary Examiner* — David E Choi
(74) *Attorney, Agent, or Firm* — Quarles & Brady LLP

(57) ABSTRACT

Systems and methods of the present invention provide for: storing a plurality of content plugins; generating a graphical user interface (GUI) including components for: selecting a subset of plugins, defining a relationship between the plugins in the subset, and defining a custom pathway through the subset, including rules or conditions for navigation; receiving, from the content creator client device, selection of the subset, the relationship, and the rule or condition; generating, from the subset, relationship, and rule or condition; and transmitting to client devices for display, a learning course content for a learning application.

23 Claims, 36 Drawing Sheets

(56) References Cited

U.S. PATENT DOCUMENTS

| | | |
|---|---|---|
| 2008/0254434 A1 | 10/2008 | Calvert |
| 2013/0166758 A1 | 6/2013 | Kortemeyer et al. |
| 2013/0227675 A1* | 8/2013 | Fujioka .................. G06F 21/62 726/16 |
| 2013/0337429 A1 | 12/2013 | Allen et al. |
| 2014/0335497 A1 | 11/2014 | Gal et al. |
| 2018/0240359 A1* | 8/2018 | Hujsak ................ G06F 16/2455 |
| 2018/0293906 A1* | 10/2018 | Chen ................ H04N 21/47217 |
| 2020/0125418 A1* | 4/2020 | Christudas ............ G06F 9/5077 |
| 2020/0160740 A1 | 5/2020 | Nedivi |
| 2022/0130268 A1* | 4/2022 | Alioto ................ G06F 9/44526 |

OTHER PUBLICATIONS

International Search Report and Written Opinion, International Application No. PCT/US2021/056266, dated Feb. 25, 2022.

* cited by examiner

PROCEDURE FOR Balancing Chemical Equations

STEP 5

Check to make certain the equation is balanced by summing the total number of each type of atom on both sides of the equation.

EXAMPLE 7.1 DSFSDF
Write a balanced equation for the reaction between solid cobalt(III) and solid carbon that produces solid cobalt and carbon dioxide gas.

$$2 Co_2O_3(s) + 3C_2(s) \rightarrow 4 Co(s) + 3CO_2(g)$$

| Left | Right |
|---|---|
| 4 Co atoms | 4 Co atoms |
| 6 o atoms | 6 o atoms |
| 3 C atoms | 3 C atoms |

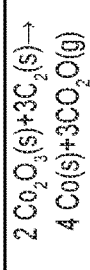 The equation is balanced.

FOR PRACTICE 7.1 | Write a balanced equation for the reaction between solid silicon dioxide and solid carbon that produces solid silicon carbide (SiC) and

EXAMPLE 7.2
Write a balanced equation for the reaction between solid cobalt(III) and solid carbon in produces solid cobalt and carbon dioxide gas.

$$2 C_4H_{10}(g) + 13O_2(g) \rightarrow 8 CO_2(g) + 10H_2O(g)$$

| Left | Right |
|---|---|
| 8 C atoms | 8 C atoms |
| 20 H atoms | 20 H atoms |
| 26 O atoms | 26 O atoms |

 The equation is balanced.

FOR PRACTICE 7.1 | Write a balanced equation for the combustion of gaseous ethane ($C_2H_6$), a minority component of natural gas, in which it combines with

FIG. 34

PLUGIN SYSTEM AND PATHWAY ARCHITECTURE

CROSS-REFERENCE TO RELATED APPLICATION

This application claims the benefit of priority from provisional application No. 63/105,125, filed under the same title on Oct. 23, 2020, the entire contents of which is incorporated herein by reference.

TECHNICAL FIELD

This disclosure relates to the field of systems and methods configured to create an educational content using a plugin system, and to generate, in real time, a pathway architecture to maximize learning potential.

SUMMARY

The disclosed technology relates to systems and methods including one or more server hardware computing devices or client hardware computing devices, communicatively coupled to a network, and each including at least one processor executing specific computer-executable instructions within a memory that, when executed, cause the system to: store a plurality of content plugins; generate a graphical user interface (GUI) including components for: selecting a subset of plugins, defining a relationship between the plugins in the subset, and defining a custom pathway through the subset, including rules or conditions for navigation; receive, from the content creator client device, selection of the subset, the relationship, and the rule or condition; and generate from the subset, relationship, and rule or condition, and transmit to client devices for display, a learning course content for a learning application.

In one aspect, a computing system for managing learning content is disclosed. The system comprises a database configured to store: a set of screen plugins, and a server comprising a computing device coupled to a communication network and comprising at least one processor executing instructions within a memory which, when executed, cause the system to: generate, for display on a client device, a graphical user interface (GUI) comprising a content editor for defining courseware, where the courseware includes a first lesson; receive, via the communication network, user input comprising: a pathway type selection, via the GUI, selecting a pathway type for the first lesson, the pathway type defining permissible pathway connections between at least two screen plugins of the first lesson; a selection of screen plugins, from the set of screen plugins, indicating a subset of screen plugins to be added to the first lesson, each screen plugin of the subset of screen plugins including at least one screen; content definition, via the GUI, defining content on each screen of the subset of screen plugins; pathway connection information, via the GUI, defining one or more pathway connections between the screens corresponding to the subset of screen plugins in accordance with the pathway type; and condition definition information, via the GUI, defining at least one condition for navigating the one or more pathway connections between the screens corresponding to the subset of screen plugins; generate, from the pathway type selection, the selection of screen plugins, the content definition, the pathway connection information, and the condition definition information, a learning course content for a learning application; and transmit, via the communication network, the learning course content to the client device.

In another aspect, a method for managing learning content is disclosed, the method including: generating, for display on a client device, a graphical user interface (GUI) comprising a content editor for defining courseware, where the courseware includes a first lesson; receiving, via a communication network, user input comprising: a pathway type selection, via the GUI, selecting a pathway type for the first lesson, the pathway type defining permissible pathway connections between at least two screen plugins of the first lesson; a selection of screen plugins, from a set of screen plugins, indicating a subset of screen plugins to be added to the first lesson, each screen plugin of the subset of screen plugins including at least one screen; content definition, via the GUI, defining content on each screen of the subset of screen plugins; pathway connection information, via the GUI, defining one or more pathway connections between the screens corresponding to the subset of screen plugins in accordance with the pathway type; and condition definition information, via the GUI, defining at least one condition for navigating the one or more pathway connections between the screens corresponding to the subset of screen plugins; generating, from the pathway type selection, the selection of screen plugins, the content definition, the pathway connection information, and the condition definition information, a learning course content for a learning application; and transmitting, via the communication network, the learning course content to the client device.

In another aspect, a computing system for managing learning content is disclosed, the system comprising: a database configured to store: a set of screens, and a server comprising a computing device coupled to a communication network and comprising at least one processor executing instructions within a memory which, when executed, cause the system to: generate, for display on a client device, a graphical user interface (GUI) comprising a content editor for defining courseware including a first lesson; receive, via the communication network, user input comprising: a stitched screen request, via the GUI, for the first lesson; a selection of screens, via the GUI, that indicates the set of screens to be included as part of the first lesson; content definition, via the GUI, defining content on each screen of the set of screens; pathway connection information, via the GUI, defining pathway connections between the screens of the set of screens; and condition definition information, via the GUI, defining at least one condition for navigating between the set of screens along the pathway connections; configure, in response to the stitched screen request, the set of screens of the first lesson in a stitched screen configuration, wherein, in the stitched screen configuration, the screens are configured to be stitched and scrolled through in a continuous manner in accordance with the pathway connections between the screens and the at least one condition for navigating between the screens; generate, from the selection of screens, the content definition, the pathway connection information, the condition definition information, and the stitched screen configuration, a learning course content for a learning application; and transmit, via the communication network, the learning course content to the client device.

In another aspect, a method for managing learning content is disclosed, the method including: generating, for display on a client device, a graphical user interface (GUI) comprising a content editor for defining courseware including a first lesson; and receiving, via a communication network, user input, wherein the user input includes: a stitched screen request for the first lesson, a selection of screens that indicates a set of screens to be included as part of the first lesson, content definition defining content on each screen of the set of screens, pathway connection information defining pathway connections between the screens of the set of screens, and condition definition information defining at least one condition for navigating between the set of screens along the pathway connections. The method further includes: configuring, in response to the stitched screen request, the set of screens of the first lesson in a stitched screen configuration, wherein, in the stitched screen configuration, the screens are configured to be stitched and scrolled through in a continuous manner in accordance with the pathway connections between the screens and the at least one condition for navigating between the screens; generating, from the selection of screens, the content definition, the pathway connection information, the condition definition information, and the stitched screen configuration, a learning course content for a learning application; and transmitting, via the communication network, the learning course content to the client device.

In another aspect, a computing system for managing learning content is disclosed, the system comprising: a server comprising a computing device coupled to a communication network and comprising at least one processor executing instructions within a memory which, when executed, cause the system to: generate, for display on a client device, a graphical user interface (GUI) for providing a courseware including a first lesson; receive, via the GUI, a lesson request identifying the first lesson, the first lesson comprising: screens in a stitched screen configuration, each screen including content, the stitched screen configuration comprising: at least one pathway connection defined between at least two of the screens in the stitched screen configuration, and at least one condition predefined for navigating between the at least two screens along the at least one pathway connection; cause display, on the GUI, of a first screen of the screens of the first lesson; receive, via the GUI, user input with respect to content on the first screen in the stitched screen configuration; determine a second screen of the first lesson based on the user input according to: a first pathway connection between the first screen and the second screen, and the at least one condition; and cause display, on the GUI, of the second screen stitched to the first screen in response to a scroll request.

In another aspect, a method for managing learning content is disclosed, the method including: generating, for display on a client device, a graphical user interface (GUI) for providing a courseware including a first lesson; and receiving, via the GUI, a lesson request identifying the first lesson, the first lesson comprising: screens in a stitched screen configuration, each screen including content, the stitched screen configuration comprising: at least one pathway connection defined between at least two of the screens in the stitched screen configuration, and at least one condition predefined for navigating between the at least two screens along the at least one pathway connection. The method further includes: causing display, on the GUI, of a first screen of the screens of the first lesson; receiving, via the GUI, user input with respect to content on the first screen in the stitched screen configuration; and determining a second screen of the first lesson based on the user input according to: a first pathway connection between the first screen and the second screen, and the at least one condition. The method further includes causing display, on the GUI, of the second screen stitched to the first screen in response to a scroll request.

In another aspect, a computing system for managing learning content is disclosed, the system comprising: a database configured to store: a set of screens, and a server comprising a computing device coupled to a communication network and comprising at least one processor executing instructions within a memory which, when executed, cause the system to: generate, for display on a client device, a graphical user interface (GUI) comprising a content editor for defining courseware including a first lesson, the first lesson comprising a first screen of the set of screens; receive, via the communication network, user input comprising scenario definition information related to the first screen, the scenario definition information defining at least one condition to for the first screen, and at least one action corresponding to the at least one condition; generate, based on the scenario definition information, at least one scenario for the first screen of the first lesson; and apply the at least one scenario to the first screen of the first lesson.

In another aspect, a method for managing learning content is disclosed, the method including: generating, for display on a client device, a graphical user interface (GUI) comprising a content editor for defining courseware including a first lesson, the first lesson comprising a first screen of a set of screens; and receiving, via the communication network, user input comprising scenario definition information related to the first screen, the scenario definition information defining at least one condition to for the first screen, and at least one action corresponding to the at least one condition. The method further includes: generating, based on the scenario definition information, at least one scenario for the first screen of the first lesson; and applying the at least one scenario to the first screen of the first lesson.

The above features and advantages of the present invention will be better understood from the following detailed description taken in conjunction with the accompanying drawings.

BRIEF DESCRIPTION OF THE DRAWINGS

FIG. 25 is a schematic diagram conceptually illustrating an example GUI screen for defining conditions for an example scenario, in accordance with various aspects of the techniques described in this disclosure.

FIG. 26 is a schematic diagram conceptually illustrating an example GUI screen for defining conditions for the example scenario, in accordance with various aspects of the techniques described in this disclosure.

FIG. 28 is a schematic diagram conceptually illustrating an example GUI screen for defining actions for the example scenario, in accordance with various aspects of the techniques described in this disclosure.

FIG. 34 is a schematic diagram conceptually illustrating an example GUI screen of lesson content in an example procedure screen context predefined via the example GUI of any one or more of FIGS. 6-20, 24-31, 35, and/or 36, in accordance with various aspects of the techniques described in this disclosure.

DETAILED DESCRIPTION

Figure 1:
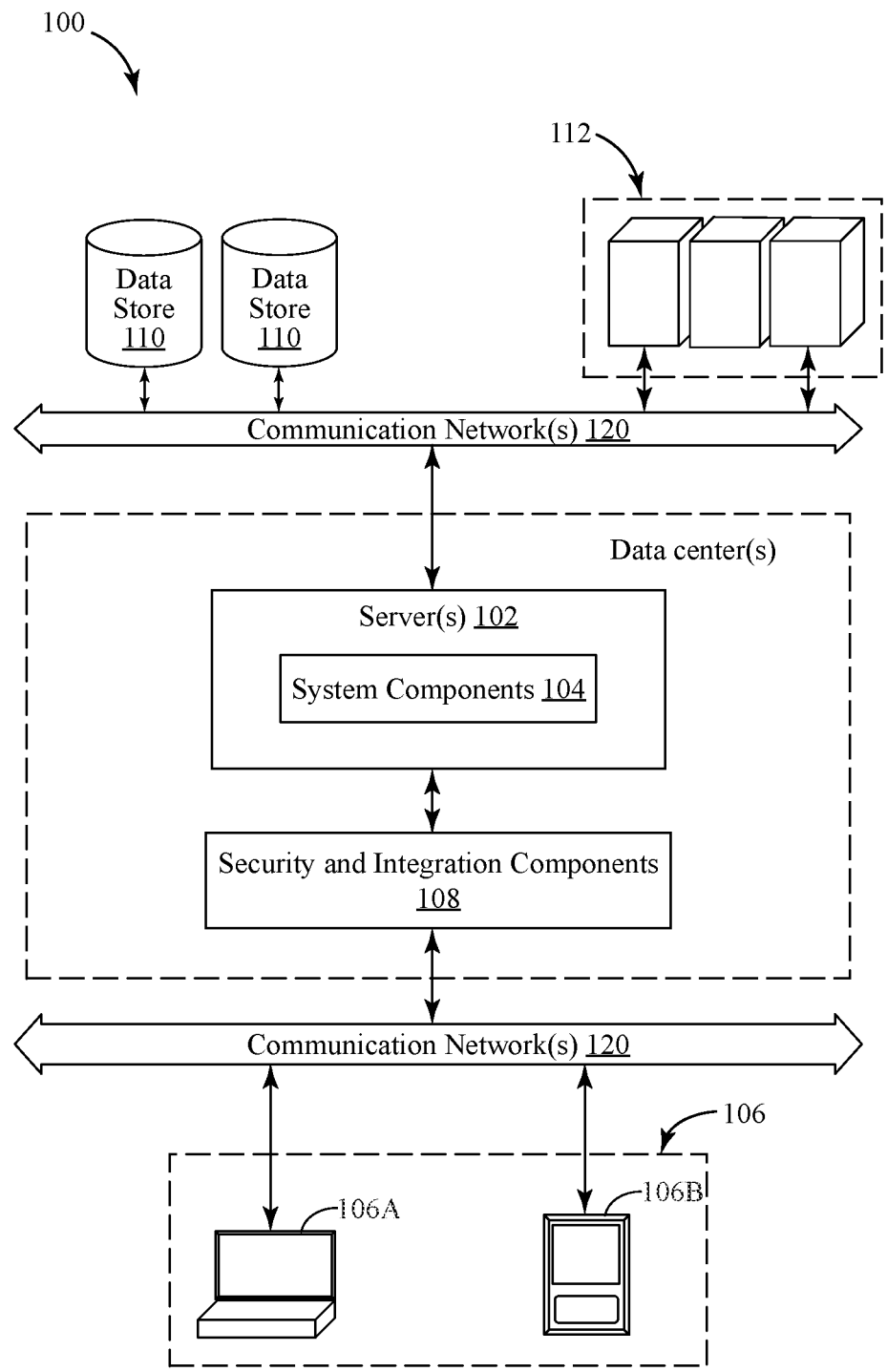
FIG. 1 illustrates a system level block diagram for providing the disclosed plugin system and pathway architecture.

The disclosed technology will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

In online learning environments in which a user (e.g., a learner user, a content creator, etc.) is presented with learning information, the content presented to the user may be limited. In such examples, a system administrator, for example, may be unable to change what a learner user sees. If such content is customizable at all, it is often limited to a single method of personalizing content. As such, certain types of systems may be unable to respond to the learner user, or otherwise display personalized content, responsive to user interactivity, that is unique to that learner user.

The disclosed system includes a content management system (e.g., a learning management system), including standard e-text, that uses back-end and in some examples, machine learning (ML) algorithms, based on stored feature data and data from other research, that are able to customize the experience for the learner, so that the content management system is able to provide customized content for a user (e.g., a learner user, a content creator, etc.).

In some examples, a content creator (e.g., an administrator user, an instructor, executive, etc.) may utilize various plugins or other components in accordance with one or more of the various techniques disclosed herein to design customized content for a learner user. In this way, the administrator user may be able to determine the most effective way to teach learning objectives to a specific learner. To accomplish this, the algorithms described herein may be configured to adapt to multiple situations (e.g., not use static content and a single static method) and adapt to user data corresponding to specific users (e.g., user data of a first learner user, user data of a second learner user, etc.). In some examples, the algorithms described herein may be configured to adapt to a different range of situations and scenarios, based on specific user data input.

FIG. 1 illustrates a non-limiting example of a distributed computing environment 100. In some examples, the distributed computing environment 100 may include one or more server(s) 102 (e.g., data servers, computing devices, computers, etc.), one or more client computing devices 106, and other components that may implement certain embodiments and features described herein. Other devices, such as specialized sensor devices, etc., may interact with the client computing device(s) 106 and/or the server(s) 102. The server(s) 102, client computing device(s) 106, or any other devices may be configured to implement a client-server model or any other distributed computing architecture. In an illustrative and non-limiting example, the client devices 106 may include a first client device 106A and a second client device 106B. The first client device 106A may correspond to a first learner user in a class and the second client device 106B may correspond to a second learner user in the class or another class.

In some examples, the server(s) 102, the client computing device(s) 106, and any other disclosed devices may be communicatively coupled via one or more communication network(s) 120. The communication network(s) 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as, e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The embodiments shown in FIGS. 1 and/or 2 are one example of a distributed computing system and are not intended to be limiting. The subsystems and components within the server(s) 102 and the client computing device(s) 106 may be implemented in hardware, firmware, software, or combinations thereof. Various different subsystems and/or components 104 may be implemented on server 102. Users operating the client computing device(s) 106 may initiate one or more client applications to use services provided by these subsystems and components. Various different system configurations are possible in different distributed computing environments 100 and content distribution networks. Server 102 may be configured to run one or more server software applications or services, for example, web-based or cloud-based services, to support content distribution and interaction with client computing device(s) 106. Users operating client computing device(s) 106 may in turn utilize one or more client applications (e.g., virtual client applications) to interact with server 102 to utilize the services provided by these components. The client computing device(s) 106 may be configured to receive and execute client applications over the communication network(s) 120. Such client applications may be web browser-based applications and/or standalone software applications, such as mobile device applications. The client computing device(s) 106 may receive client applications from server 102 or from other application providers (e.g., public or private application stores).

As shown in FIG. 1, various security and integration components 108 may be used to manage communications over the communication network(s) 120 (e.g., a file-based integration scheme, a service-based integration scheme, etc.). In some examples, the security and integration components 108 may implement various security features for data transmission and storage, such as authenticating users or restricting access to unknown or unauthorized users. As non-limiting examples, the security and integration components 108 may include dedicated hardware, specialized networking components, and/or software (e.g., web servers, authentication servers, firewalls, routers, gateways, load balancers, etc.) within one or more data centers in one or more physical location(s) and/or operated by one or more entities, and/or may be operated within a cloud infrastructure. In various implementations, the security and integration components 108 may transmit data between the various devices in the distribution computing environment 100 (e.g., in a content distribution system or network). In some examples, the security and integration components 108 may use secure data transmission protocols and/or encryption (e.g., File Transfer Protocol (FTP), Secure File Transfer Protocol (SFTP), and/or Pretty Good Privacy (PGP) encryption) for data transfers, etc.).

In some examples, the security and integration components 108 may implement one or more web services (e.g., cross-domain and/or cross-platform web services) within the distribution computing environment 100, and may be developed for enterprise use in accordance with various web service standards (e.g., the Web Service Interoperability (WS-I) guidelines). In an example, some web services may provide secure connections, authentication, and/or confidentiality throughout the network using technologies such as SSL, TLS, HTTP, HTTPS, WS-Security standard (providing secure SOAP messages using XML, encryption), etc. In some examples, the security and integration components 108 may include specialized hardware, network appliances, and the like (e.g., hardware-accelerated SSL and HTTPS), possibly installed and configured between one or more server(s) 102 and other network components. In such examples, the security and integration components 108 may thus provide secure web services, thereby allowing any external devices to communicate directly with the specialized hardware, network appliances, etc.

A distribution computing environment 100 may further include one or more data stores 110. In some examples, the one or more data stores 110 may include, and/or reside on, one or more back-end servers 112, operating in one or more data center(s) in one or more physical locations. In such examples, the one or more data stores 110 may communicate data between one or more devices, such as those connected via the one or more communication network(s) 120. In some cases, the one or more data stores 110 may reside on a non-transitory storage medium within one or more server(s) 102. In some examples, data stores 110 and back-end servers 112 may reside in a storage-area network (SAN). In addition, access to one or more data stores 110, in some examples, may be limited and/or denied based on the processes, user credentials, and/or devices attempting to interact with the one or more data stores 110.

Figure 2:
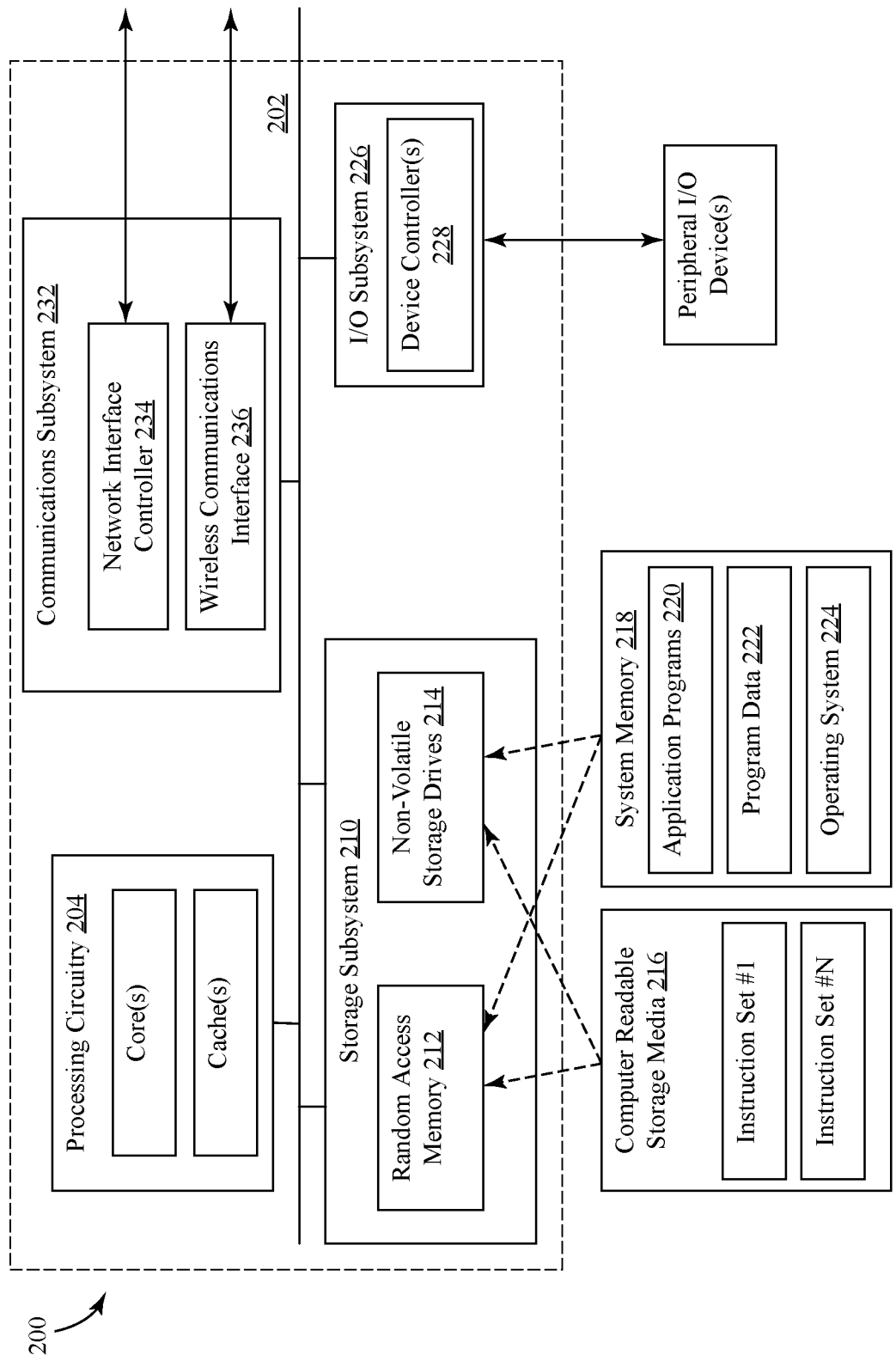
FIG. 2 illustrates a system level block diagram for providing the disclosed plugin system and pathway architecture, in accordance with various aspects of the techniques described in this disclosure.

With reference now to FIG. 2, a block diagram of an example computing system 200 is shown. The computing system 200 (e.g., one or more computers) may correspond to any one or more of the computing devices or servers of the distribution computing environment 100, or any other computing devices described herein. In an example, the computing system 200 may represent an example of one or more server(s) 102 and/or of one or more server(s) 112 of the distribution computing environment 100. In another example, the computing system 200 may represent an example of the client computing device(s) 106 of the distribution computing environment 100. In some examples, the computing system 200 may represent a combination of one or more computing devices and/or servers of the distribution computing environment 100.

In some examples, the computing system 200 may include processing circuitry 204, such as one or more processing unit(s), processor(s), etc. In some examples, the processing circuitry 204 may communicate (e.g., interface) with a number of peripheral subsystems via a bus subsystem 202. These peripheral subsystems may include, for example, a storage subsystem 210, an input/output (I/O) subsystem 226, and a communications subsystem 232.

In some examples, the processing circuitry 204 may be implemented as one or more integrated circuits (e.g., a conventional micro-processor or microcontroller). In an example, the processing circuitry 204 may control the operation of the computing system 200. The processing circuitry 204 may include single core and/or multicore (e.g., quad core, hexa-core, octo-core, ten-core, etc.) processors and processor caches. The processing circuitry 204 may execute a variety of resident software processes embodied in program code, and may maintain multiple concurrently executing programs or processes. In some examples, the processing circuitry 204 may include one or more specialized processors, (e.g., digital signal processors (DSPs), outboard, graphics application-specific, and/or other processors).

In some examples, the bus subsystem 202 provides a mechanism for intended communication between the various components and subsystems of computing system 200. Although the bus subsystem 202 is shown schematically as a single bus, alternative embodiments of the bus subsystem may utilize multiple buses. In some examples, the bus subsystem 202 may include a memory bus, memory controller, peripheral bus, and/or local bus using any of a variety of bus architectures (e.g., Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

In some examples, the I/O subsystem 226 may include one or more device controller(s) 228 for one or more user interface input devices and/or user interface output devices, possibly integrated with the computing system 200 (e.g., integrated audio/video systems, and/or touchscreen displays), or may be separate peripheral devices which are attachable/detachable from the computing system 200. Input may include keyboard or mouse input, audio input (e.g., spoken commands), motion sensing, gesture recognition (e.g., eye gestures), etc. As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like. In general, use of the term "output device" is intended to include all possible types of devices and mechanisms for outputting information from computing system 200, such as to a user (e.g., via a display device) or any other computing system, such as a second computing system 200. In an example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or may include one or more non-visual display subsystems and/or non-visual display devices, such as audio output devices, etc. As non-limiting examples, output devices may include, indicator lights, monitors, printers, speakers, headphones, automotive navigation systems, plotters, voice output devices, modems, etc.

In some examples, the computing system 200 may include one or more storage subsystems 210, including hardware and software components used for storing data and program instructions, such as system memory 218 and computer-readable storage media 216. In some examples, the system memory 218 and/or the computer-readable storage media 216 may store and/or include program instructions that are loadable and executable on the processor(s) 204. In an example, the system memory 218 may load and/or execute an operating system 224, program data 222, server applications, application program(s) 220 (e.g., client applications), Internet browsers, mid-tier applications, etc. In some examples, the system memory 218 may further store data generated during execution of these instructions.

In some examples, the system memory 218 may be stored in volatile memory (e.g., random-access memory (RAM) 212, including static random-access memory (SRAM) or dynamic random-access memory (DRAM)). In an example, the RAM 212 may contain data and/or program modules that are immediately accessible to and/or operated and executed by the processing circuitry 204. In some examples, the system memory 218 may also be stored in non-volatile storage drives 214 (e.g., read-only memory (ROM), flash memory, etc.). In an example, a basic input/output system (BIOS), containing the basic routines that help to transfer information between elements within the computing system 200 (e.g., during start-up), may typically be stored in the non-volatile storage drives 214.

In some examples, the storage subsystem 210 may include one or more tangible computer-readable storage media 216 for storing the basic programming and data constructs that provide the functionality of some embodiments. In an example, the storage subsystem 210 may include software, programs, code modules, instructions, etc., that may be executed by the processing circuitry 204, in order to provide the functionality described herein. In some examples, data generated from the executed software, programs, code, modules, or instructions may be stored within a data storage repository within the storage subsystem 210. In some examples, the storage subsystem 210 may also include a computer-readable storage media reader connected to the computer-readable storage media 216.

In some examples, the computer-readable storage media 216 may contain program code, or portions of program code. Together and, optionally, in combination with the system memory 218, the computer-readable storage media 216 may comprehensively represent remote, local, fixed, and/or removable storage devices plus storage media for temporarily and/or more permanently containing, storing, transmitting, and/or retrieving computer-readable information. In some examples, the computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by the computing system 200. In an illustrative and non-limiting example, the computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media.

In some examples, the computer-readable storage media 216 may include, but is not limited to, Zip® drives, flash memory cards, universal serial bus (USB) flash drives, secure digital (SD) cards, DVD disks, digital video tape, and the like. In some examples, the computer-readable storage media 216 may include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto-resistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for the computing system 200.

In some examples, the communications subsystem 232 may provide a communication interface from the computing system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally, and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 232 also may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

In some examples, the communications subsystem 232 may also receive input communication in the form of structured and/or unstructured data feeds, event streams, event updates, and the like, on behalf of one or more users who may use or access the computing system 200. In an example, the communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, the communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). In some examples, the communications subsystem 232 may output such structured and/or unstructured data feeds, event streams, event updates, and the like to one or more data stores that may be in communication with one or more streaming data source computing systems (e.g., one or more data source computers, etc.) coupled to the computing system 200. The various physical components of the communications subsystem 232 may be detachable components coupled to the computing system 200 via a computer network (e.g., a communication network 120), a FireWire® bus, or the like, and/or may be physically integrated onto a motherboard of the computing system 200. In some examples, the communications subsystem 232 may be implemented in whole or in part by software.

Due to the ever-changing nature of computers and networks, the description of the computing system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Content Management System

Figure 3:
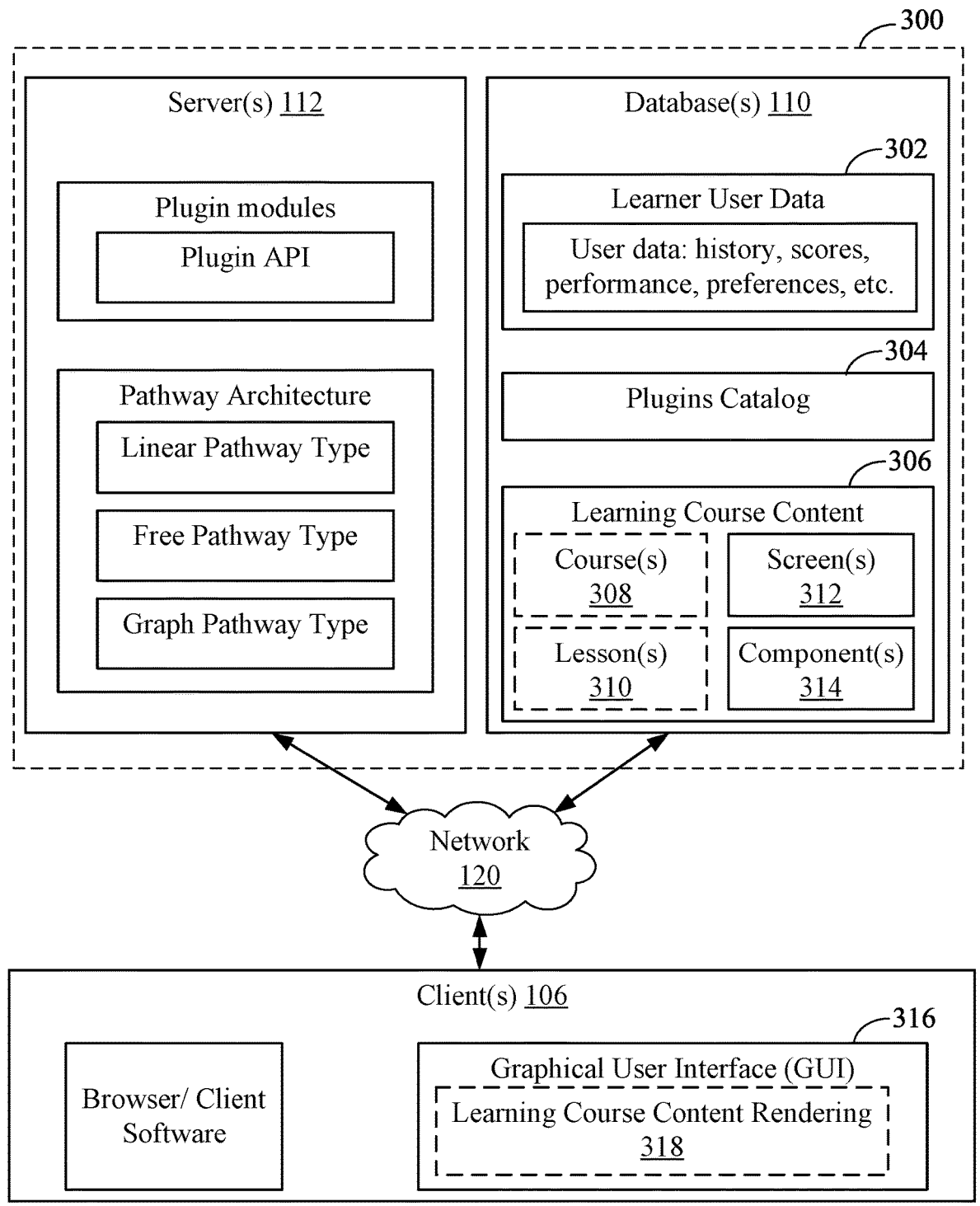
FIG. 3 illustrates a system level block diagram of a content management system that facilitates the disclosed plugin system and pathway architecture, in accordance with various aspects of the techniques described in this disclosure.

FIG. 3 illustrates a system level block diagram of a content management system 300, such as a learning management system for providing the disclosed plugin system (e.g., plugin modules) and pathway architecture according to some examples. In some examples, the content management system 300 includes a learning management system for online learning content. In an example, the content management system 300 allows content creators (e.g., system administrators, course content creators, instructor users, an instructor of a learning course, authors, etc.) to determine the best way to teach learner users (e.g., students) using multiple methods customized to the learner users. In some examples, in addition to utilizing a single static adaptive method, the content management system 300 may incorporate one or more additional adaptive methods that include a range of additional and different components configured to customize the experience for the learner user. One such adaptive method may include a pathway architecture, based on a design created by one or more content creators.

In some examples, the content management system 300 may include one or more database(s) 110, also referred to as data stores herein. The database(s) 110 may include a plurality of user data 302 (e.g., a set of learner user data items). In such examples, the content management system 300 may store and/or manage the user data in accordance with one or more of the various techniques of the disclosure. In some examples, the user data may include user responses, user history, user scores, user performance, user preferences, and the like.

In some examples, the content management system 300 may utilize the user data to make decisions (e.g., as part of a decision tree algorithm), and in some examples, the content management system 300 may customize the learning experience of a particular user (e.g., a learner user). In an illustrative example, the content management system 300 may utilize the user data to make decisions and/or customize a learning experience of a learner user based on user data stored in the database 110 that corresponds to that learner user. In some examples, the user data may be received by one or more users, for example, using a client computing device 106 operated by one or more learner users or content creators.

In some examples, the content management system 300 may store and/or manage the user data 302 in such a way that the user data may be utilized as graph data in the construction of a graph. In some examples, a content creator may utilize the graph to design and construct pathways within the content, including associated concepts. The construction of the graph may include multiple instances of these pathways and pathway concepts, described in more detail below.

In addition, the database(s) 110 may include learning course content 306. The learning course content 306 may include an arrangement and layering of course(s) 308 (optional), lesson(s) 310 (optional), screen(s) 312, and/or component(s) 314 (e.g., content for a screen), in various examples.

Content Editor

In some examples, the content management system 300 may include a content editor. The content editor may provide selectable and configurable options for a content creator to manipulate in order to create and/or edit various content (e.g., learning content). In some examples, a content creator may edit the content using the system components described herein.

In an illustrative and non-limiting example, a content creator may create and edit content using a content editor, such as a WYSIWYG (What You See Is What You Get) editor, to create content for the courses, screens, plugins, conditions, applications and other system components described herein. In some examples, the courses, screens, plugins, conditions, applications and/or other system components may include 3D elements, described below. In such examples, a content creator may utilize the content editor to create and edit the content, which may include utilizing the content editor to construct or edit the 3D elements.

In some examples, plugins or widgets, described in more detail below, are used to create the learning course content 306 for a learning application. In an example, the learning application (e.g., a software application) product created (e.g., generated) from the plugins or widgets may include a dashboard or course home. The content creator (e.g., a course content creator) may utilize the software application to lay out the course(s) 308, lesson(s) 310, screen(s) 312, component(s) 314, etc.

In some examples, the content management system 300 may include and generate a pop-up plugin for in-lesson reference material. In some examples, the in-lesson reference material may be authored. In another example, the in-lesson reference material may include a dynamic content recommendation. As a non-limiting example, the content management system 300 may include software logic that, when executed, allows the content management system 300 to determine characteristics or attributes of selected components, analyze the selected components, and generate recommended components to a content creator.

In the disclosed embodiments, in addition to a WYSIWYG editor, the content management system 300 may include a courseware architecture. In an example, the courseware architecture may allow a content creator (e.g., a course content creator) to create any configuration of courses, units, assessments, lessons, or other courseware elements that content creators (e.g., learning designers) might need. In some examples, this courseware architecture may include a flexible architecture. In such examples, plugin developers may utilize the flexible courseware architecture to create a set of plugins or other components for effectively any configuration of courses, units, assessments, lessons, etc.

In some examples, the content management system 300 may organize the courseware elements (e.g., courses, units, assessments, lessons, etc.) in a hierarchy. In an example, the hierarchy may include structured data for creating one or more element(s) of the courseware architecture. In an example, a top level of the courseware architecture may include courses, units, and lessons. In some examples, these higher-level concepts may be driven by more complex lower-level elements, including activities, pathways, interactives, and components, each of which are described below, for example, with reference to Activity, Pathway, Interactive, and Component (APIC) structures.

In some examples, 'courses' may include one or more high-level collection(s) of 'units.' In some examples, described in more detail below, the content management system 300 may generate a suggested order of units that learner users should follow. In some examples, the content management system 300 may present the suggested order of units to a content creator.

In some examples, 'units,' also referred to as modules, may include a grouping of 'lessons' and/or 'assessments.' As with 'courses' above, the content management system 300 may generate a suggested or recommended order of lessons and assessments. In some examples, the content management system 300 may present the recommended order of lessons and assessments to a content creator.

In addition, 'lessons' may each include a set of screens designed in a specific way in order to teach a learner user one or more objectives. In an example, a 'lesson' may include a set of screens designed with targeted feedback in order to teach the learner user the one or more objectives. In some examples, the feedback may include adaptive feedback responsive to one or more interaction(s) of a learner user. 'Assessments' may include a set of screens designed in a specific way to assess the learner user's ability to meet one or more learning objectives. In some examples, these 'assessments' may include any combination of question types (e.g., true/false, multiple choice, essay, etc.). In addition, it is often the case that a 'lesson' may also be performing 'assessment' operations at the same time, and vice-versa. As such, the lines between 'lessons' and 'assessments' are often blurred. With this in mind, in some examples, 'lessons' and 'assessments' may include quiz features and/or functionality allowing learner users to navigate a set of questions in any combination of orders.

Screens Overview

Screens may include a single page (e.g., a webpage) or page section with a layout of text, video, images, and/or other components. Screens may further include adaptive feedback to respond to one or more interaction(s) of a learner user.

The disclosed embodiments may include multiple variations of different screen layouts. As non-limiting examples, these screens may include three-dimensional (3D) screens and/or stitched screens.

In some examples, 3D screens may include screens that allow a user to view a graphic, image, video, etc. from any angle. In an example, the user may scroll through any combination of any such angles to view the graphic, image, video, etc. from any angle.

Stitched Screens

In some examples, the content management system 300 (e.g., the server 112) may generate a combination of screens as a set of stitched screens. In such examples, the stitched screens may include a combination of screens that are stitched together. In an illustrative example, a learner user may thus scroll through the stitched screens in a particular order. In some examples, the content management system 300 may combine or stitch the screens together to generate the set of stitched screens.

The content management system 300 may generate a stitched screen learner user-experience for learner users. In some examples, this may be accomplished by the content management system 300 generating a lesson type template. In an example, the content management system 300 may generate a design template corresponding to a learning experience for a learner user.

In an example, a content creator may design and generate a learning experience, possibly using the plugin and pathway components and methods described below, in order to combine multiple content sources into the single stitched screen format. In an illustrative example, the content management system 300 may receive user input that requests a first lesson including a first set of screens be stitched together with a second lesson in a stitched lesson configuration. In such instances, the content management system 300 may stitch a screen from the first lesson together with a screen from a second lesson. In addition, or alternatively, the content management system 300 may stitch the first set of screens of the first lesson together in a stitched screen configuration and/or the second set of screens of the second lesson together in a second stitched screen configuration. In such examples, the content management system 300 may further, based on user input, stitched the first stitched screen configuration of the first set of screens together with the second stitched screen configuration of the second set of screen to effectively provide a stitched lesson.

In some examples, the content management system 300 may enforce a specific sequence, so that the stitched screen arrangement is displayed, or responses are provided, with an implemented sequence control, in which content (e.g., one or more screen(s), one or more components of a screen, etc.) is displayed according to the learner user-experience design template or any other lesson type template. In an example, the content management system 300 may enforce a specific sequence (e.g., an order of screens in a set of stitched screens, etc.) with an implemented sequence control, in which content is displayed according to a stitched screen configuration.

In an illustrative example, the content management system 300 may receive user input comprising a request to combine a set of screens into a stitched screen configuration. In such examples, the content management system 300 may receive a selection, via the GUI 316, of a stitched lesson plugin. The stitched lesson plugin may indicate a stitched screen request to display screens according to a stitched screen configuration for a lesson. That is, the content management system 300 may determine from the user input indicates selection of a stitched lesson plugin, where the stitched lesson plugin indicates a request for content (e.g., a set of screens) to be configured in the stitched screen configuration.

In some examples, the stitched screen configuration may be arranged in an order or sequence that controls how the screens are displayed according to the stitched screen configuration. Accordingly, the content management system 300 (e.g., server 112) may determine an order of the screens of the set of screens and may determine a set of pathway connections to connect the set of screens according to the order of the screens in the stitched screen configuration. In another example, the content management system 300 (e.g., server 112) may receive, via the GUI, user input indicating the sequence or order of the screens of the set of screens in the stitched screen configuration. That is, in some instances, the server 112 determines the screen order based on the user input received via the GUI 316 and in other instances, the server 112 determines the screen sequence using a machine learning model or artificial intelligence algorithm that outputs a proposed order for the stitched screen sequence.

The content management system 300 may then combine multiple screens into a single stitched screen. In some examples, the content management system 300 may generate this lesson type template by coding a specific coding language, such as JavaScript, as a non-limiting example.

In some examples, described in greater detail below, the content management system 300 may include one or more screen plugins for stitched screens that produce different learning experiences independently. A stitched screen may be generated by identifying multiple screens, and combining these multiple screens into a seamless piece of content, such as a single web page containing multiple sections on a single, scrollable webpage. In an example, rather than including all of the content in a single screen in a fixed order, the content within the stitched screen may be presented dynamically, according to user interaction with the stitched screen.

In some examples, the content management system 300 may generate a proposed order of content within the stitched screen. In some instances, the content management system 300 may modify the order in which the content is provided (or provide more, less, or different content) according to user interaction with the content on the stitched screen.

In an illustrative and non-limiting example, a content creator (e.g., a course content designer) may have established that a learner user must pass a quiz (or needs to click a radio button before moving to a next screen, etc.) before accessing a specific piece of content, which may be included in the stitched screen.

In order to implement similar kind of control or conditions over navigating through a single stitched screen, the content management system 300 may take advantage of the plugins and pathway architecture systems described below. In the content management system 300, a pathway type may include a free pathway type, a linear pathway type, and/or a graph pathway type, as described in more detail below. In some examples, the stitched screen in the content management system 300 may take advantage of a particular pathway architecture type.

In an illustrative and non-limiting example, the stitched screen may take advantage of the free pathway type. In a free pathway type environment, as described below, there may be many ways to determine a next screen, all of which may include different pathways to the next screen, and each of these screens may use different pathway types, which may each be adaptive. In such examples, a learner user may be able to decide how to navigate between screens in a free pathway type, allowing the user to see all screens, or skip screens that are unnecessary.

In some examples, the actual navigation may take advantage of a plugin application programming interface (API), and/or a routing system on the plugin API. In an example, the plugin API may define one or more separate application programming interfaces (APIs), such as a progress API, a route API, or the like. The content management system 300 may then separate (e.g., spread out) the learner's progress through a series of screens (e.g., one screen after the other). In an example, the content management system 300 may separate the learner's progress in a series of screens (e.g., implemented via a stitched screen, such as a stitched 3D screen). This may be done as opposed to the content management system 300 providing the learner user with one or more options for choosing which screens to navigate to.

As described in more detail below, the content management system 300 may include different APIs for these pathways, such as a progress API and a route API. The various different APIs (e.g., the progress API and the route API) may accommodate the free pathway type, the linear pathway type, and/or the graph pathway type described herein.

Thus, by employing these concepts (e.g., stitched screens and pathway types), the content management system 300 may generate an arrangement of stitched screens, with the stitched screen arrangement including one or more assessments between one or more of the stitched screens. The content management system 300 may then dynamically change the stitched screen to include removed, new or different content according to the one or more assessments. In some examples, a stitched lesson may therefore exist side-by-side with a quiz format or any additional assessment approach (e.g., a diagnostic test).

Returning to the courseware concepts, components may include interactive widgets, question inputs, simulations, and/or visualizations (or anything else desired by the content creator) that can be added to the screen, or directly added to a lesson, and may include interactions or 'micro-interactions' with the user.

A non-limiting example of components may include component plugins (e.g., a YouTube plugin) explored in more detail below, which may extend content data with certain additional representations.

The course architecture may further include one or more learning applications, also referred to as learning apps or simply as 'apps' herein, to describe a particular component that may be added directly to lessons, units, or courses to provide learner users with a persistent interactive component across a set of screens or lessons. Non-limiting examples of such learning apps may include a note-taking app, a course glossary, a summary overview, etc.

Using the components described herein, the architecture of the content management system 300 may be both extensible and flexible, achieving any level of complexity desired by a user (e.g., a content creator), thereby providing significant improvements over the prior art.

As noted above, one way in which the flexibility and extensibility of the content management system 300 is achieved is through the use of a plugin system, which may be used in conjunction with a plugin application programming interface (API), described herein. This plugin system may make use of various plugins to simplify a more complex graph, as referenced herein, in order to present a set of progress metrics, scores, learning objectives, and persisting interactions relative to one or more learner users.

As non-limiting examples, plugins may be used to present, through the content management system 300, different types of labs and interactive simulations or components or widgets. Use of such plugins may thus allow various content creators to extend the different types of labs or interactive simulations or components or widgets to create a unique learning experience for one or more learner users.

Plugins, as described herein, may be referred to as published widgets. In some examples, one or more plugins may build content and/or a course, as well as be incorporated into the content of a course, such as the content and/or courses created by a content creator. In such examples, the content creator (e.g., a course content creator) may utilize such plugins to visually display content and data to users (e.g., via a stitched screen). In some examples, each plugin may include a different display or rendering. In some examples, in addition to rendering data in a particular way (according to instructions received from the content creator), the disclosed widgets may provide opportunities to interact with learner users or other users.

In some examples, the plugins may be available to content creators, such as to one or more course content creators, and/or to plugin developers (who may desire to create and/or manipulate plugins). In an example, the plugins may be available to content creators and/or plugin developers via a plugin API.

In some examples, plugin developers may have access to a plugin API reference. In an example, the plugin API reference may relate to a plugin API. In such examples, the plugin API reference may inform the plugin developers when creating or writing code for the plugins. In some examples, the plugin API reference may include a list of aspects of the plugins that the plugin developers have access to via the plugin API. In such examples, plugin developers may utilize the plugin API reference to create plugins related to the education and/or learning concepts of the content management system 300.

In some examples, the plugin API reference may describe or define an anatomy of plugins. In an example, the plugin anatomy may explain that a plugin is made up of various anatomical parts, such as being made up of a reference, a version, a manifest, a schema, and one or more views. In such examples, the plugin anatomy may introduce each anatomical part of the plugin and/or explain each anatomical part of the plugin.

In some examples, a plugin may serve as a building block for, and be incorporated into, the content of the course created by the content creator. In an example, a content creator may create a course and/or learning course content for a course. In such examples, a plugin may be incorporated into the learning course content of the course (e.g., as created by the content creator). In an example, the content management system 300 may receive user input requesting incorporation of a particular plugin into a course component, such as a lesson and/or screen of a lesson or of a course.

In some examples, a plugin may correspond to one or more published widgets. In an example, a plugin may correspond to a published widget that represents a set of discrete programs. In such examples, the published widgets may be discrete applications, or discrete software code built to a specific model. In some examples, the discrete applications or software code for the published widgets may be a package or set of packages, code projects, and/or code files that serve a specific purpose, etc. In such examples the discrete applications or software code (e.g., a package or set of packages, code projects, code files, etc.) may include data displayed to the user. In some examples, the published widgets may then be displayed to the user, who can use the plugin (e.g., the one or more published widget) to generate and organize learning course content.

In another example, the one or more published widgets may be programs or media published by third parties (e.g., YouTube plugins or widgets, etc.). In some examples, the published widgets may be compiled and may execute software that interfaces with the disclosed embodiments. In the architecture/hierarchy described below, these plugins may be at the high level and/or at the low level.

In yet another example, the one or more published widgets may be component(s) and/or plugin(s) that include existing software and procedures available via an API or associated software. In an illustrative and non-limiting example, the existing software and/or procedures may include Pearson Education's MLM, REVEL or RIO products.

In some examples, the software is not a published widget or plugin as described above, but similar approaches and techniques could be used to access these products in ways similar to a plugin.

In addition to the plugin architecture described above, the content management system 300 may further include an adaptive pathway architecture. The plugin architecture and adaptive pathway systems may represent two major components within the content management system 300 providing improvements over previously created systems. Working together, these two components may provide means to generate personalized courses. Each may include a specific architecture.

Regarding plugins, the content management system 300 may include an architecture where each of the plugins and/or other components may include components within one of several layers. In some examples, the various layers (e.g., the components within each layer of the several layers) may fit together in a nested fashion to create and present a comprehensive course (e.g., learning course content of a course) and/or learning software application.

In some examples, a collection of plugins may include a core course or learning application. In such examples, the core course or learning application may further include one or more plugin extensions.

In some examples, the layers referred to above may correlate with the various layers of course architecture: product, course, lesson, screen application, etc. In an example, a first layer of the plugin architecture may correspond to a first layer of the course architecture (e.g., a product layer). In another example, a second layer of the plugin architecture may correspond to a second layer of the course architecture (e.g., a course layer). In another example, a third layer of the plugin architecture may correspond to a third layer of the course architecture (e.g., a lesson layer). In yet another example, a fourth layer of the plugin architecture may correspond to a fourth layer of the course architecture (e.g., a screen application layer).

Figure 4:
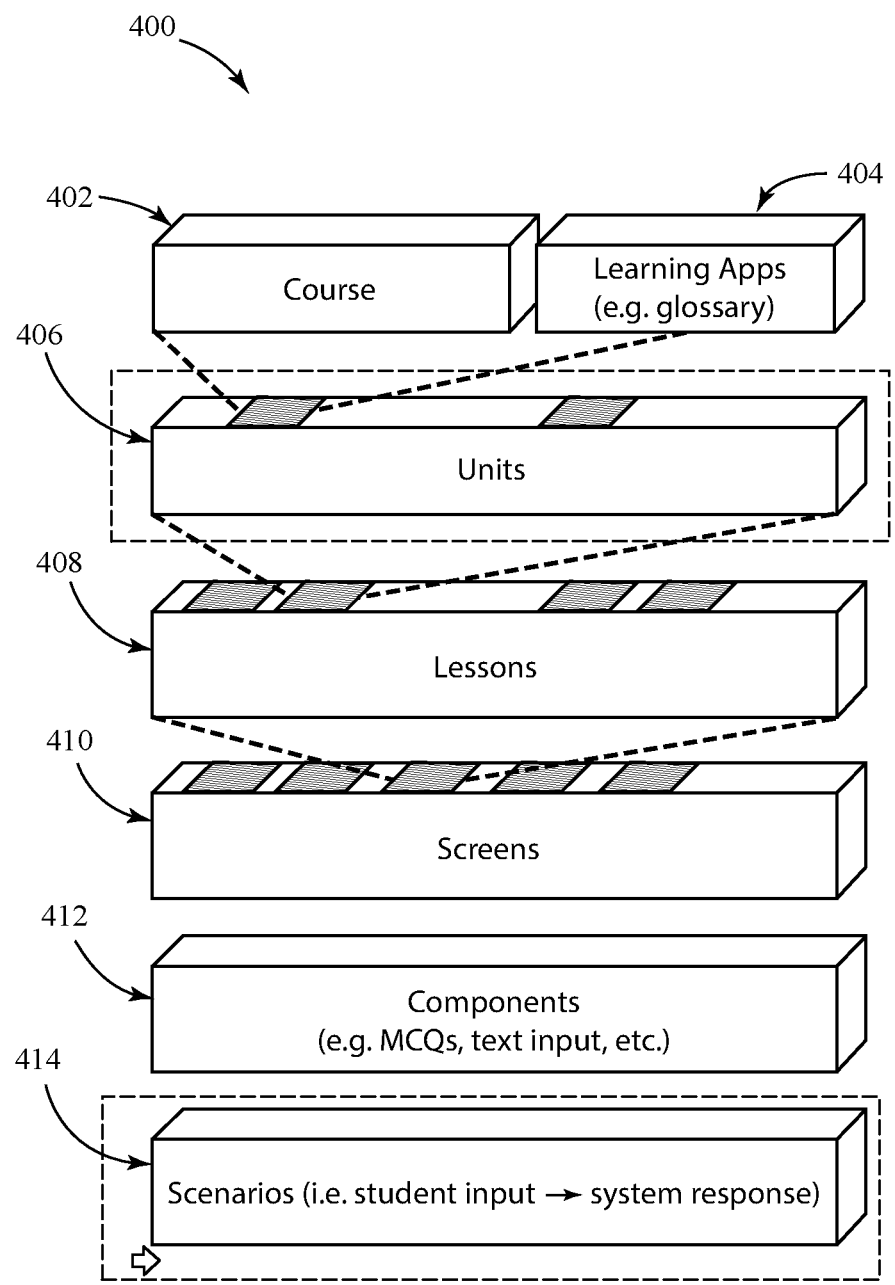
FIG. 4 is a block diagram conceptually illustrating an example of courseware layers, in accordance with various aspects of the techniques described in this disclosure.

FIG. 4 is a block diagram 400 conceptually illustrating an example of courseware layers, in accordance with various aspects of the techniques described in this disclosure. In an example, a first layer may correspond to a course 402 and/or a learning application 404. In some examples, the learning application 404 may include a glossary. In an example, the glossary may present, via a graphical user interface (GUI), a number of different courses for a content creator to utilize for providing a particular learning application for a set of learner users. In an illustrative and non-limiting example, the learning application and/or course layer may catalogue various previously-created and/or stored courses that a content creator may reference to provide learning course content for a set of learner users (e.g., a class of students, a cohort, etc.).

A second layer may correspond to one or more unit(s) 406. In some instances, units 406 may be optional. That is, the second layer may be omitted in some instances or absorbed within a third layer corresponding to lessons 408. When a content creator requests, via the disclosed GUI, a layer for unit(s) 406, the content management system 300 may provide the second layer for units such that a unit 406 may correspond to a set of lessons 408 (as shown) and a course 402 may correspond to a set of units (as shown). The third layer may correspond to one or more lessons(s) 408. The lesson(s) may correspond to a set of units (as shown). A fourth layer may correspond to one or more screen(s) 410. The screen(s) may correspond to a set of lessons (as shown). A fifth layer may correspond to one or more content component(s) 412. Component(s) may include content that a content creator may define for inclusion within a particular screen or within a set of screens. In an illustrative and non-limiting example, components may include multiple choice questions (MCQ), text input, an image, a table, spacers (e.g., to spread out content on a screen), a video player, an audio player, etc. A sixth layer may correspond to one or more scenario(s) 414. In some instances, scenarios 414 may be optional. That is, the sixth layer may be omitted in some instances.

Figure 5:
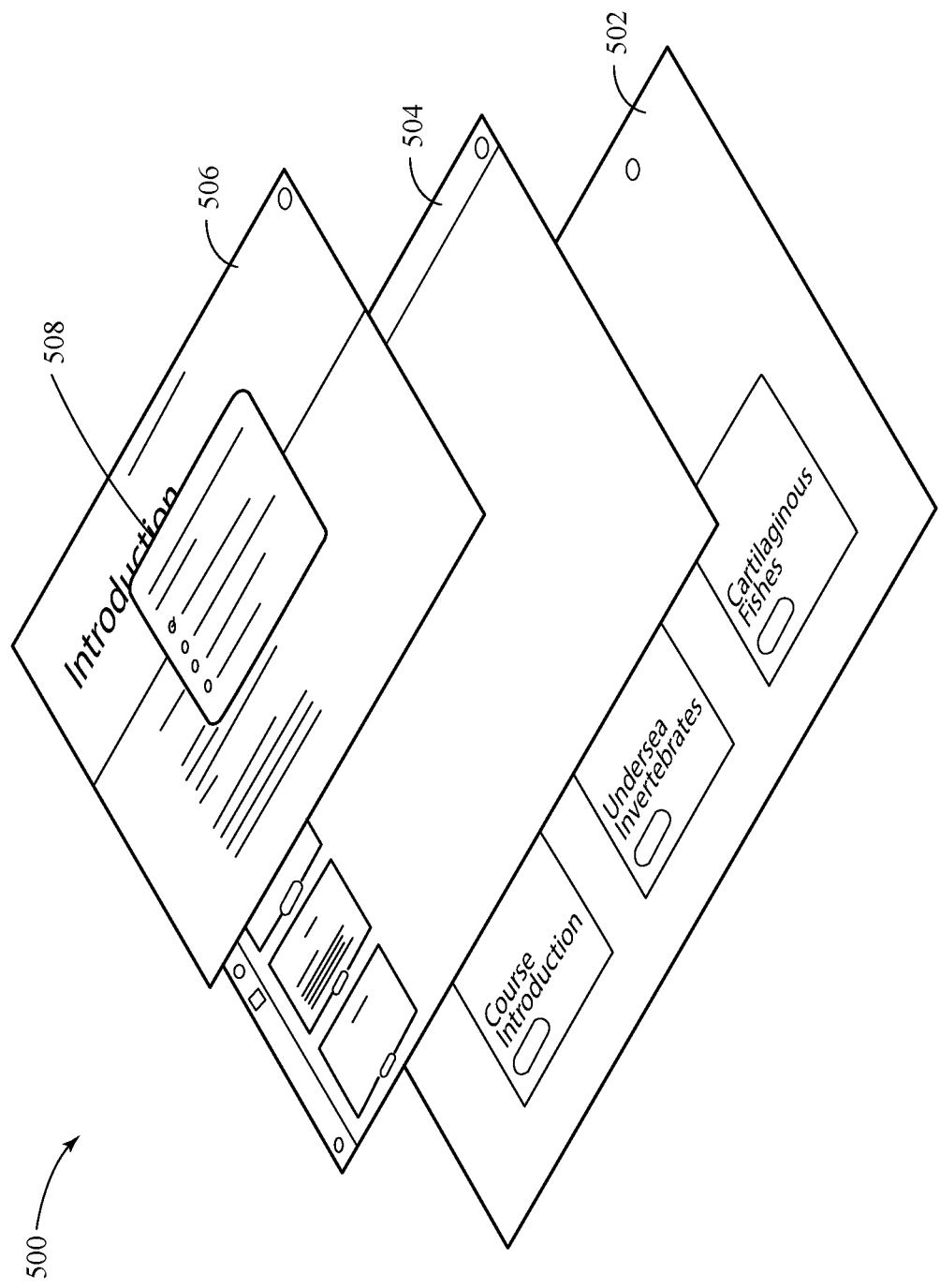
FIG. 5 is a schematic diagram conceptually illustrating example courseware layers, in accordance with various aspects of the techniques described in this disclosure.

FIG. 5 is a schematic diagram 500 conceptually illustrating example courseware layers, in accordance with various aspects of the techniques described in this disclosure. The first layer 502 shown may correspond to a course, such as the course 402 described with reference to FIG. 4. The second layer 504 shown may correspond to a lesson, such as the lesson(s) 408 described with reference to the lesson layer of FIG. 4. The third layer 506 shown may correspond to screens, such as the screen(s) 410 described with reference to the screen layer of FIG. 4. The fourth layer 508 shown may correspond to components, such as the components 412 described with reference to the component layer of FIG. 4. In the example schematic diagram 500, the course 502 may not include a unit layer between course 502 and lesson 504. Accordingly, in this example illustrated in FIG. 5, the course 502 may have multiple lessons 504, each lesson 504 may include multiple screens 506, and each screen 506 may include multiple components 508. In another example, the schematic diagram 500 may include a unit layer between the course layer and the lesson layer.

In some examples, any one or more of the layers may be combined with respect to the plugin architecture and/or the course architecture. A combination of such layers may thus represent a learning experience.

Within the learning experience, a first part may include core capabilities, which may include the core platform that provides the tools necessary to provide the learning experience. A second part may include core utilities such as ingestion tooling, which allows the system to ingest various content, such as textbooks, media, plugins, 3rd party applications, etc., providing the components necessary to provide the learning experience. A third part may include one or more application or course builder applications. As a non-limiting example, this may overlap with some of the courseware concepts introduced above. Specifically, this may include the tools a user needs to create courses, lessons, screens, and components. Additional tools may include titles (e.g., textbook, e-text titles, and/or any other learning resources, which may include a table of contents for accessing the sections within the e-text files, or searchable material), product models, learning tools, etc. In some examples, this third part may also include the tools to produce an entire learning experience for learner users, including applications and full text-sized presentations. Non-limiting examples may include applications found in the Pearson® Education catalog, such as MLM, REVEL, RIO, etc. A fourth part may include extensible plugins and templates. Non-limiting examples may include title players, title renderers, lesson types, 3rd party tools, sims & widgets, types for screens and questions, and the like. In some examples, this fourth part may include plugins, applications, or other components in addition to the plugins and applications used to generate the core learning application. In such examples, the core learning application may also be made up of plugins and components. Thus, like the courseware concepts described above, these four parts for utilizing plugins may be nested together.

Any combination of these layers, or any combination of plugins, may be used together to generate learning course content of a learning application, and the flow may further include plugins that extends the core platform. Nested within the learning course content (e.g., a core platform) for the learning application (e.g., a core application) may be components, such as titles, texts, e-texts, and/or other learning resources that may themselves be a plugin that plugs into the learning course content for a learning application.

Likewise, lessons or assessment types (which may include components, simulations, widgets, etc. and may be dragged and dropped as questions, answers, lab experiments, etc. to be plugged into the lessons or screens) may also be plugins nested within or added to the learning course content for a learning application, which may also be plugged into the titles, and so forth. The example could be continued to include custom components, where the user (e.g., a content creator) changes question types, e.g., to match a video player.

As demonstrated above, the plugin architecture (as well as the pathway architecture described below) may be fully extensible. As a non-limiting example, if a content creator has produced a first learning course content for a learning application, that learning course content for the learning application may be fully extensible at the content creator's discretion. In some examples, a content creator (e.g., a system administrator, instructor, etc.) may be able to produce a second product application from the first application. In an example, the content creator may do so by picking and choosing various elements, such as by adding additional plugins, etc. The content creator may continue to generate additional product applications by continuing to add, remove, or rearrange plugins to create similar title plugins, or similar screens within any number of product applications. This extensibility may further provide great flexibility to users.

As noted above, plugin developers may have access to documentation for the user of plugins. Thus, because of the extensibility and flexibility of the plugin architecture, these plugin developers may have the ability to completely change the way these courseware items look, feel, and behave. For example, using the basic courseware structure:

course>lesson>screen>component as well as the plugin architecture described above, plugin developers may render each part of the courseware separately, via plugins, so each part of the courseware structure may be customized and extended in whatever way the plugin developer requires.

As noted above, in some examples, a plugin may be injected into an application, thereby making it a component or extension within the learning application, such as a learning application product. In the content management system 300, the plugin developer and/or content creator(s) may then implement code associated with the plugin, allowing users to interact with the plugin in order to receive and/or generate data associated with the plugin. These plugins may therefore be driving content delivery to one degree or another.

Given the ability of developers or other users to implement code associated with the plugins, the content management system 300 may further provide content wrappers security, tracking of user interaction and the like. In some examples, this code may be incorporated in the screens within the application. The screens may be customized based on customized flows. In another example, the screens may be customized based on users such as content creators (e.g., instructors) and other users, such as learner users.

In some examples, the content management system 300 may enable a content creator to select the content and the pathway through the content, which the content creator believes is the best for their particular content offering. Thus, using the WYSIWYG (What You See Is What You Get) editor and plugins described in detail above, the content creator may build a website for learner users, which may be customizable and easily configurable and editable.

To accomplish this, the content creator may access the API of one or more particular plugins (e.g., described above), and select the applicable plugins, including plug-and-play elements and components, as well themes, in order to generate the customized website content for the learner user experience. In some examples, the content management system 300 may incorporate a broader and more beneficial approach to managing learning content. In an example, a content creator may utilize the content management system 300 to select any combination of plugins and/or themes, associate code for individual and/or combinations of plugins, which customizes a pathway through the combination of plugins, and apply these components to an academic or other educational software application, providing its own more complicated space.

In addition, the disclosed embodiments are both simplified and more complex. Specifically, the disclosed embodiments are more simplified than approaches known in the art, because the applications created herein are built using a very small singular component, specifically plugins, which can be plugged into the system in customized ways to generate entire customized applications. The system, however, is also much broader and more flexible than content management systems known in the art, which tend to limit components to small widgets or other like components. In an example, the disclosed embodiments allow content creators to create entire applications (e.g., Pearson Education's MLM or REVEL) using these plugins and organizing such plugins into a hierarchy of plugins. In addition, the applications are infinitely extendable by including additional plugins, which may be used to create entirely new applications.

The hierarchy of plugins referred to above may be made up of plugins nested within additional layers. Specifically, the content creator may use the plugins, and the specific types of plugins, to design layers within the application (possibly using the layers described in more detail above), and these plugins, types, and/or layers may be continually layered and nested to create a customized combination of plugins.

Each of the plugins, layers, and nesting within the hierarchy may cross-reference other plugins, layers, and nesting, possibly using the customized pathways (e.g., a combination of user-specified free pathway type connections, linear pathway type connections, graph pathway connections, and/or hub & spoke pathway connections, etc.) described in more detail herein, representing a significant improvement over the prior art. As above, each of the hierarchy and nesting of the plugins, layers, and so forth, may be infinitely extensible in any way desired by the content creator, so that the application's relationship between plugins, layers, nesting, etc. is customized to the content creator and the user experience.

In addition to the designed and created learning application, made up of various plugins, layers, types, nesting, and the relationships between them, the content creator (e.g., an instructor) may further design and customize one or more pathway architectures through the application and its hierarchies, layers, and nesting of various combinations of plugins and plugin architectures described above.

The relationships established for the plugins, described above, may overlap fairly heavily with such pathway architectures. As noted above, the disclosed embodiments represent a significant improvement over current systems in that they are extensible and customizable. Additional improvements represented by the disclosed technology include the content creator's ability to design and customize an interactive portion of the application, which may be specific to learning data (e.g., pathway architecture that tracks a learner user's interactions in order to demonstrate that the learner user has mastered one or more concepts), in some examples.

Returning to the courseware structure described above, the example disclosed above (e.g., course>lesson>screen>component) may represent a more traditional structure, which is predictable, but also limited in its flexibility. Thus, the disclosed embodiments represent a significant improvement over the prior art because, rather than only being capable of generating online courseware that is structured predictably, the disclosed embodiments allow a content creator to design and generate applications that include more complex and varied courseware, which is more flexible in relation to existing underlying data structures.

Thus, in order to accommodate the flexibility needed for more complex and varied courseware, some embodiments in the content management system 300 may include an Activity, Pathway, Interactive, and Component (APIC) structure. In some examples, the content management system 300 may utilize and combine one or more elements of the APIC structure. In an example, the content management system 300 may utilize and/or combine the one or more elements of the APIC structure like building blocks for the learning application, in order to make any type of courseware needed by the administrator, content creator, instructor, etc.

The first element of the Activity, Pathway, Interactive, and Component (APIC) structure may include an activity. In some examples, An activity may include a set of pathways, lessons, assessments, courses, units, and the like through which a learner user may progress. In some examples, the content management system 300 may score a set of such pathways, lessons, assessments, courses, units, etc.

In some examples, the content management system 300 may store both a course and a lesson as a set of activities. That is, the courseware structure may not necessarily need to distinguish between a course and a lesson in various examples.

The second element of the Activity, Pathway, Interactive, and Component (APIC) structure may include a pathway. This pathway may include a set of activities and/or interactives (described in more detail below), as well as the rules and logic for navigating the pathway (e.g., for 'walking' through the set of activities and/or the set of interactives). The disclosed embodiments may include several different types of pathways, each with different rules determining which 'activity' or 'interactive' the content management system 300 may render for a learner user to view (e.g., see) next along the pathway(s).

In some examples, the content management system 300 may support a linear pathway type. In an example, a linear pathway may show the learner user each of the learner user's activities or interactives in a linear fashion. In an example, the linear pathway may show the learner user each of the learner user's activities or interactives one at a time until the learner user has completed all of the learner user's activities and/or interactives. In such examples, a learner user may follow a fixed pathway without the learner user having to make decisions along the pathway regarding which activity or interactive the content management system 300 is to render for the learner user next while the learner user navigates the pathway.

In some examples, the disclosed embodiments support a free pathway type. In an example, a free pathway may show everything (e.g., all screens, all content, etc.) all at once. In an example, a free pathway may allow the learner user to choose what to see.

In some examples, the disclosed embodiments may support a 'graph' pathway type. In an example, a graph pathway of the graph pathway type may allow a user to navigate (e.g., move through) different screens configured along the graph pathway.

In some examples, the disclosed embodiments may support possible pathway variants as well. In such examples, the pathway variants may be driven by one or more machine learning (ML) models deployed for (e.g., trained on) assessments and practice sets.

In some examples, the graph pathway type may identify certain triggers that may control how a particular student navigates (e.g., moves through) a graph pathway of the graph pathway type. In an example, the content management system 300 may receive user input defining a set of pathway connections between courseware elements (e.g., between screens) and a set of conditions for navigating the set of pathway connections in a graph pathway architecture. The content management system 300 may generate learning course content based on (e.g. based entirely on or at least in part on) the user input.

In some examples, the learner users may navigate the graph pathway based on rules defined by the content creator (e.g., an instructional designer, a content builder, an author, etc.). These rules may reference any learner user's interaction within any component on a current screen accessed by the learner user. In some examples, this concept may be expanded/extended to include learning-objective performance, one or more learner user score(s), learner user details (e.g., location, demographics), calculated variables and the like, possibly according to the user data (e.g., the set of user data items) stored in database 110.

In some examples, the graph pathway functionality may feed back into specific student feedback. In an illustrative and non-limiting example, as learner users get questions right or wrong (or use identified 'wrong' keywords in short answer or essay questions, for example), the content management system 300 may allow for providing specific feedback to the learner user that would indicate where the problem is, and update the recommended next steps for the learner user.

It should be noted that this behavior is not limited to the graph pathway, and this functionality may apply to other components within the content management system 300. For example, in all screens, regardless of pathway, the content creator may apply functionality to provide specific feedback to a learner user that indicates the problem and updates, and recommends specific next steps to learner users. That is, the graph pathway controls which screen the learner user sees, and "scenarios" determine the feedback shown to the learner user.

The third element of the APIC structure may include interactives. Interactives may include interactive screens or pages that may ask the learner user a question. Interactives include conditions for success or failure, and actions for what to do next, typically with adaptive feedback.

The concepts associated with interactives may be roughly analogous to the concepts within a QTI format. As with activities described above, interactives may be configured to track progression, attempts, and scoring, and may also include and display components, discussed in more detail below. However, in some examples, unlike activities described above, interactives cannot contain additional pathways.

Thus, the conditions referred to above may be triggers or other conditions attached to content to control how a user interacts with the content or moves on to new content. As noted above, each condition may be associated with one or more rules that define next steps taken in real time according to any learner user interaction within any component on a current screen. In some examples, this may be expanded/extended to include learning-objective performance, one or more learner user score(s), learner user details (e.g., location, demographics), calculated variables, and the like.

The concepts and components of the system described above may work together, using any combination of plugins within an adaptive pathway or architecture, as described herein. The content management system 300 may therefore include a highly extensible adaptive pathway or architecture (also referred to herein as "pathways") including a novel way for creating a generic learning and assessment content management system, made up of the process of content creators utilizing the plugins described above, which utilizes a "plug-and-play" approach to adaptivity. This adaptive pathway architecture may therefore be constructed in such a way as to allow many different types of adaptivity and personalization for both content creators (e.g., instructors) and learner users. As a result, the content management system 300 may present content based on the types of experiences offered via a design of a given content creator.

The graph functionality in pathways may include multiple concepts that represent improvements over the prior art. These concepts may include rolling up multiple adaptivity types. As non-limiting examples, algorithms used in implementing these concepts and the adaptivity types may include one or more Bayesian Knowledge Tracing (BKT) algorithms, one or more Item Response Theory (IRT) algorithms, and/or combinations thereof, and the like. While described in some examples with reference to BKT algorithms and/or IRT algorithms, for example, the techniques of the disclosure are not so limited. The content management system 300 may incorporate any algorithm known in the art or developed in the future, and the description below regarding a designer selecting and inserting such algorithms should in no way limit the disclosed technology.

In examples that incorporate a Bayesian Knowledge Tracing (BKT) algorithm, the content management system 300 may utilize an algorithm to model each learner user's mastery of the knowledge being tutored. As a non-limiting example, a BKT algorithm may be used in used in intelligent tutoring systems, and may model student knowledge, which may be updated by observing the correctness of each student's interaction in which they apply a skill in question. In some examples, a BKT algorithm may assume that student knowledge is represented as a set of binary variables, one per skill, where the skill is either mastered by the student or not. Observations in a BKT algorithm may be binary. In an example, a student may get a problem/step either right or wrong. In examples using the intelligent tutoring systems referred to above, these systems may use one or more BKT algorithms for mastery learning and problem sequencing. In another example, a BKT algorithm may operate according to skill-specific parameters only.

In examples that incorporate an Item Response Theory (IRT) algorithm, the content management system 300 may use the IRT algorithm, or any combination of different statistical models, to apply a theory of testing based on the relationship between individuals' performances on a test item and the test takers' levels of performance on an overall measure of the ability that the test item was designed to measure. In these examples, the IRT algorithm does not assume that each item is equally difficult for a learner user to understand or master. Instead, the IRT algorithm may treat the difficulty of each item (the item characteristic curves) as information to be incorporated in scaling items.

This approach applies related mathematical models to testing data, focusing on the item, as opposed to the test-level focus of classical test theory. In an example, an IRT algorithm may model a response of each examinee of a given ability to each item in an exam or test. The term "item" is generic, covering all kinds of informative items. In an illustrative and non-limiting example, the items may include multiple choice questions that have incorrect and correct responses. In another example, the items may include statements on questionnaires that allow learner users (e.g., respondents) to indicate a level of agreement. As such, the IRT algorithm may be based on the idea that the probability of a correct response to an item is a mathematical function of person and item parameters.

In some examples, the content management system 300 may utilize one or more adaptivity algorithms (e.g., a BKT and/or IRT algorithm), including any number of algorithm inputs for the one or more adaptivity algorithms, to facilitate the development of a pathway architecture. In such examples, the content management system 300 may feed the inputs into the one or more adaptivity algorithms. In addition, the content management system 300 may include any number of outputs from the one or more adaptivity algorithms. In such examples, the input(s) for the adaptivity algorithm(s) and/or the output(s) from the adaptivity algorithm(s) are incorporated into the content management system 300.

As a non-limiting example, a key part of the pathway architecture disclosed herein may be that the inputs and the outputs are the same across all of the pathways (e.g., irrespective of pathway type) and/or may be the same across such pathways, where the outputs correspond to the particular inputs fed into the one or more adaptivity algorithms incorporated into the content management system 300. As a result, generalizing the inputs and outputs means that designers can insert any algorithm needed by the content management system 300 to have the learner user progress through different environments.

In some examples, the content management system 300 may utilize an Item Response Theory (IRT) algorithm in development of one or more pathways. In an example, the content management system 300 may utilize three main inputs (and in some examples, three correlated outputs, referred to below). A first of these inputs may include a learner's progression metric. In an illustrative and non-limiting example, the progression metric may include a current position of a learner user within the current courseware within the system. A second input may include performance against the courseware. In some examples, this second input may be associated with a progress application programming interface (API) as a whole. In an example, the progress API may determine and/or provide data regarding how well a learner user performed against the courseware. In an illustrative example, the progress API may determine and/or provide data regarding the extent to which the learner user answer questions correctly or incorrectly). In some examples, this second input may be specific to the courseware with which the second input is associated. A third input may be a bit more generic. This input may include competencies, learning objectives, learning outcomes, and the like. These inputs may include a conceptual representation of skills or knowledge that is independent of the courseware. These inputs may be provided/accessed via a competency API. In an example, a competency API may be applied at the same level as the progress or the route. In some instances, the competency API is heavily utilized in the inputs and outputs of those pathway types. Each of these three inputs may serve as inputs into different pathways (e.g., a linear pathway, a free pathway, a graph pathway).

As noted above, the output may include the same three options (learner's progression, performance against courseware, competencies, learning objectives, learning outcomes). Specifically, the outputs may include the progression, which determines which screen or lesson shows up next within the pathway, demonstrating the progression of the learner.

In examples utilizing an IRT algorithm, the progression may be an output of the IRT algorithm. Similarly, in examples that utilize a BKT algorithm or a graph pathway type system, the progression may be the output of these algorithms.

These pathways may further update competency values. As non-limiting examples, the competency values may be associated with general concepts that can have values of competency or mastery. As non-limiting examples, these may include competency or mastery of generic concepts such as algebra, addition, multiplication, and the like. A third output may include scoring in that pathway or within a lesson that holds a pathway. As non-limiting examples, a learner user may have achieved 80%, or 9 points, etc. The input and/or output applied (e.g., which competency item, performance value, etc.) may depend on the content creator.

In some examples, the content management system 300 may feed the inputs directly into a particular algorithm (e.g., an IRT algorithm, a BKT algorithm, etc.). In some examples, the content management system 300 may perform a pre-processing of the inputs prior to feeding the inputs into the algorithm.

As a non-limiting example, in some examples, the courseware may be organized in a hierarchical relationship. Similarly, a competency tree may be organized in a hierarchical relationship. As a result, when a learner user achieves a certain performance for low-level items in the courseware (e.g., if the user receives 2 points for a low-level item at a specific screen), that performance score may calculate (e.g., roll up) an aggregate competency value, for example, with optional weight values in some instances. As a result, the higher level/higher relevancy nodes within a hierarchy for the competency tree may reflect the aggregate competency value for a learner user traversing a course and pathway architecture.

In some examples, the same general concept may apply to the competency so a very specific competency item may include a determination of whether the learner user has demonstrated an understanding of various fundamental concepts. In an illustrative and non-limiting example, the content management system 300 may determine whether a learner user has demonstrated an understanding of an addition or plus sign (e.g., the likes of which may assist learner users with gaining an understanding of various concepts such as algebra, addition, multiplication, etc.) or the like. In such examples, the content management system 300 may determine whether the learner user has achieved a particular level of understanding regarding a given fundamental concept. In some examples, this may be achieved using a range between 0 and 1. This data may roll up the competency tree as described above that contributes to the general algebra terms, concepts or topics, and may further roll up to the general math terms, concepts, or topics. As above, these concepts may be likewise applied to the outputs of the algorithms.

The three example inputs/outputs described above are non-limiting. In some examples, additional datasets or input files may be applied.

In some examples, the content management system 300 may utilize an open standard for storing metadata related to the competencies referred to above. As a non-limiting example, this may include the IMS Competencies and Academic Standards Exchange® (CASE®) standard to exchange and transmit information about rubrics, criteria, and performance tasks, which may not necessarily align to competencies. The CASE standard describes a tagging hierarchy, which the content management system 300 may utilize as attributing performance or scores or point values to the competency items. In addition, the content management system 300 may roll the data up or down, and use the data to feed in the pathway inputs and outputs to all of the novel pathways. This specific use of this standard is an improvement over the prior art.

Pathway Architectures

In some examples, the content management system 300 may include one or more pathway architectures that specifically utilize designed adaptivity. In an example, a content creator may generate a pathway that is relatively unique to the designer and/or the intended users. A server within this architecture may serve the content within an instructions design that creates a flow through the system for the user (e.g., through a pathway or courseware).

In some examples, a content creator is able to design a website framework as described above. In such examples, the content creator is able to create, on top of the website framework, one or more layers of additional education or learning experience.

In some examples, the one or more additional layer(s) may include various application programming interfaces (APIs) and/or software development kits (SDKs), as are known in the art. In such examples, the APIs and/or SDKs may access and provide additional layers of plugins.

In this context, plugin developers may define specific differences between the utilized pathways, specifying the plugin developer's choices of how to display the pathway content, and specifying the plugin developer's choice as to which pathways types should be recommended to a content creator (e.g., a learning designer).

In some examples, the relationship between the activities and the pathways may include a recursive relationship. In an example, the recursive relationship between activities and pathways may allow a content creator to create more deeply nested courseware.

However, despite a plugin developer's ability to create plugins to extend activities, interactives and components, in some examples there may be a fixed set of pathways available in the content management system 300. As a result, plugin developers, in such examples, may recommend a pathway type, but the choice of pathway may ultimately be left up to the content creator. In such examples, a plugin developer may design a set of plugins for activities and/or interactives to accommodate various pathway types (e.g., free pathway types, fixed pathway types, etc.). In an example, the content management system 300 may receive and store a set of plugins for activities and/or interactives to accommodate different pathway types. The content management system 300 may present, e.g., via a graphical user interface (GUI), a set of various choices in pathway architectures and/or one or more recommended/suggested pathway types. In such examples, the content management system 300 may receive, as user input, a choice of pathway from a content creator related to the set of various choices in pathway architectures and/or the one or more recommended/suggested pathway types.

As learner users traverse a pathway architecture, the content management system 300 may aggregate data associated with the learner user. Once that data is collected, aggregated, and accessed, the content management system 300 may execute software logic to make decisions about (e.g., based upon) the collected and aggregated data. Based on the data collected for each learner user, the content management system 300 may change the learning experience of the learner user, based upon the collected and aggregated data.

In some examples, each plugin, component, or widget within the content management system 300 may collect and aggregate data. In such examples, the plugins, components, and/or widgets may utilize that data to understand and guide the student's learning process (e.g., based on the students' actions or interactions). To accomplish this, the content management system 300 may, in some examples, expose the state of plugins, widgets, or components in response to user input. In such examples, the content management system 300 may fire (e.g., execute) defined triggers within a learner user's traversal of the pathway architecture according to the state of the plugins. The content management system 300 may then collect and aggregate learner user details, learner user annotations, learner user history, learner user progress, route information, and the like from the user interaction.

In some examples, the state of the plugin may be managed and controlled through the platform itself at a higher level. In such examples, the content creator may manage or otherwise control the plugin. In such examples, the content may be personalized to the learner user. In some examples, the content management system 300 may be configured to adaptively respond accordingly to the learner user's personalized content, based on a learner user's progression through a particular course.

In some examples, the pathway architecture may include gated items, which determine which lessons or screens may be seen by the learner users, based on the learner users' current scores, which learning objectives the learner users have completed, etc.

Thus, returning to the concept of conditions above, the content creator may manipulate the pathway architecture to include conditions that determine which content a learner user is able to see, as well as determine how the learner user progresses through the content.

The final element of the APIC structure may include components including standalone interactive question inputs, widgets, simulations, etc. These components may be the simplest building blocks, and may be added to both activities and interactives. In some examples, the functionality of such components may be limited to displaying and tracking their own configuration and learning state. Thus, the learning application described above may be one or more specific types of components.

Plugins may exist at various levels within the disclosed embodiments, which may drive the components within an application. As a result, there are multiple ways that a user (e.g., a content creator, a learner user, etc.) may see the content or the components on any given page or screen within the application. In some examples, the content editor may include multiple templates for generating content. In an illustrative and non-limiting example, the WYSIWYG editor may include multiple templates that may be utilized by the content creator to generate a website. In some examples, the lowest level plugins may be found within a build menu of the application associated with the templates. Higher level plugins (e.g., sims and widget plugins) may exist within applications as component-level plugins which may be associated at an application level.

Plugins may also exist at a screen level, so if a content creator adds a screen, the content creator may be provided access to screen-level plugins. In such examples, the content creator may select one or more of the screen-level plugins. As noted above, multiple levels of plugins may exist, so by selecting a template-level plugin, the user may then be presented with one or more screen-level plugins, and a selection of any one of these may automatically present the content creator with one or more additional plugins, in some examples. Non-limiting examples of plugins at the screen level may include 3D screens, automation screens, procedure screens, traverses, and the like.

Templates and plugins may also exist at an application, course, or lesson level. In an example, at a top level of the WYSIWYG editor, for creating a course or a lesson, a content creator may be presented with a list of templates. In an illustrative example, when If the content creator selects a blank template category, the content management system 300 may present all available plugins at the top level (e.g., application-level plugins) in instances where the content management system 300 determines, upon receiving user input from a content creator's device, that the content creator has selected a blank template category. In some non-limiting examples, such plugins may include IT Pro plugins, e-text course plugins, other demo plugins, and the like.

In some examples, lower-level plugins (e.g., YouTube component plugins) may need to be prepared to interact with the plugin API, so that these plugins are capable of providing state (e.g., a learning state of the learner user) and other learner user data to the content management system 300. In an example, lower-level plugins (e.g., low-level component plugins) may be dragged and dropped into an application, or otherwise embedded within the application. In some examples, the content management system 300 may collect and aggregate data from a set of low-level component plugins (e.g., YouTube component plugins), taking advantage of the existing APIs to expose data (e.g., a user's progress through a YouTube video), to determine what percentage of the low-level component plugin was completed (e.g., the user's status within the video, did they complete the video, did the learner user watch all of the video, did the learner user watch less than a threshold percentage of the video, did the learner user skip over content, etc.). That is, while being a low-level component plugin, there is still significant data to be collected, aggregated, and analyzed based on the user's actions. Based on this data, a learning experience for a learner user may be further customized (e.g., redirecting the learner user, personalize the content based on third party tools, etc.).

Thus, using interactive elements, components, or plugins, content creators may change or manipulate anything within the application, for example, based on a set of learner user interactions. In some examples, the set of learner user interactions may be recorded, then may analyze conditions and apply associated algorithms (e.g., a diagnostic algorithm, a summative algorithm, or a designed adaptivity approach) to redirect the learner user through a customized pathway to a specific screen, thereby creating a very interactive and highly personalized specific journey through the application for the learner user.

In addition to the embedded YouTube video scenario (e.g., determining where a learner user has stopped a video) described above, further non-limiting examples of specific user data being derived from a specific scenario or condition within the application may include scenarios or conditions where a learner user is taking a health class, for example, where the content management system 300 has access to the learner user's vital signs (e.g., heartrate, possibly obtained via one or more wearable devices, etc.). In such examples, the content management system 300 may generate a request for a learner user to submit and/or analyze their vital signs for an assignment. In these examples, the content creator may have conditions or scenarios in which the content displayed to a learner user is customized according to the learner user's vital signs, or train the learner user to measure these vital sign values for themselves. The flexibility and customization options within the content management system 300 may allow an application to accomplish such use cases.

In such examples, the content management system 300 may receive data from any device and/or system that a learner user physically interacts with, for example, throughout the application (e.g., a learning application) for a course. In addition, or alternatively, the content management system 300 may generate a knowledge map that runs external or parallel to the created content. In some examples, the content management system 300 may store all the data generated so that it is available to the content management system 300 and users thereof at any subsequent point in time. In addition, or alternatively, the content management system 300 may determine, for a learner user, a set of performance metrics relative to the associated topic (e.g., a health class-related topic) and/or one or more learning objectives (e.g., score, learning outcome, performance for standards or competency, etc.).

In some embodiments disclosed herein, a graphical user interface (GUI) is generated (e.g., by the content management system 300) and interacted with by a user for various purposes. For example, the one or more servers 112 may generate the GUI, for example, by retrieving, from a memory, instructions and/or data that together define or are executed to define the GUI (e.g., in terms of content and/or presentation of the content of GUI). The one or more servers 112 may transmit the GUI 316 to one or more of the client devices 106. A client device 106 may display the GUI 316, receive user input indicating user interactions with the GUI, and provide indications of the received user input back to the one or more servers 112. The server 112 may respond or react based on the received indications of the user input by one or more of updating the GUI 316 (e.g., with a learning course content rendering 318), generating learning course content (e.g., courseware), modifying courseware, transmitting courseware, and the like. The GUI 316 may include a plurality of GUI screens, several of which are illustrated in the drawings as discussed below. The GUI screens may display content and have elements (e.g., drop down menus, text entry boxes, soft buttons, and the like) with which a user may interact with via, for example, peripheral I/O devices of the client device 106. In the discussion that follows, references to a user providing input via a GUI or GUI screen may refer to a user interacting with an element of a GUI screen (e.g., via a peripheral I/O device of a client device 106) to cause the client device 106 to provide an indication of the user input to the one or more servers 112.

Figure 6:
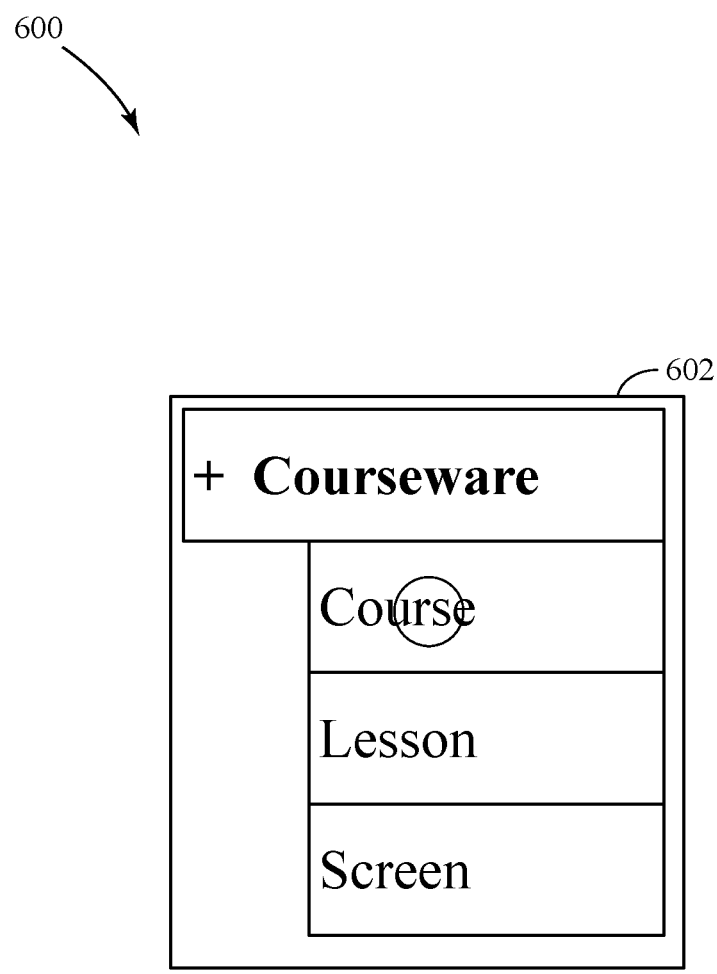
FIG. 6 is a schematic diagram conceptually illustrating an example screen of a graphical user interface (GUI) for generating learning course content, in accordance with various aspects of the techniques described in this disclosure.

FIG. 6 is a schematic diagram conceptually illustrating an example screen 600 of a graphical user interface (GUI) for generating learning course content, in accordance with various aspects of the techniques described in this disclosure. The example GUI screen 602 illustrated may include an option 604 to add courseware. In such examples, the content management system 300 may generate a GUI screen 602 of a GUI to present the option 604. In such examples, the content management system 300 may generate additional options of the GUI screen 602 for a user to add different types of courseware. In an illustrative and non-limiting example, the GUI screen 602 may include an option to add a course 606, a unit (not shown), a lesson 608, a screen 610, etc. In another example, the GUI screen 602 may include an option to add a new component (not shown).

Figure 7:
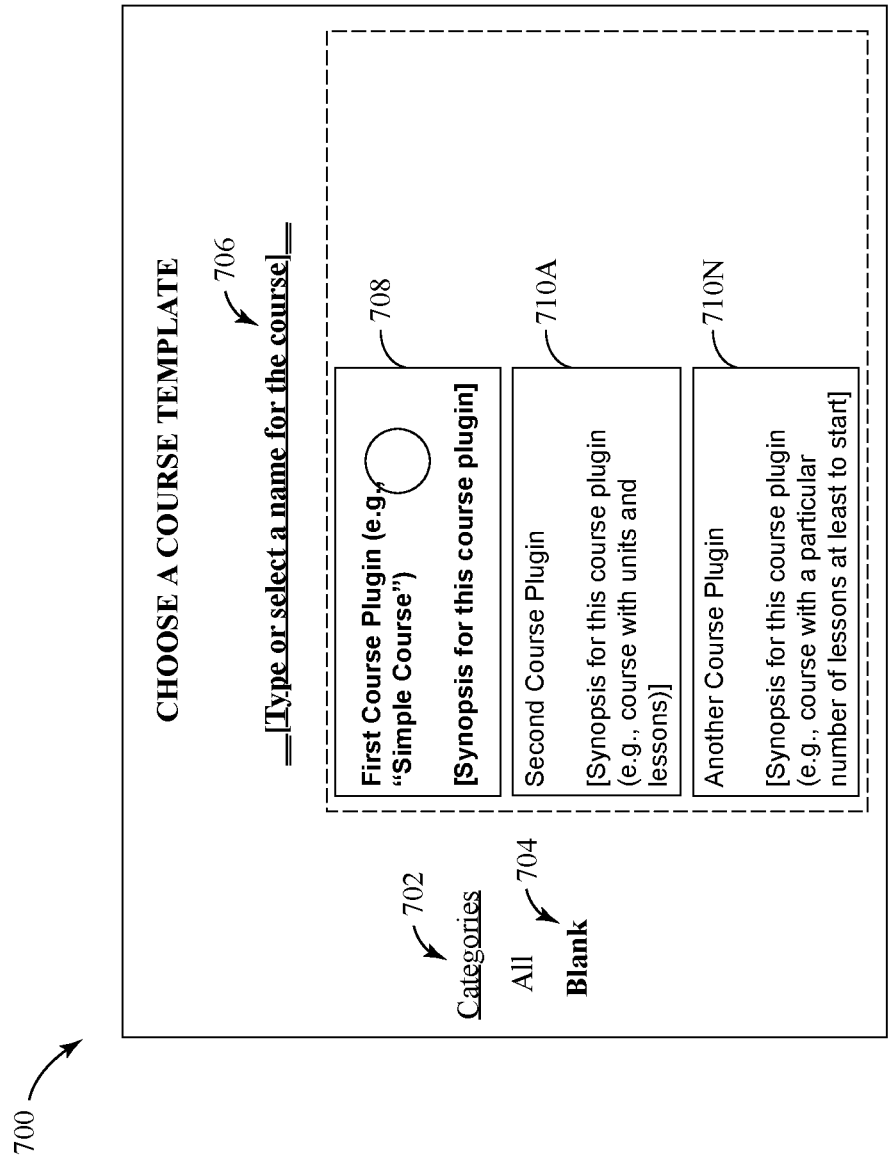
FIG. 7 is a schematic diagram conceptually illustrating an example GUI screen eliciting user input corresponding to a course, in accordance with various aspects of the techniques described in this disclosure.

FIG. 7 is a schematic diagram conceptually illustrating an example GUI screen 700 eliciting user input corresponding to a course, in accordance with various aspects of the techniques described in this disclosure. For illustration purposes, the example GUI screen 700 is shown as a next GUI screen of the disclosed GUI that may follow the GUI screen 602 described with reference to FIG. 6 (e.g., in response to receiving a user selection of the option to add the course 606).

The example GUI screen 700 illustrated may include an option 702 to browse categories of courses plugins. In an example, the content management system 300 may generate the GUI screen 700 upon accessing a plugins catalog 304 from database(s) 110 described with reference to FIGS. 1 and 3. The content management system 300 may generate the GUI screen 700 to provide the categories of plugins and to enable a content creator to filter the course plugins according to predefined criteria of the GUI screen 700. In an example, the GUI screen 700 may include a blank category 704 that includes blank course plugins. In another example, the GUI screen 700 may include a second category that includes course plugins that are prepopulated with certain screens and/or content components. In some examples, the course plugins may correspond to a particular course topic (e.g., mathematics, biology, chemistry, etc.) or sub-topics (e.g., chemistry labs, biology labs, etc.). In some examples, the GUI screen 700 may not include categories 702 or filters. That is, the GUI screen 700 may present all course plugins available to a content creator, or a subset of course plugins available to particular content creators. In an example, a GUI screen 700 generated for a biology teacher may present a subset of course plugins from the plugins catalog 304 that correspond to biology.

In some examples, a content creator may select the blank category 704 to view all of the available blank course plugins 704 or a subset of blank course plugins 704 from the plugins catalog 604. The GUI screen 700 may include an input field or dropdown field for naming the course. In an example, the GUI screen 700 may elicit input from a user for a course name 706. In such examples, the content management system 300 may receive user input including a course name. The content management system 300 may determine from the user input the course name. In an illustrative and non-limiting example, the content management system 300 may determine the user input includes a course name of "Biology 101," and as such, may store the course being created under that course name.

In some examples, the blank course plugins 704 may include a first course plugin 708 and in some instances, may include additional course plugins 710A-N (e.g., a second course plugin 710A, another course plugin 710N). The course plugins may include a synopsis for the course plugin that describes the course plugin for a content creator to consider when selecting one or more of the course plugins. In some instances, the course plugins may be combinable with other course plugins. In another example, a course plugin (e.g., the first course plugin 708) may be self-contained. Upon being selected, the course plugin may be used to create a course.

Figure 8:
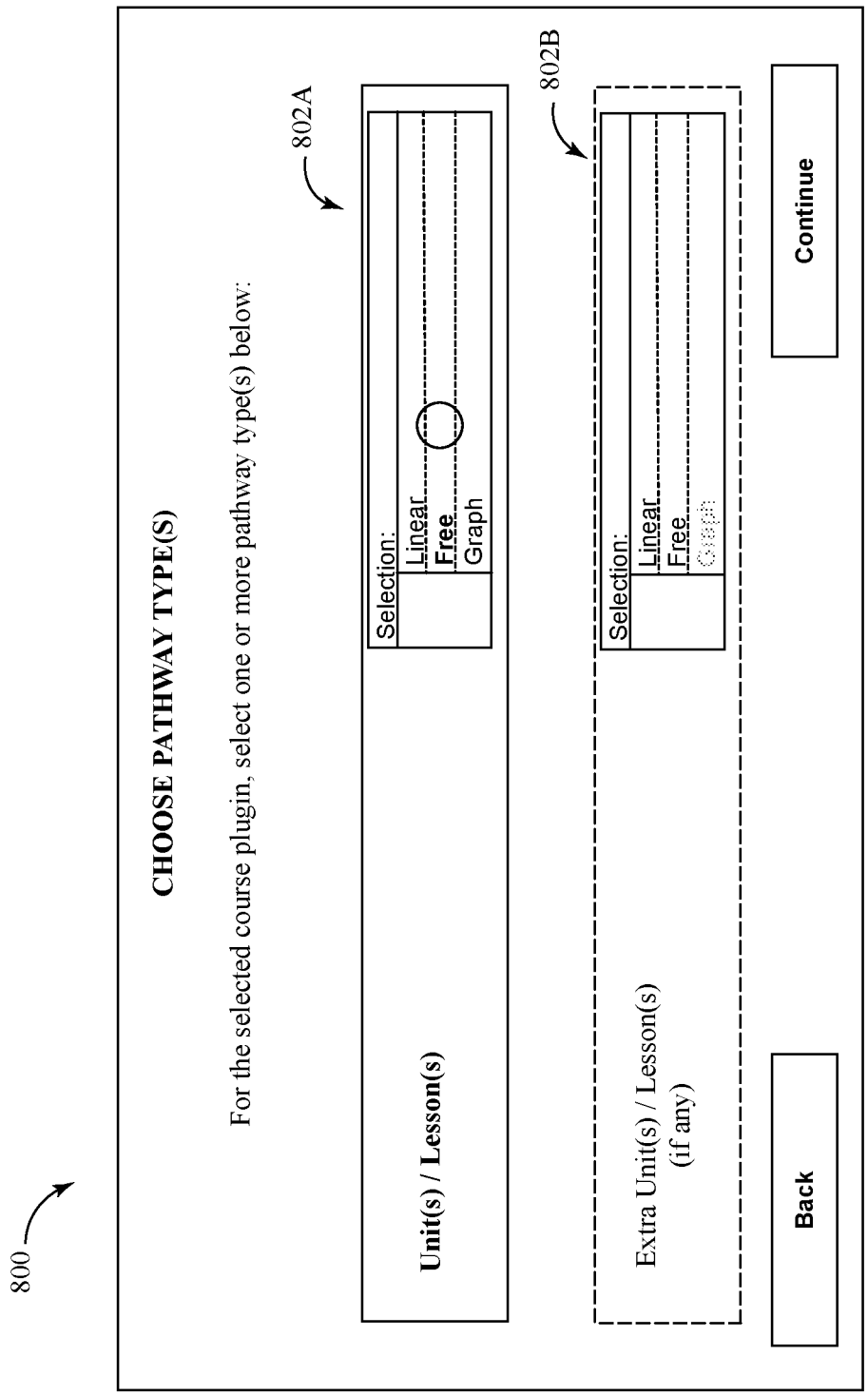
FIG. 8 is a schematic diagram conceptually illustrating an example GUI screen eliciting user input corresponding to a pathway, in accordance with various aspects of the techniques described in this disclosure.

FIG. 8 is a schematic diagram conceptually illustrating an example GUI screen 800 eliciting user input corresponding to a pathway, in accordance with various aspects of the techniques described in this disclosure. For illustration purposes, the example GUI screen 800 is shown as a next GUI screen of the disclosed GUI that may follow the GUI screen 700 described with reference to FIG. 7. In an example, GUI screen 800 may follow a user selection of a first course plugin 708 from the GUI screen 700. In another example, GUI screen 800 may follow a user selection of any other course plugin 710A-N from the GUI screen 700.

In some examples, the content management system 300 may generate GUI screen 800 to elicit user input including a pathway type for a set of lessons or in some instances, for a set of units. The pathway type may include a dropdown menu 802A allowing the user to select a pathway type. The pathway types may include a predetermined set of pathway types corresponding to the selected course. In an illustrative and non-limiting example, the pathway types may include a linear pathway type, a free pathway type, and/or a graph pathway type. The GUI screen 800 may present additional and/or different pathway types depending on the course plugin selection from the GUI screen 700. In some examples, GUI screen 800 may present an additional option 802B for defining additional pathway types. In an example, a course plugin may provide the option for multiple pathway types to apply for navigating courseware components of a course (e.g., lessons, units, etc.).

In an example, the course may include extra lessons or units. A content creator may select from a predefined list of pathway types. In some examples, the GUI screen 800 may include a different number of pathway types for various portions of the course. In an illustrative example, the GUI screen 800 may include options for multiple pathway types for a first set of lessons of the course, and may include only one option for one pathway type for a second set of lessons of the course. While GUI screen 800 shows two sets of lesson(s) or unit(s), the techniques of this disclosure are not so limited, and GUI screen 800 may include more or less unit(s) or lesson(s), for example, based on the selected course.

In an illustrative example, a content creator may provide user input via a field or a menu 802A (e.g., an example GUI component of the GUI screen 800) that indicates a free pathway type for a set of lesson(s) of the course. The content management system 300 may receive the user input indicating the free pathway type for the set of lesson(s) of the course. In such examples, the content management system 300 may generate the GUI to include the GUI screen 800. In such examples, the GUI screen 800 may include a particular set of pathway types for user selection, and may receive the user input, via the GUI, indicating a pathway type to apply to a particular set of lessons (e.g., a first lesson, a first lesson and a second lesson, etc.) of a course.

Figure 9:
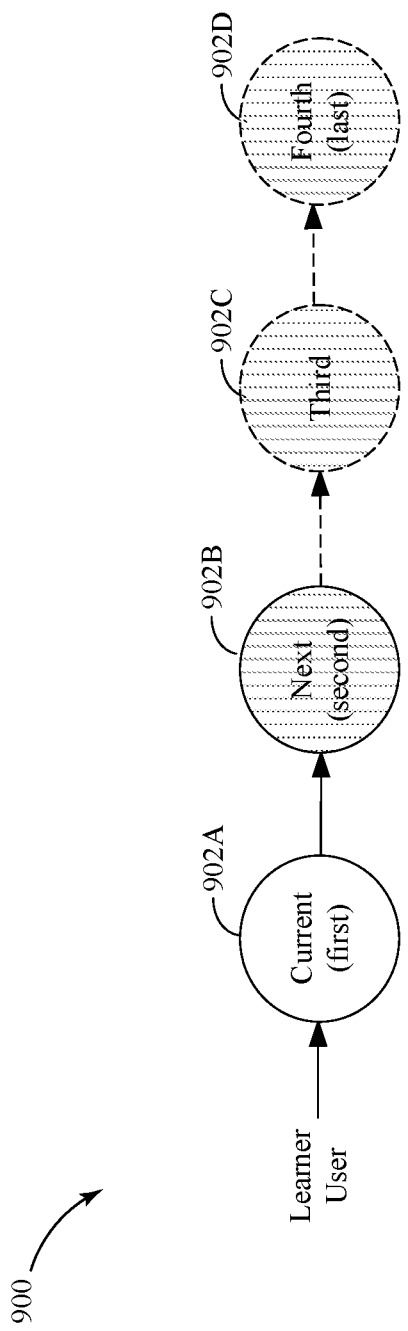
FIG. 9 is a schematic diagram conceptually illustrating an example linear pathway between an example selection of courseware elements, in accordance with various aspects of the techniques described in this disclosure.

FIG. 9 is a schematic diagram conceptually illustrating an example linear pathway 900 between an example selection of courseware elements, in accordance with various aspects of the techniques described in this disclosure. In an example, the courseware element 902A may represent a first lesson. The first courseware element may include a pathway connection 904 between the first courseware element 902A and a next courseware element 902B. In an example, the courseware element 902B may represent a second lesson. A third courseware element 902C (optional) may represent a third lesson, a fourth courseware element 902N (optional) may represent a fourth lesson, and so forth. In such examples, the pathway connection 904 represents a linear pathway that a content creator may define, via the GUI, to define a relationship and/or pathway between various courseware elements of the course.

With the linear pathway architecture, a learner user may start with a first courseware element 902A (e.g., a first lesson) and may need to satisfy a defined condition before proceeding to the next courseware element 902B. In an example, the content management system 300 may impose a user-defined condition that one or more learner users of a class may advance to a second lesson 902B only after satisfying a condition applied to the first lesson 902A. In some examples, the conditions may apply to all learner users in a class, may apply differently for different learner users in a class, and/or may change dynamically based on the performance of one or more learner users in the class. That is, learner users in a class may start along one pathway type and after performing some tasks, the pathway types may change to fit the performance of the individual learner users. This functionality may be enabled with user selection of a particular lesson plugin 710A-710N that elicits user input to define such dynamic pathways for the learning course content.

While described here with reference to lessons for the courseware elements in this example for illustration purposes, the techniques of this disclosure are not so limited. In an example, the courseware elements 902A-902N may correspond to screens, such as when a content creator is defining pathway connections or a pathway type with respect to screens of a lesson or unit.

Figure 10:
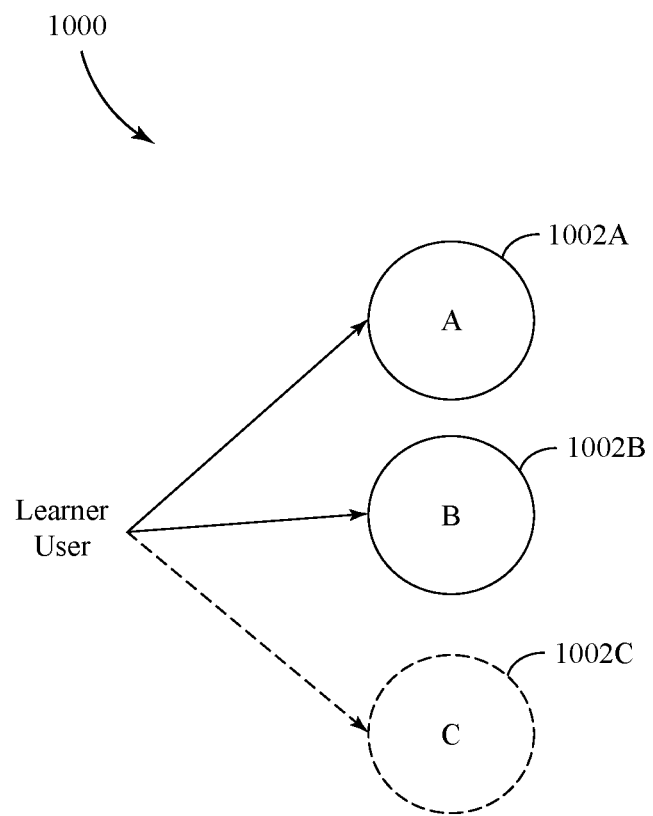
FIG. 10 is a schematic diagram conceptually illustrating an example free pathway between an example selection of courseware elements, in accordance with various aspects of the techniques described in this disclosure.

FIG. 10 is a schematic diagram conceptually illustrating an example free pathway 1000 between an example selection of courseware elements, in accordance with various aspects of the techniques described in this disclosure. In an example, the courseware element 1002A may represent a lesson, the courseware element 1002B may represent a lesson B, and the courseware element 1002C may represent an optional lesson N (e.g., in no particular order). The courseware elements 1002A-N may correspond to, for example, screens of a lesson in other examples. In any case, the courseware elements 1002A-N may flow from a previous courseware element or the course or lesson may initiate with presentation to a learner user of any of the courseware elements 1002A-1002N. With a free pathway architecture, the learner user may freely navigate between any of the courseware elements 1002A-1002N without having to navigate through a first courseware element before proceeding to a next courseware element.

While described here with reference to lessons for the courseware elements in this example for illustration purposes, the techniques of this disclosure are not so limited. In an example, the courseware elements 1002A-1002N may correspond to screens, such as when a content creator is defining pathway connections or a pathway type with respect to screens of a lesson or unit.

Figure 11:
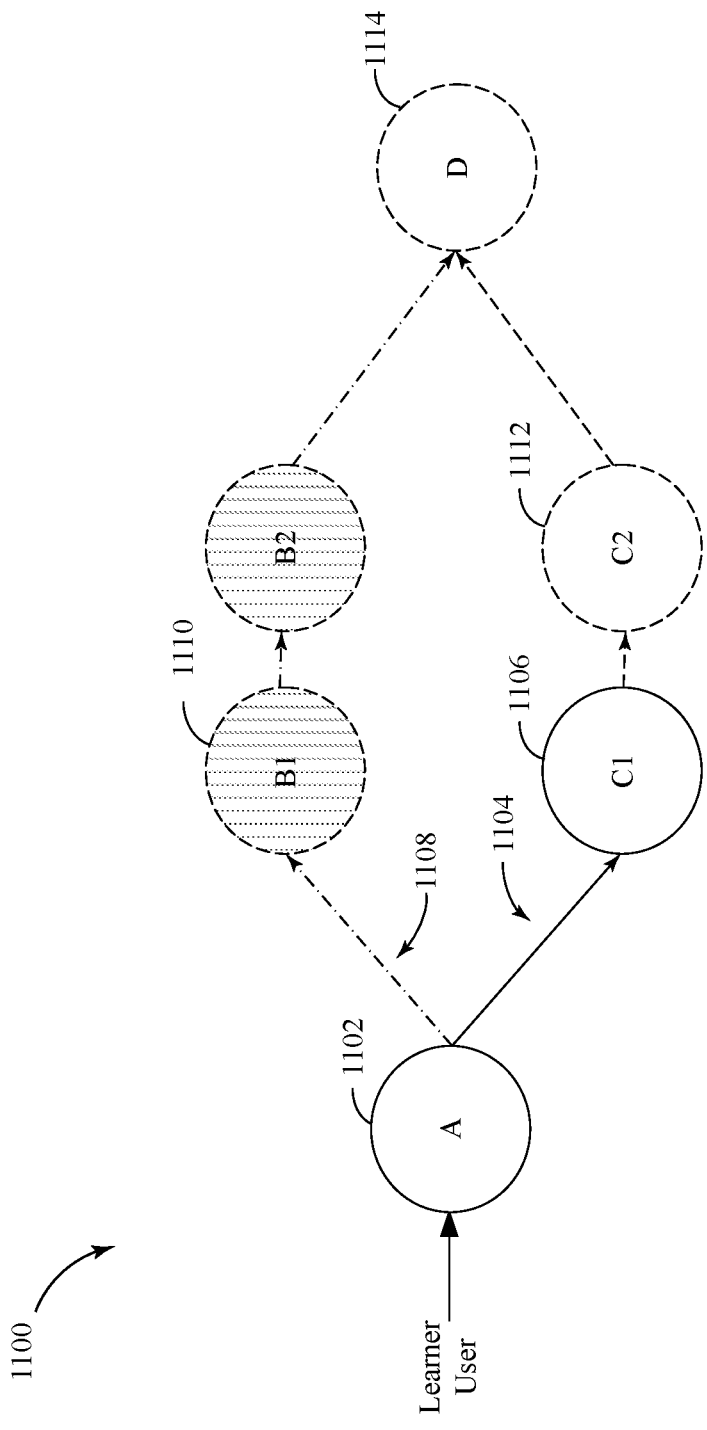
FIG. 11 is a schematic diagram conceptually illustrating an example graph pathway between an example selection of courseware elements, in accordance with various aspects of the techniques described in this disclosure.

FIG. 11 is a schematic diagram conceptually illustrating an example graph pathway 1100 between an example selection of courseware elements, in accordance with various aspects of the techniques described in this disclosure. In an example, the courseware element 1102 may represent a first lesson, the courseware element 1110 may represent a lesson B1 followed by a lesson B2, the courseware element 1106 may represent another lesson C1, the courseware element 1112 may represent another lesson C2, and the courseware element 1114 may represent a downstream lesson N. In an illustrative example, the learner user may advance, in a graph pathway architecture, from courseware element 1102 to either courseware element 1102 along pathway connection 1108 or courseware element 1106 along pathway connection 1104, depending on whether the learner user satisfies a condition relative to pathway connection 1108 or pathway connection 1104. In an example, the learner user may advance from a first lesson A to lesson C1 along pathway connection 1104 when the learner user satisfies, at the first lesson A, a particular score threshold, or may advance from the first lesson A to lesson B1 along pathway connection 1108 when the learner user satisfies, at the first lesson A, a different score threshold.

In some examples, the pathways may converge in a graph pathway architecture, but not necessarily. The graph pathway architecture may have multiple branch points to provide additional pathway connections between courseware elements. While described here with reference to lessons for the courseware elements in this example for illustration purposes, the techniques of this disclosure are not so limited. In an example, the courseware elements 1102-1114 may correspond to screens in a graph pathway architecture, such as when a content creator is defining pathway connections or a pathway type with respect to screens of a lesson or unit.

Figure 12:
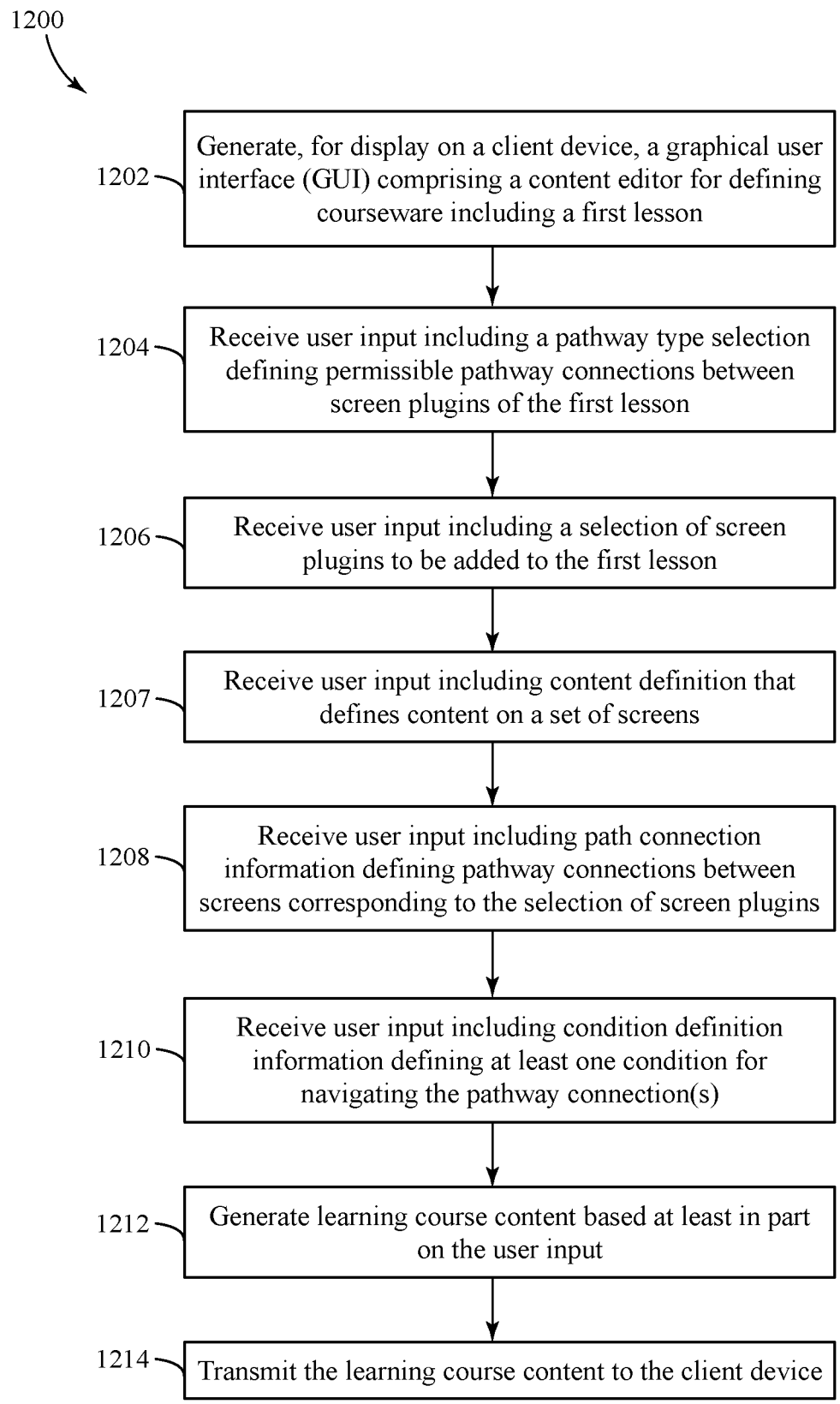
FIG. 12 is a flowchart illustrating an example method and technique for generating learning course content including a lesson element, in accordance with various aspects of the techniques described in this disclosure.

FIG. 12 is a flowchart 1200 illustrating an example method and technique for generating learning course content including a lesson element, in accordance with various aspects of the techniques described in this disclosure. The flowchart of FIG. 12 utilizes various GUI screens of a GUI that are described below with reference to FIGS. 13-17. In some examples, the process 1200 may be carried out by the server(s) 112 illustrated in FIG. 3, e.g., employing circuitry and/or software configured according to the block diagram illustrated in FIG. 2. In some examples, the process 1100 may be carried out by any suitable apparatus or means for carrying out the functions or algorithm described below. Although described with respect to the content management system 300 and particular GUI screens, in some examples, other systems and/or GUI screens are used to implement the flowchart 1200. Additionally, although the blocks of the flowchart 1200 are presented in a sequential manner, in some examples, one or more of the blocks may be performed in a different order than presented, in parallel with another block, or bypassed.

Figure 13:
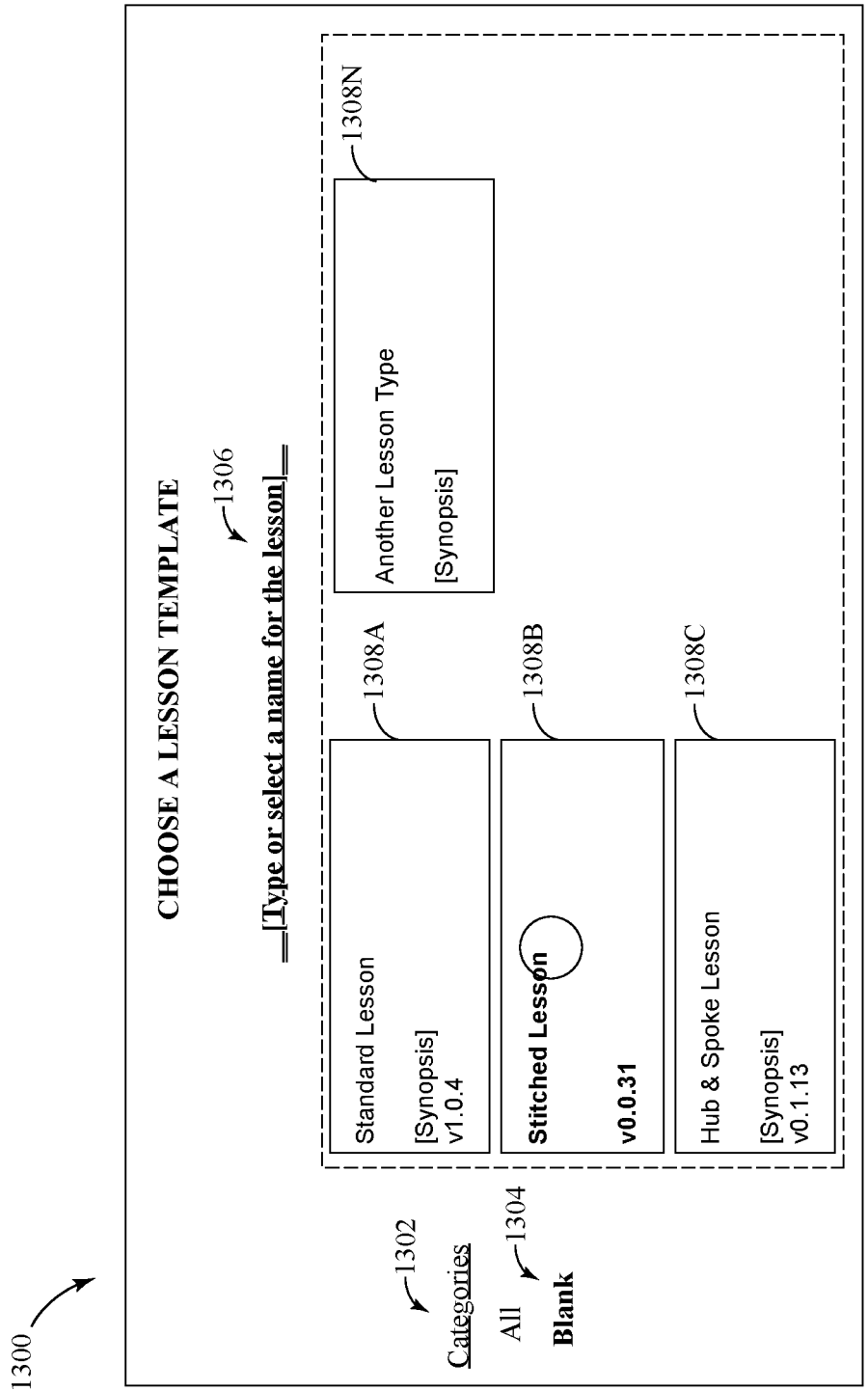
FIG. 13 is a schematic diagram conceptually illustrating an example GUI screen eliciting user input for generating a lesson for the learning course content, in accordance with various aspects of the techniques described in this disclosure.

At block 1202, a server (e.g., one or more of the server(s) 112, also referred to as the server 112) may generate, for display on a client device, a graphical user interface (GUI) comprising a content editor for defining courseware including a first lesson. In an illustrative and non-limiting example, the GUI may include a GUI screen 1300 as shown in FIG. 13. FIG. 13 is a schematic diagram conceptually illustrating an example GUI screen 1300 eliciting user input for generating a lesson for the learning course content, in accordance with various aspects of the techniques described in this disclosure.

The GUI screen 1300 may include one or more category filters 1302 with blank lessons 1304, similar to the blank courses, for example, described with reference to FIG. 7. The GUI screen 1300 may request a lesson name 1306 and illustrate a lesson catalogue. The lesson catalogue may include various lessons for a content creator to select in creating learning course content. In an example, the GUI screen 1300 may include a standard lesson 1308A, a stitched lesson 1308B, a hub & spoke lesson 1308C, or any other lesson type 1308N. The server(s) 112, via processing circuitry, may generate the GUI screen 1300 to include any number of lesson plugins. The server(s) 112 may access the lesson plugins from plugin catalog 304. That is, database(s) 110 may store information corresponding to various lesson plugins. The server(s) may determine a set of lesson plugins 1308A-N to present via the GUI screen 1300 based on a particular course and/or pathway architecture chosen for the course. In an illustrative and non-limiting example, a particular course plugin may cause the server(s) 112 to generate the GUI to include lesson 1308A and 1308B only, or in another example, to include one or more plugins for lesson 1308N and/or other lesson plugins. In an example, a user input may include selection of a first lesson plugin 1308A, a second lesson plugin 1308B, or a combination of the first lesson plugin 1308A and the second lesson plugin 1308B, depending on the content creator's selection via the GUI at GUI screen 1300.

At block 1204, the server (e.g., the server 112) may receive user input including a pathway type selection defining permissible pathway connections between screen plugins of the first lesson. In an example, a first lesson may include a set of screens defined by one or more screen plugin selections. That is, a screen plugin may correspond to one or more screens of a lesson.

Figure 14:
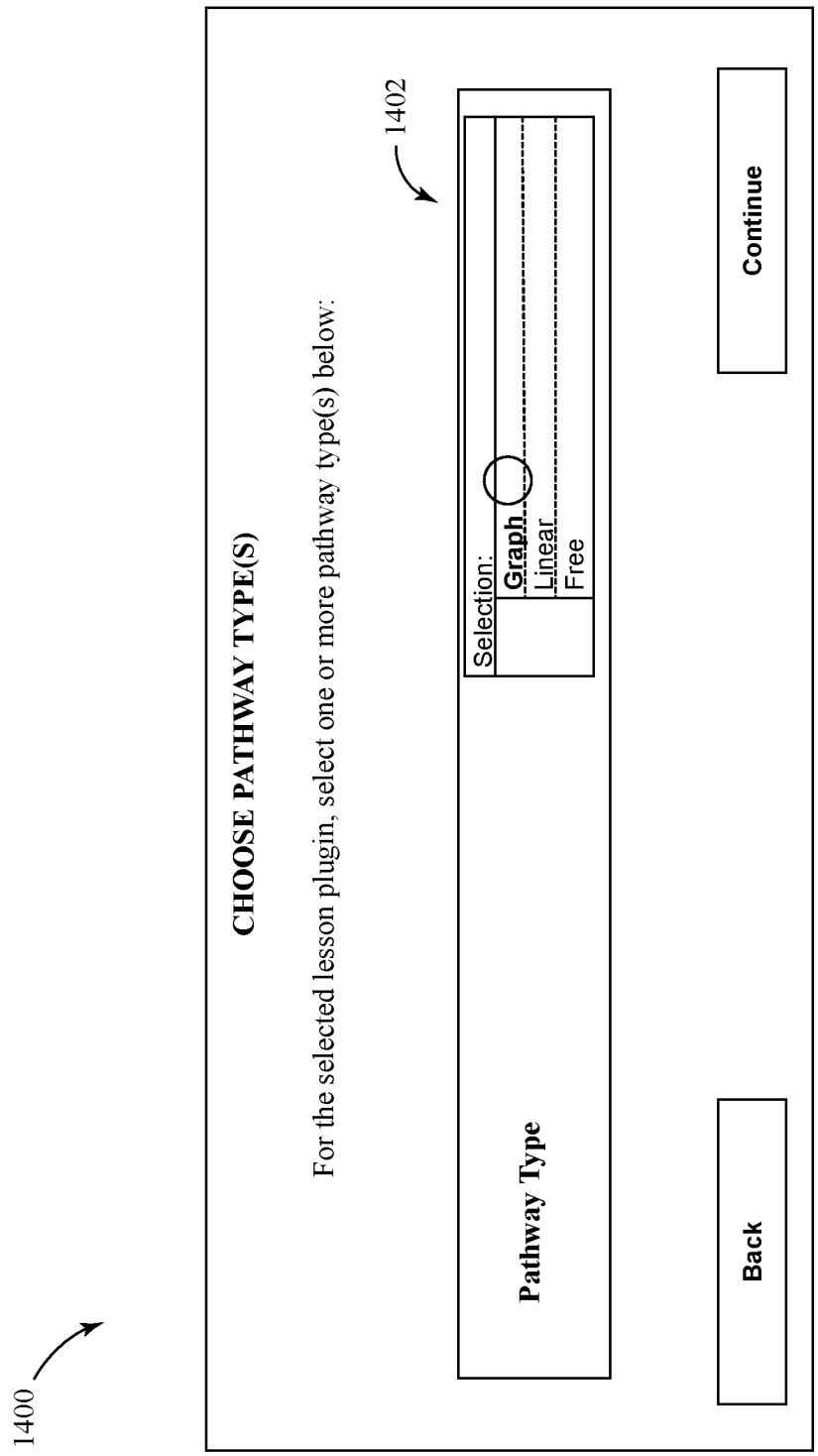
FIG. 14 is a schematic diagram conceptually illustrating an example GUI screen eliciting user input corresponding to a pathway that defines pathway connections between lesson screens, in accordance with various aspects of the techniques described in this disclosure.

In an illustrative and non-limiting example, the GUI may include a GUI screen 1400 as shown in FIG. 14. FIG. 14 is a schematic diagram conceptually illustrating an example GUI screen 1400 eliciting user input corresponding to a pathway that defines pathway connections between lesson screens, in accordance with various aspects of the techniques described in this disclosure.

The GUI screen 1400 may include one or more input fields 1402. A content creator may define a pathway type using the one or more input fields 1402. In an illustrative and non-limiting example, the content creator may provide user input with a pathway type selection of a graph pathway type, as described for example, with reference to FIG. 11, a linear pathway type, as described for example, with reference to FIG. 9, or a free pathway type, as described for example, with reference to FIG. 10. The server(s) 112 may receive the user input with the pathway type selection. The server(s) 112 may thus determine from the user input that the lesson being created is to include a pathway of a specified type that defines permissible pathway connections between screens plugins of the lesson.

Figure 15:
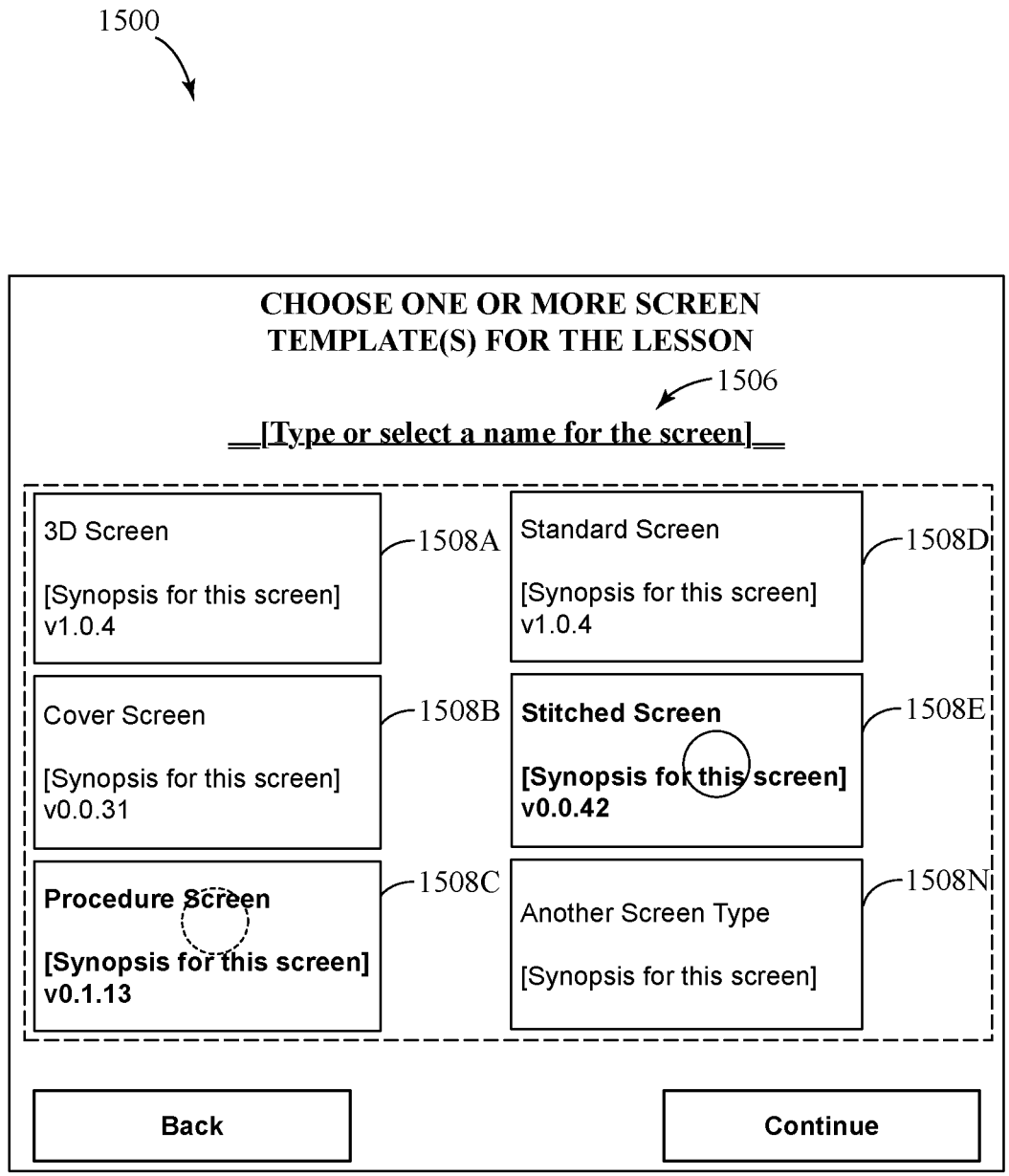
FIG. 15 is a schematic diagram conceptually illustrating an example GUI screen eliciting user input for generating a screen for the learning course content, in accordance with various aspects of the techniques described in this disclosure.

At block 1206, the server (e.g., the server 112) may receive user input including a selection of screen plugins indicating a set of screens to include for the first lesson. In an illustrative and non-limiting example, the GUI may include a GUI screen 1500 as shown in FIG. 15. FIG. 15 is a schematic diagram conceptually illustrating an example GUI screen 1500 eliciting user input for generating a screen for the learning course content, in accordance with various aspects of the techniques described in this disclosure.

The GUI screen 1500 may include one or more screen types 1508A-1508N for a user to select. In an illustrative and non-limiting example, the screen types may include a 3D screen 1508A, a cover screen 1508B, a procedure screen 1508C, a standard screen 1508D, a stitched screen 1508E, and/or any other screen type 1508N. In some examples, a learner user may select multiple screen types when certain screen types are combinable with other screen types. In an example, a learner user may select procedure screen 1508C and stitched screen 1508E. In another example, a learner user may select procedure screen 1508C and 3D screen 1508A. In another example, a learner user may select standard screen 1508D, stitched screen 1508E, and a 3D screen 1508A. In some examples, the server(s) 112 may tailor the screen plugins shown via GUI screen 1500 based at least in part on the user-specified pathway connection type (e.g., free pathway type, linear pathway type, graph pathway type, etc.). In such examples, the server(s) 112 may receive the selection of screen plugins 1508A-1508N to be added to the lesson. In some examples, the learner user may provide a name 1506 for the screen via GUI screen 1500. In such examples, the server(s) 112 may receive a selected name for the selected screen(s) of the lesson.

Figure 16:
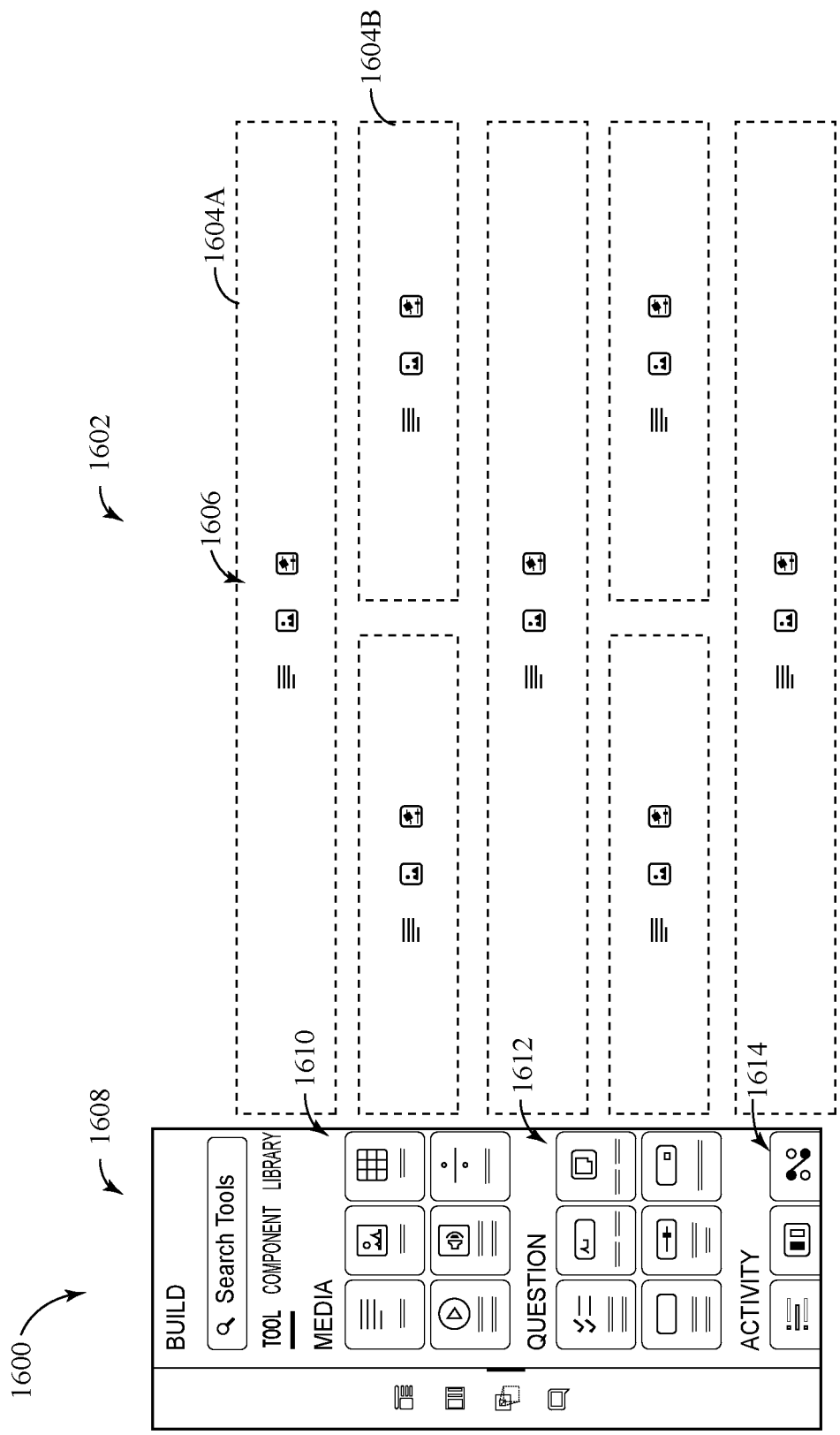
FIG. 16 is a schematic diagram conceptually illustrating an example GUI screen eliciting user input for defining content for a screen of the learning course content, in accordance with various aspects of the techniques described in this disclosure.
Figure 17:
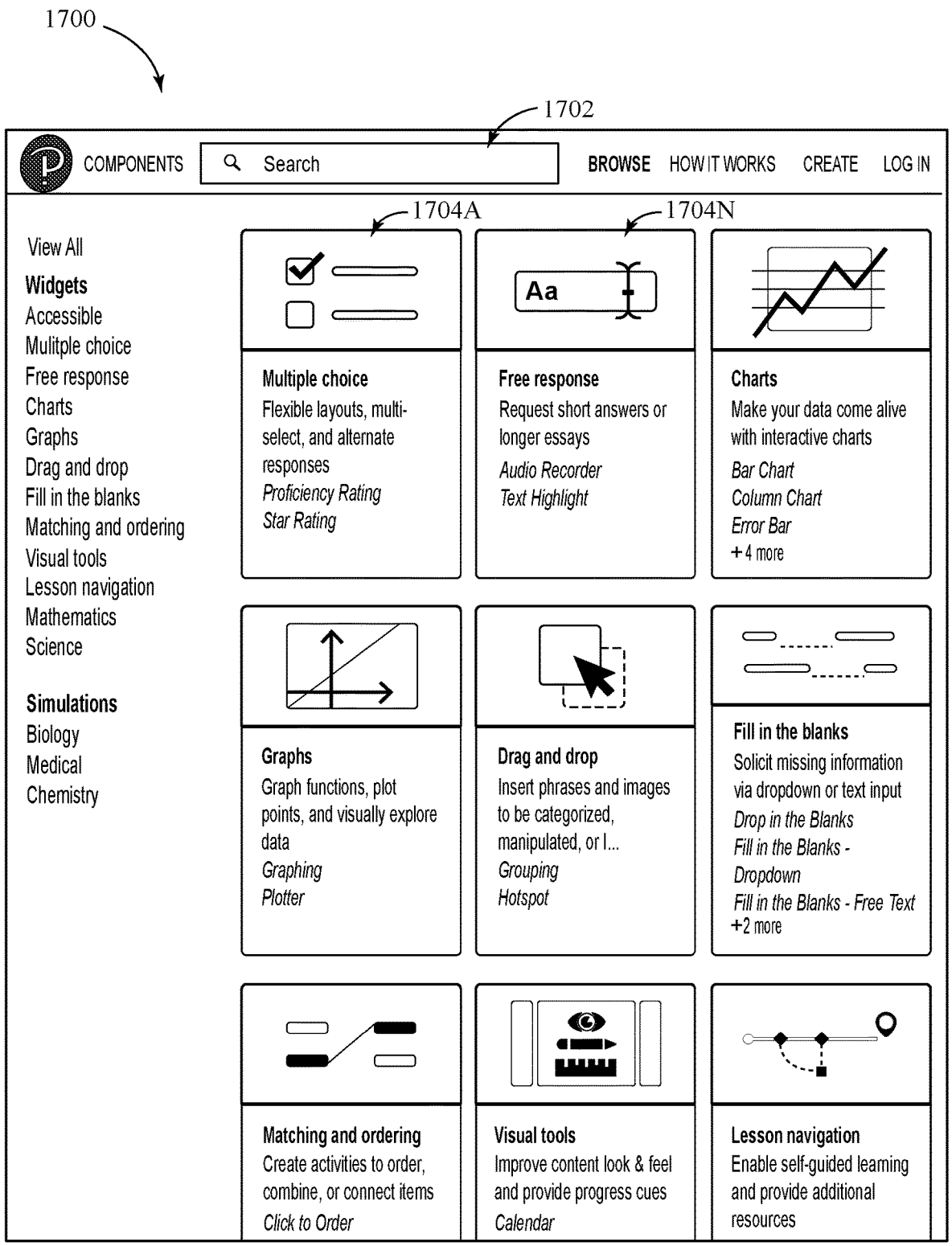
FIG. 17 is a schematic diagram conceptually illustrating an example GUI screen providing an example library catalogue of components to include for a particular screen, in accordance with various aspects of the techniques described in this disclosure.

At block 1207, the server (e.g., the server 112) may receive user input including content definition that defines content on each screen corresponding to the selection of screen plugins. In an illustrative and non-limiting example, the GUI may include one or more of a GUI screen 1600 as shown in FIG. 16, a GUI screen 1700 as shown in FIG. 17, or a combination of GUI screens 1600 and/or 1700. In an example, the server 112 may receive user input via a GUI screen, such as the GUI screen 1600 described with reference to FIG. 16. FIG. 16 is a schematic diagram conceptually illustrating an example GUI screen eliciting user input for defining content for a screen of the learning course content, in accordance with various aspects of the techniques described in this disclosure. The GUI screen 1600 may present to a content creator a first screen 1602 of the screens corresponding to the selection of screen plugins. In such examples, the GUI screen 1600 may provide content (e.g., text, images, videos, assessments, other components, or the like) that the content creator may select to add to the screen 1602. The screen 1602 may include insertable portions 1604A-1604B defining particular areas or sections within the screen in which to add content.

In some examples, a content panel 1608 is provided on the GUI 1600. The content panel 1608 enables selection of pre-defined components for addition to the screen 1602. The pre-defined components may include, for example, media components 1610 (e.g., text, image, table, video player, audio player, or spacer); question or assessment components 1612 (e.g., multiple choice question(s), short text question(s), long text question(s), number input question(s), number slider question(s), dropdown menu question(s)); activity components 1614 (e.g., matching activities, grouping activities, ordering activities); among other components. The pre-defined components may provide a template, and the content creator may then customize the component by adding in a particular text, image, video, or the like when adding the component to the screen 1602.

Additionally or alternatively, the server 112 may receive user input via a GUI screen, such as the GUI screen 1700 described with reference to FIG. 17. FIG. 17 is a schematic diagram conceptually illustrating an example GUI screen providing an example library catalogue of components to include for a particular screen, in accordance with various aspects of the techniques described in this disclosure. In such examples, the content definition received in block 1207 may include a selection of a content component 1704A-1704N. The content definition may indicate a selection of a content component to include on a particular screen of the lesson. In some instances, a content creator may search a searchable database via search field 1702. The content creator may find any content plugin (e.g., a multiple-choice plugin 1704A, a free response plugin 1704N, etc.) to include at a given location, such as the insertable portion 1604A of FIG. 16. In some examples, the GUI screen 1700 provides a more complete library or a library with additional search and/or navigation functions than provided by the content panel 1608 of FIG. 16.

In some examples, the content management system 300 may be extended to draw conclusions based on the aggregated data about learner user behavior. In such examples, the content management system 300 may use this learner user behavior data to demonstrate patterns for a particular learner user and/or for all learner users utilizing content management system 300.

As a non-limiting example, the content management system 300 may utilize aggregated data and one or more machine learning (ML) models and/or artificial intelligence (AI) algorithms to analyze behavior indicators, such as click events or user interactions in order to determine that a current user is not engaging with the presented content. In an example, the content management system 300 may determine that a particular set of actions attributable to a learner user indicate that the learner user is trying to move through material quickly. In an illustrative example, the material may include a 30-minute YouTube video lecture in which a content creator expects to have a great reception from the learner users. Yet, the learner users may be observed to be attempting to move through the material more quickly than the content creator anticipated, as indicated, for example, by the learner users either stopping the video or skipping through at the 5-minute mark of the video, for example. The content management system 300 may generate a recommendation based on this data. In an illustrative and non-limiting example, the recommendation may include a suggestion that the video be broken up or presented differently.

In some examples, the content management system 300 may utilize the data and one or more ML models and/or AI algorithms to detect engagement. In an example, the content management system 300 may determine that users are comprehending and/or engaging with the material. In such examples, the content management system 300 may recommend similar content in future applications, such as those generated by the content creator.

In some examples, the content management system 300 may include collaboration elements. As a non-limiting example, the content management system 300 may identify conditions triggered in a classroom environment, so that data may be retrieved from certain user devices (e.g., a set of user devices the content management system 300 detects, or determines to be, within the classroom environment). In such examples, the content management system 300 may, in turn, transmit, to an instructor device, data retrieved from the set of user devices. In this non-limiting example scenario, an instructor may then utilize the data to drive content displayed in the class, in-class quiz questions, etc. User devices may then respond to quiz questions, providing feedback and so forth. In such examples, the content management system 300 may receive user input from a user device including one or more responses and/or feedback. In some examples, the content management system 300 may store the user input in database(s) 110. In another example, the content management system 300 may transfer, to a computing system 200 (e.g., an instructor device), a set of data items corresponding to the user input.

Collaboration may further apply to non-limiting example scenarios in which there are multiple content creators using the same tools and environments within the same system (e.g., the content management system 300) to generate learning course content for a shared learner user experience in a common course, for example.

In some examples, the disclosed graphical user interface (GUI) and the content management system 300 represent further improvements, relative to the prior art, in the realm of, for example, social learning and/or collaboration between users, to name but a few examples. In this example scenario, learner users may also benefit from the collaborative environment, so that learner users in the same course may collaborate on the same material, for example, working physically on the same screen, or on different simulations on plugins. In such examples, the content management system 300 may facilitate a threading together of a set of plugins (e.g., in a pathway architecture) in such a way as to build collaborative experiences.

Once the content creator has selected a chosen set of plugins, and organized them within a pathway architecture in such a way that the chosen set of plugins may present a customized experience for one or more learner users, the content management system 300 may then display the learning course content to the learner users according to the pathway architecture and selection of screens.

In some examples, the content management system 300, via the plugin system and associated widgets, may select data, possibly from the database(s) 110 as disclosed above, related to user responses, user history, user preferences, user performance, etc.

In some examples, the content management system 300 may engage in sandboxing activity for security reasons. In an example, the content management system 300 may secure user data (e.g., a set of user data items). When the content management system 300 has secured the user data, the content management system 300 may communicate a set of learner user progress metrics and/or a set of learner user scoring metrics. Similarly, the content management system 300 may be configured to save learner user states (e.g., learning states) and communicate/provide data to be stored in the database and utilized within plugins to know how to best respond to a set of learner user interaction(s) within those plugins and so forth.

At block 1208, the server (e.g., the server 112) may receive user input including pathway connection information. The pathway connection information may define a set of pathway connections between screens. That is, the pathway connection information may define a set of pathway connections between screens corresponding to the selection of screen plugins. In some examples, the screen plugins (e.g., selected via GUI screen 1500) may correspond to a set of screens for the lesson. In an example, the lesson may include a set of screens configured according to the selected screen plugin or plugins (e.g., stitched screen 1508E, standard screen 1508D, etc.).

In an illustrative example, the lesson may include a first screen, a second screen, and a third screen that correspond to a stitched screen plugin as indicated by the selection of screen plugins (from the previous block). In addition, a GUI screen may elicit user input for a number of pathway connections between the first screen, the second screen, and the third screen. In such instances, a content creator would define the set of pathway connections between screens according to the pathway type chosen for the screens. For example, the pathway connections that a content creator may select, and/or that the GUI screen may provide as selectable options, may be constrained to those pathway connections defined as permissible for the pathway type chosen (in block 1204). For example, when a free pathway was chosen based on the pathway type selection, the content creator may define pathway connections between any screen of first, second, and third screens. These defined pathway connections may result in the first screen, the second screen, and the third screen arranged in a free pathway. Because the first, second, and third screens correspond to the stitched screen plugin, the screens may further be provided in a stitched screen configuration, as described in further detail below. In another example in which a linear pathway was chosen based on the pathway type selection, the content creator may be limited to defining a single pathway connection to each screen and a single pathway from each screen, to result in a linear pathway (see, e.g., FIG. 9). Accordingly, the user input may define pathway connections between the first screen and the second screen and third screen in accordance with the pathway type. In this way, the server(s) 112 may receive the user input including the pathway connection information. The server (e.g., the server(s) 112) may determine from the user input a set of pathway connections that link a number of screens selected of one or more screen plugin types.

Figure 18:
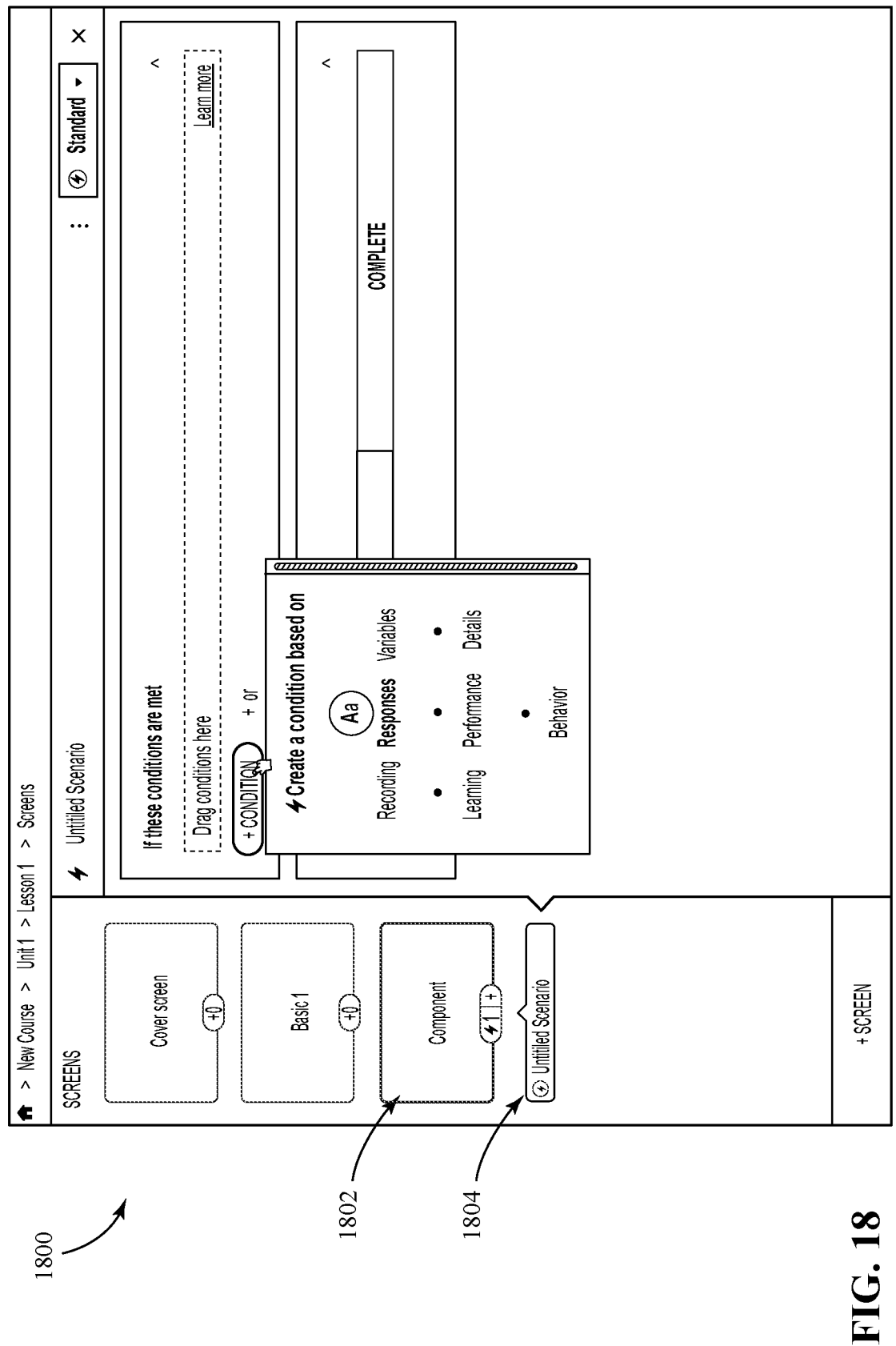
FIG. 18 is a schematic diagram conceptually illustrating an example GUI screen eliciting user input for defining conditions for imposing system controls over navigation of the learning course content, in accordance with various aspects of the techniques described in this disclosure.

At block 1210, the server (e.g., the server 112) may receive user input including condition definition information defining at least one condition for navigating the pathway connection(s). In an illustrative and non-limiting example, the GUI may include a GUI screen 1800 as shown in FIG. 18. The server 112 may receive user input via a GUI screen, such as the GUI screen 1800. FIG. 18 is a schematic diagram conceptually illustrating an example GUI screen eliciting user input for defining conditions for imposing system controls over navigation of the learning course content, in accordance with various aspects of the techniques described in this disclosure. In such examples, the GUI screen 1800 may elicit user input defining conditions for moving between various screens along the pathway connections. Accordingly, the server 112 may receive user input including condition information for controlling navigation through screens of a lesson. For example, in a lesson with a first, second, and third screen in a linear pathway where the first screen precedes the second screen, and the second screen precedes the third screen, the condition definition information may define the conditions that are to be satisfied for a learner user to progress from the first screen to the second screen, and then from the second screen to the third screen. The conditions may take various forms. For example, a condition to progress from the first screen to the second screen may be that a learner user correctly answers a question on the first screen, correctly answers a certain percentage of questions on the first screen, the client device 106 plays an entire video on the first screen, a timer elapses, among others and so forth.

As described below, the server may receive the condition information as part of scenario information, where a scenario 1804 may be added to any one or more screens (e.g., screen 1802). The server 112 may receive the scenario information to define a condition that, when met, results in a particular action (e.g., progress learner user to next screen, revert learner user to previous screen, remove certain content from screen 1802, etc.). In any case, the server 112 may determine from the user input the condition definition information that defines condition(s) for navigating the pathway connections between screens of the lesson.

In some instances, the server 112 may further determine from the user input condition definition information that defines condition(s) for navigating pathway connections between content items (e.g., between multiple choice questions) that correspond to user-selected content component plugins for a screen of the lesson. In an example, the server 112 may determine, from the user input defining conditions, that when a learner user answers a particular multiple-choice question incorrectly, the server 112 is to activate a video plugin in the user's viewing window explaining a concept tied to the question answered incorrectly. In another example, the server 112 may determine, from the user input defining conditions, that when a learner user answers a particular multiple-choice question correctly, the server 112 is to activate a next screen of the lesson such that the learner user may advance to the next screen of the lesson in response to the learner user answering that question correctly.

In an illustrative and non-limiting example in the case of a linear pathway, the condition definition information may specify, in one example, that when the learner user has scrolled down 75% of the way through a first screen, the server 112 may cause a stitching of the next screen in the linear sequence. In another illustrative and non-limiting example in the case of a graph pathway, the condition definition information may be more elaborate. In an example, the condition definition information may specify that when a learner user answers a question correctly, and the learner user has scrolled down 75% of the way, the server 112 may cause a second screen to pull up and stitch to a first screen, as opposed to stitching the first screen to a third screen that server 112 would pull up and stitch when the learner user answers the question incorrectly. While a few examples are given for condition definition information, the techniques of this disclosure are not so limited and the condition definition information may take on many different forms as would be understood by those skilled in the art.

At block 1212, the server (e.g., the server 112) may then generate learning course content based at least in part on the user input. In some examples, the server(s) 112 may receive the user input in multiple parts, or may receive the user input in one part. In any case, the server(s) 112 may synthesize the user input to generate the learning course content based on the user input, for example, received pursuant to blocks 1204-1210. That is, the user input may include one or more of the user input described with reference to blocks 1204-1210. In some examples, the GUI screens described with respect to blocks 1206-1210 may be iteratively generated and used to elicit user input multiple times to define the screens, pathway connections, content definition, and condition definition information for the first lesson. Further, the iterations may not occur in the sequential order illustrated in FIG. 12. For example, the GUI screen 1500 may be generated and used to elicit user input multiple times to define each screen of the first lesson before the content definition, pathway connections, and/or condition definition information is elicited from the user.

Accordingly, the server may generate the learning course content based on user input the server 112 receives via GUI screens described with reference to blocks 1204-1210 or via a combination of GUI screens described with reference to blocks 1204-1210, such as in a single GUI screen that allows server 112 to receive the user input described with reference to blocks 1204-1210. In some examples, generating the learning course content includes the server 112 storing the first lesson, as defined based on the user input received in blocks 1204-1210, in a memory. In some embodiments, the learning course content generated in block 1212 includes one or more additional lessons (e.g., defined by user input, such as provided in blocks 1204-1210) in addition to the first lesson.

At block 1214, the server (e.g., the server 112) may transmit the learning course content to the client device. In an example, the server(s) 112 may transmit the learning course content to client device 106A, client device 106B of FIG. 1, and/or any other client device. In such examples, server(s) 112 may transmit the learning course content via the communication network 120. In another example, the server(s) 112 may update a window with the learning course content in real-time as a content creator is creating the learning course content in a what you see is what you get (WYSIWYG) editor. That is, the server(s) 112 may receive the user input and output in real-time the learning course content. This, for example, would show a content creator on a client device 106 the learning course content that the content creator is creating via the user input.

Stitched Screen Configuration

Figure 19:
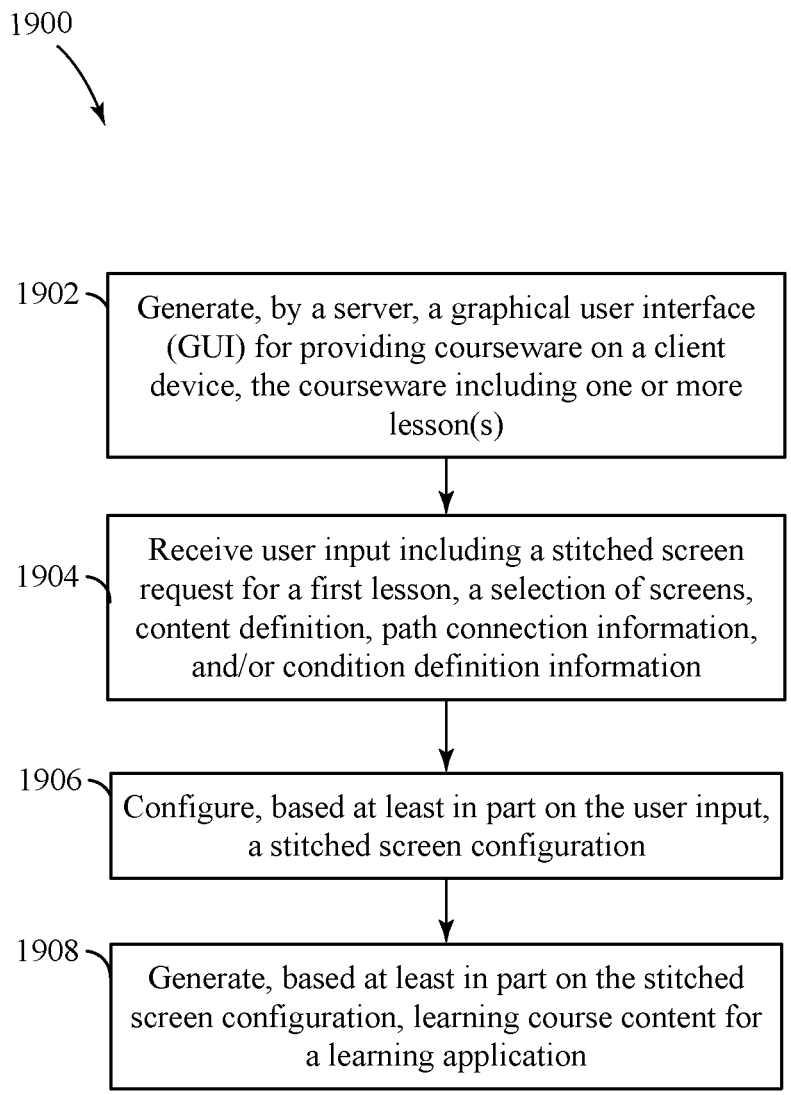
FIG. 19 is a flowchart illustrating an example method and technique for utilizing stitched screens in an example design for the learning course content, in accordance with various aspects of the techniques described in this disclosure.

FIG. 19 is a flowchart 1900 illustrating an example method and technique for generating learning course content including a stitched screen configuration, in accordance with various aspects of the techniques described in this disclosure. In some examples, the process 1900 may be carried out by the server(s) 112 illustrated in FIG. 3, e.g., employing circuitry and/or software configured according to the block diagram illustrated in FIG. 2. In some examples, the process 1900 may be carried out by any suitable apparatus or means for carrying out the functions or algorithm described below. Although described with respect to the content management system 300 and particular GUI screens, in some examples, other systems and/or GUI screens are used to implement the flowchart 1900. Additionally, although the blocks of the flowchart 1900 are presented in a sequential manner, in some examples, one or more of the blocks may be performed in a different order than presented, in parallel with another block, or bypassed.

At block 1902, a server (e.g., one or more of the server(s) 112, also referred to as the server 112) generates a graphical user interface (GUI) for providing courseware on a client device (e.g., a client device 106), where the courseware includes one or more lessons including at least a first lesson. For example, the server 112 may transmit instructions and data to a browser or other client software on the client 106 to generate and/or cause the display of the GUI on a display of the client device 106. An example of GUI screens collectively forming an example of such a GUI is provided in the various figures herein, including FIGS. 6-8, 13-18, etc.

At block 1904, the server (e.g., the server 112) receives user input via the GUI and over a communication network (e.g., the network 120). The user input includes a stitched screen request for the first lesson, a selection of screens that indicates the screens to be added to the first lesson, content definition defining content on each screen of the screens, pathway connection information defining pathway connections between the screens, and/or condition definition information defining at least one condition for navigating between the screens along the pathway connections. For example, to receive the stitched screen request, the GUI generated by the server 112 as part of block 1902 may cause the display of a GUI screen 1300 on the client device 106, the display of the GUI screen 1500 on the client device 106, or another GUI screen or component.

In the case of the GUI screen 1300, the client device 106 may receive selection of the stitched lesson 1308B by a user. The client device 106 may, in turn, transmit an indication of this selection to the server 112 over the communication network 120. The server may receive and interpret this indication as a stitched screen request. In the case of the GUI screen 1500 being displayed on the client device 106, the client device 106 may receive selection of the stitched screen 1508E by a user. The client device 106 may, in turn, transmit an indication of this selection to the server 112 over the communication network 120. The server may receive and interpret this indication as a stitched screen request. In the case of another GUI screen or GUI component being displayed on the client device 106, the client device 106 may receive user input that indicates a request for a stitched screen in another form, such as by checking box, using a drop-down list, or the like to select a stitched screen format for two or more screens. Regardless of the particular mechanism to receive the stitched screen request, the request indicates that the first lesson is to include a stitched screen configuration, as described further below.

As noted, at block 1904, the server 112 may also receive the selection of screens, via the GUI, that indicates the screens to be added to the first lesson. In an example, the server 112 may receive a selection of at least two screens to be included in the first lesson. The server 112 may receive user input indicating a number of screens to include in a lesson upon indicating a type of screen plugin. In an illustrative example, the server 112 may determine from the user input that the lesson is to include a set of screens in a stitched screen configuration, and that the number of screens is to include a variable amount that includes at least two screens for the set of screens of the lesson. In some examples, this portion of block 1904 related to screen selection is implemented using similar techniques as described above with respect to block 1206 of FIG. 12.

As noted, at block 1904, the server 112 may also receive content definition, via the GUI, defining content on each of the screens selected for the lesson, or for a set of screens within the lesson. In an example, the server 112 may receive content definition including one or more locations on a screen, as well as a set of content components to include on the screen at the one or more locations. In an illustrative example, the server 112 may receive content definition defining content, such as a content plugin to include at insertable portions 1604A-1604B of FIG. 16. In an illustrative and non-limiting example, the server 112 may receive content definition defining a video player located at portion 1604B, for example, with text content defined via the user input at portion 1604A. In some examples, this portion of block 1904 related to content definition is implemented using similar techniques as described above with respect to block 1207 of FIG. 12.

Figure 20:
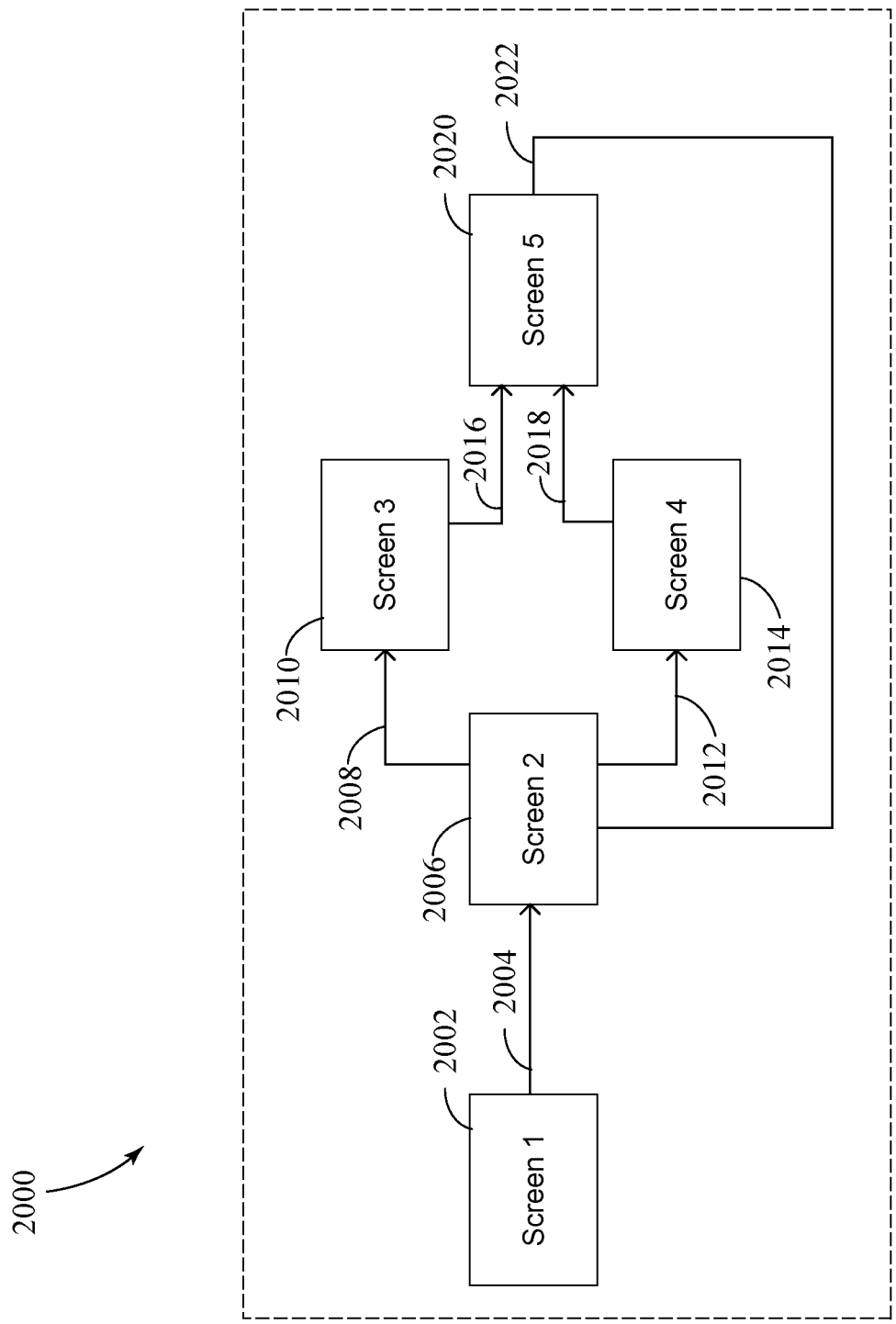
FIG. 20 is a block diagram conceptually illustrating an example GUI screen for defining pathway connections between screens of the lesson, in accordance with various aspects of the techniques described in this disclosure.

As noted, at block 1904, the server 112 may also receive pathway connection information, via the GUI, defining pathway connections between the screens. In an example, the pathway connections may include a relationship between various screens of a lesson. In an illustrative example, FIG. 20 is a block diagram conceptually illustrating an example GUI screen 2000 for defining pathway connections between screens of the lesson, in accordance with various aspects of the techniques described in this disclosure. In such examples, the server 112 may determine from the user input to provide a first pathway connection 2004 from a first screen 2002 to a second screen 2006. In addition, the server 112 may determine from the user input to provide a second pathway connection 2008 between the second screen 2006 and a third screen 2010. In addition, the server 112 may determine from the user input to provide a third pathway connection 2012 between the second screen 2006 and a fourth screen 2014. In such examples, the server 112 may determine from the user input to monitor a defined scenario to determine whether to engage the second pathway connection 2008 or to engage the third pathway connection 2012. In addition, the server 112 may determine from the user input to provide a pathway connection 2016 and a pathway connection 2018 to arrive at a fifth screen 2020 and may determine to provide an optional seventh pathway connection 2022 that routes back to the second screen 2006.

In such examples, the server 112 may receive the pathway connection information, via the GUI, with the pathway connection information defining pathway connections between the screens, such as the illustrative example described with reference to FIG. 20. The user input may include pathway connection information for each pathway connection illustrated in FIG. 20, for example. In another example, the user input may include pathway connection information for a subset of the pathway connections. In such examples, server 112 may define the remaining pathway connections automatically, such as through deployment of a machine learning model or artificial intelligence algorithm, in some examples. In some examples, this portion of block 1904 related to defining pathway connections is implemented using similar techniques as described above with respect to block 1208 of FIG. 12.

As noted, at block 1904, the server 112 may also receive condition definition information, via the GUI, defining at least one condition for navigating between the screens along the pathway connections. In an example, the server 112 may receive conditions (e.g., triggers) that modify or dictate a route of a learner user as the learner user navigates from one screen of a lesson to a next screen of the lesson. In an illustrative example, the condition definition information may provide a condition that, when met at the second screen 2006, results in the server 112 providing a third screen 2010, and that, when another condition is met at the second screen 2006, results in the server 112 providing a fourth screen 2014.

While described with reference to FIG. 20, the techniques of this disclosure are not so limited. In an example, FIG. 20 illustrates a graph pathway type. However, the lesson may include a linear pathway type instead in some examples, and thus, the condition definition may cause the server 112 to restrict a learner user from navigating to a second screen 2006 of the lesson until the learner user has satisfied a particular condition at a first screen 2002. In such examples, the learner user may navigate from screen 2002 to screen 2006 along a linear pathway 2004 pursuant to a user-defined condition that the learner user is to satisfy at screen 2002 to proceed to screen 2006 of the lesson. In some examples, this portion of block 1904 related to receiving condition definition information is implemented using similar techniques as described above with respect to block 1210 of FIG. 12.

At block 1906, the server 112 may configure, based at least in part on the user input, a stitched screen configuration. In such examples, the server 112 may generate the stitched screen configuration to include a selection of screens and condition definition information for the selection of screens. In some examples, the stitched screen configuration may include a dynamic file that, when executed, causes a dynamic stitching of screens together in real-time as the screens are being viewed on a client device 106. In such examples, the stitched screen configuration may include a dynamic file that defines which screens follow and precede other screens and what conditions link the screens so as to provide the pathway connections between screens. Accordingly, the stitched screen configuration in a dynamic file may, in real-time, select a particular screen to present on a client device 106 responsive to user input in real-time (e.g., a user scroll request, a user's answer to a question, etc.). In another example, the stitched screen configuration may include a static file that preconfigures the screens into a stitched screen configuration that may not necessarily respond to user input in real-time. In some examples, configuring the screens in the stitched screen configuration includes setting a stitched screen indicator or parameter to a value (e.g., "1" or "TRUE") for each of these screens to indicate the server 112 is to stitch certain screens together as the server 112 generates the screens for display. Screens that are not configured to be stitched may have the stitched screen indicator or parameter set to another value (e.g., a "0" or "FALSE") to indicate that the screens should not be stitched.

At block 1908, the server 112 may generate, based at least in part on the stitched screen configuration, one or more files with learning course content for a learning application. In such examples, the learning course content may include the stitched screen configuration. In some examples, generating the learning course content includes the server 112 storing the first lesson, as defined based on the user input received in block 1904 and the stitched screen configuration, in a memory. In some examples, the server 112 may transmit the learning course content for the learning application to one or more client device(s) 106. In an example, the server 112 may transmit the learning course content via the communication network 120.

Figure 21:
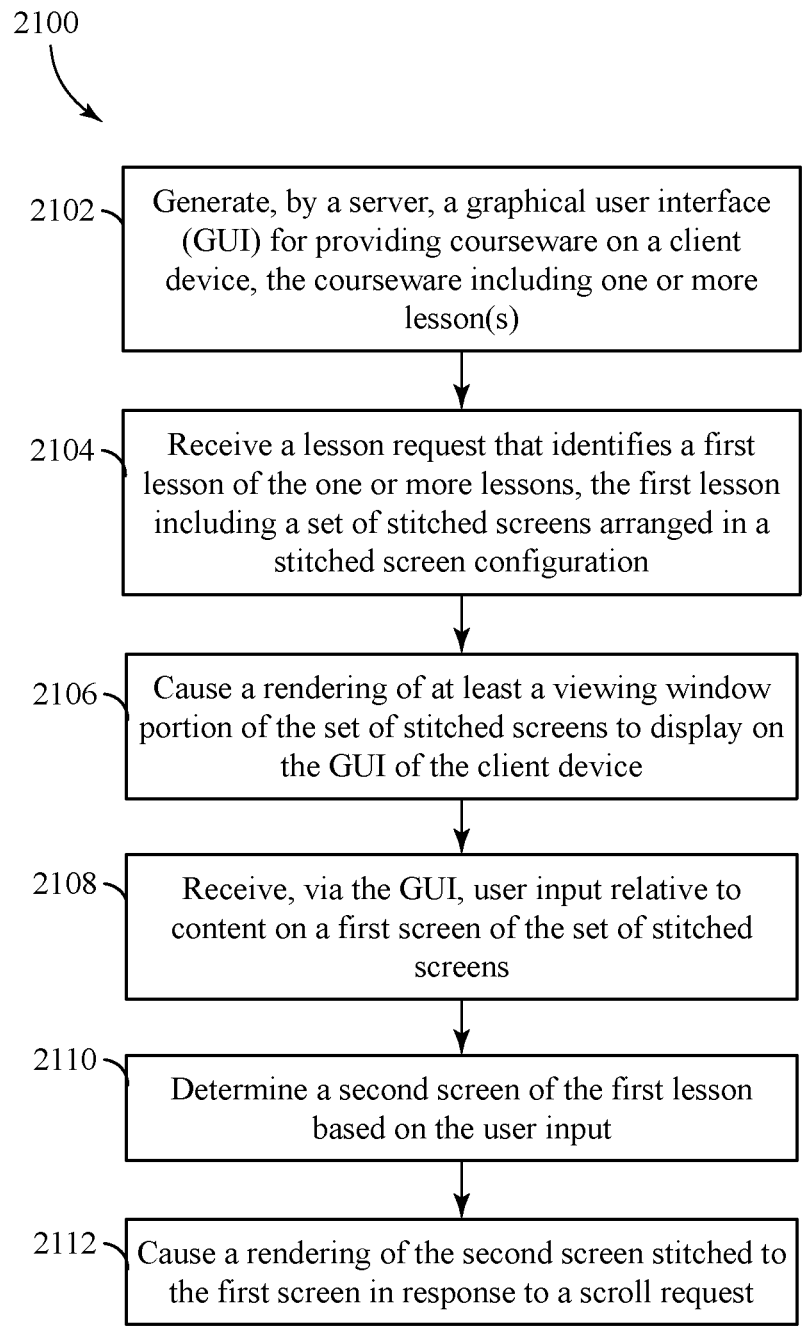
FIG. 21 is a flowchart illustrating an example method and technique for presenting stitched screens in an example stitched screen configuration for the learning course content, in accordance with various aspects of the techniques described in this disclosure.

FIG. 21 is a flowchart 2100 illustrating an example method and technique for generating learning course content including a stitched screen configuration, in accordance with various aspects of the techniques described in this disclosure. In some examples, the process 2100 may be carried out by the server(s) 112 illustrated in FIG. 3, e.g., employing circuitry and/or software configured according to the block diagram illustrated in FIG. 2. In some examples, the process 2100 may be carried out by any suitable apparatus or means for carrying out the functions or algorithm described below. Although described with respect to the content management system 300 and particular GUI screens, in some examples, other systems and/or GUI screens are used to implement the flowchart 2100. Additionally, although the blocks of the flowchart 2100 are presented in a sequential manner, in some examples, one or more of the blocks may be performed in a different order than presented, in parallel with another block, or bypassed. The flowchart 2100, for illustration purposes, is described with reference to the GUI screens described with reference to FIG. 20 (described above) and FIGS. 22, and 23, which are briefly described below before returning to the discussion of the flowchart 2100 of FIG. 21.

Figure 22:
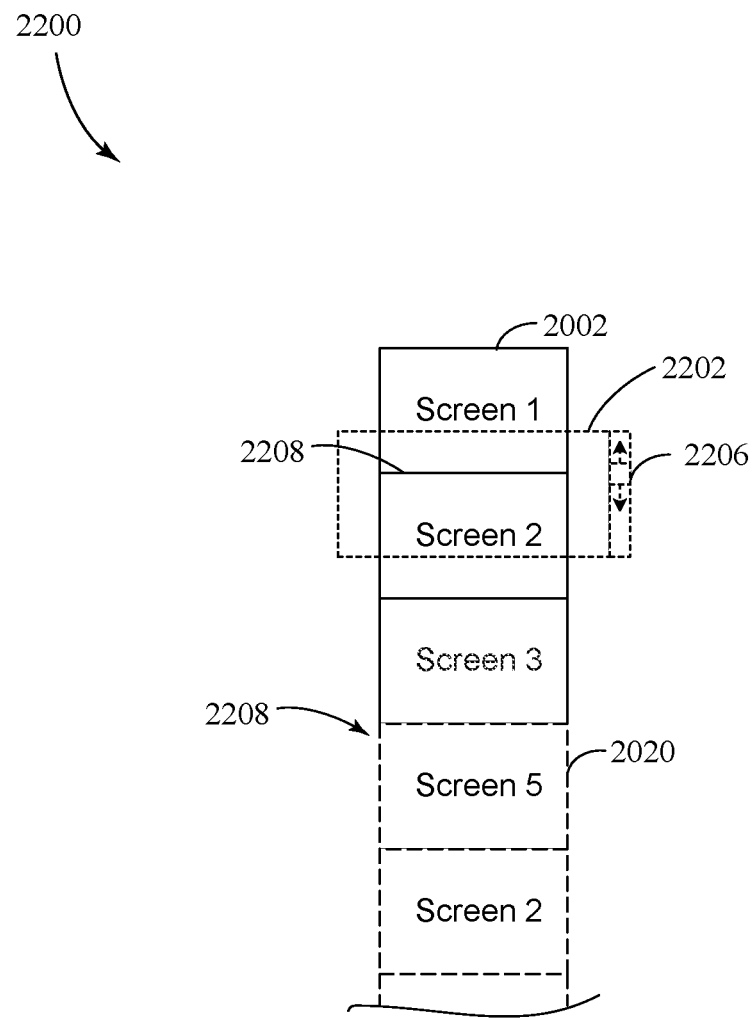
FIG. 22 is a schematic diagram conceptually illustrating an example presentation of screens displaying in the example stitched screen configuration defined in FIG. 20, in accordance with various aspects of the techniques described in this disclosure.
Figure 23:
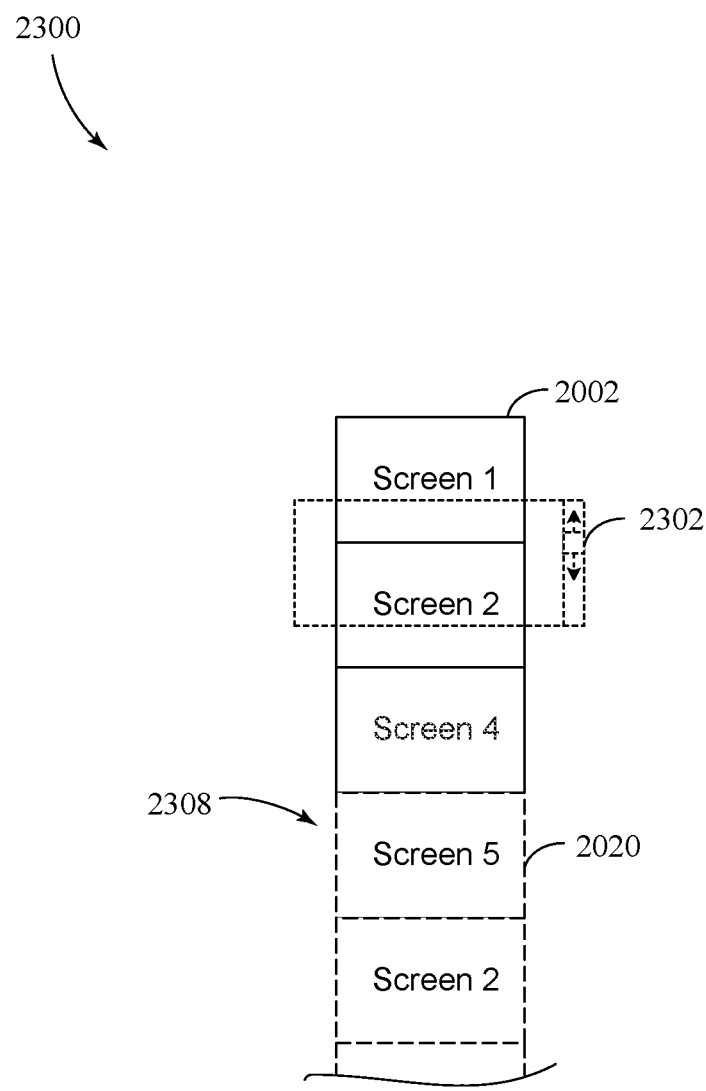
FIG. 23 is a schematic diagram conceptually illustrating another example presentation of screens displaying in the example stitched screen configuration defined in FIG. 20, in accordance with various aspects of the techniques described in this disclosure.

FIG. 22 is a schematic diagram conceptually illustrating an example presentation of screens of a lesson, displaying an example stitched screen configuration defined in FIG. 20, in accordance with various aspects of the techniques described in this disclosure. In FIG. 22, a GUI portion 2200 may include one or more of: a set of screens 2202A-N, a viewing window 2204, a scroll bar 2206, and/or a stitch 2208. FIG. 23 is a schematic diagram conceptually illustrating another example presentation of screens of a lesson, displaying an example stitched screen configuration defined in FIG. 20, in accordance with various aspects of the techniques described in this disclosure. In FIG. 23, a GUI portion 2300 may include one or more of: a set of screens 2302A-N, a viewing window 2304, a scroll bar 2306, and/or a stitch 2308. As described in further detail below, FIG. 22 illustrates a scenario in which Screen 3 is stitched to and follows Screen 2, whereas FIG. 23 illustrates a scenario in which Screen 4 is stitched to and follows Screen 2. In each case, Screen 5 and Screen 2 in dashed boxes are tentative screens that the server 112 is poised to stitch (e.g., render in a stitched screen configuration) to a previously rendered screen (e.g., Screen 3).

Returning to FIG. 21, at block 2102, a server (e.g., one or more of the server(s) 112, also referred to as the server 112) generates a graphical user interface (GUI) for providing courseware on a client device, the courseware including one or more lesson(s). The GUI generated by the server 112 may include a collection of GUI screens rendered on the client device 106 enabling display of, interaction with, the courseware. Initially, the GUI may include a GUI screen rendered on the client device 106 of the user, where the GUI screen displays icons or representations of one or more lessons of a previously generated learning content. In some examples, the GUI screen may display the icons of the one or more lessons in a similar manner as the lesson plugins 1308 are displayed on the GUI screen 1300 of FIG. 13. In some examples, one or more of the lessons icons displayed on the GUI screen may have been generated and stored in the system 300 using the method described with respect to the flowchart 1900 of FIG. 19 and/or the flowchart 1200 of FIG. 12. As explained further below, the server 112 may update the GUI to ultimately provide a lesson of the courseware rendered on the client device 106, where this lesson includes screens in a stitched screen configuration.

At block 2104, the server 112 may receive a lesson request that identifies a first lesson of the one or more lessons. In such examples, the first lesson may include a set of stitched screens arranged in a stitched screen configuration. Although referred to as "a set of stitched screens," such screens may not yet be stitched. Rather, the "set of stitched screens" may refer to screens that are configured to be stitched (e.g., stitchable screens) when navigating the first lesson. The first lesson may include at least one pathway connection defined between at least two of the screens in the stitched screen configuration, and at least one condition predefined for navigating between the at least two screens along the at least one pathway connection. In an example, the first lesson may include Screens 1 through 5 described with reference to FIGS. 20-23.

At block 2104, the server 112 may receive, via a network (e.g., the network 120) and the GUI referenced in block 2102, the lesson request from a learner user identifying a particular lesson (e.g., the first lesson of FIGS. 20-23). For example, the GUI may include a GUI screen rendered on the client device of the user, where the GUI screen displays icons or representations of one or more lessons of a previously generated learning content. The client device may receive a user selection of one of the lessons, and provide an indication of the lesson selected by the user as the lesson request to the server 112. In some examples, the GUI screen may display the icons of the one or more lessons in a similar manner as the lesson plugins 1308 are displayed on the GUI screen 1300 of FIG. 13. In some examples, the first lesson identified by the lesson request was generated and stored in the system 300 using the method described with respect to the flowchart 1900 of FIG. 19.

At block 2106, the server 112 may cause a display or rendering of at least a first screen of the first lesson. For example, the server 112 may cause at least a viewing window portion of a first screen of the set of stitched screens to display on the GUI of the client device 106. In an example, the viewing window may correspond to a resolution of a viewing or display screen of the client device 106. In an illustrative and non-limiting example, the server 112 may render a viewing window that resembles the viewing window 2204 described with reference to FIG. 22 or 2304 described with reference to FIG. 23. With respect to FIG. 22, for example, the learner user may utilize the viewing window 2204 to view screen 2202A and screen 220B that have been rendered for viewing in the viewing window 2204. For purposes of illustration the flow chart 2100, the screen 2202B ('Screen 2') may be considered the first screen. However, in some examples, other screens may be considered the first screen. For example, as will become apparent from the continued discussion of the flowchart 2100, in the process of displaying and navigating screens in a stitched screen configuration, a screen currently being displayed in the viewing window 2204 may be referred to as a first screen in the flowchart 2100, and the next screen to be stitched may be referred to as a second screen in the flowchart 2100.

At block 2108, the server 112 may receive, via the GUI, user input relative to content on the first screen 2202B (e.g., 'Screen 2') of the set of stitched screens 2202A-N. In an example, the server 112 may receive user input indicative of a learner user interacting with content on the screen 2202B. In an illustrative example, the server 112 may receive user input indicative of the learner user answering a multiple-choice question on the screen 2202B. The user input may alternatively or additionally include a scroll down command (e.g., by dragging down a scroll indicator or selecting a down arrow of the scroll bar 2206).

At block 2110, the server 112 may determine a second (or next) screen of the first lesson based on the user input. In an example, the server 112 may determine the next screen based on the user input according to a first pathway connection between the first screen and the second screen, and the at least one condition. For example, the server 112 may reference pathway connection information for the first lesson and condition definition information for the first lesson to determine what screen follows the first screen or screens currently being displayed in viewing window 2204/2304. The pathway connection information for the first lesson may define the first pathway connection between the first screen and the second screen. The condition definition information may define the at least one condition that is to be satisfied to enable the GUI to proceed along the first pathway connection to display the second screen. In an illustrative and non-limiting example, the server 112 may render Screen 3 (as shown in FIG. 22) or alternatively Screen 4 (as shown in FIG. 23) depending on whether the user input satisfies the condition.

In one example, as the user scrolls down along screen 2202B ('Screen 2') using scroll bar 2206, the server 112 may be triggered upon the viewing window 2204 reaching a certain point (e.g., where the lower portion of the viewing window 2204 is 75% down along the screen 2202B) to execute block 2110 to determine the next screen. In response to this trigger, the server 112 may determine whether the condition associated with each pathway connection from the first screen is satisfied, including determining whether the at least one condition associated with the first pathway connection is satisfied. In response to the server 112 determining that the at least one condition is satisfied, the server 112 selects the screen connected to the first screen by the first pathway connection to be the second screen. With reference to FIG. 20, in the case that user input satisfies the condition associated with pathway connection 2008, screen 2010 ('Screen 3') is selected as the second screen. In the case that the user input satisfies the condition associated with pathway connection 2012, screen 2014 ('Screen 4') is selected as the second screen. In some examples, the condition(s) associated with pathway connections 2008 and 2012 are assessments and the user input are user responses or answers to the assessments. As an example, when the user input indicates a correct answer to a question, the condition of the pathway connection 2008 may be satisfied, whereas when the user input indicates an incorrect answer to the question, the condition of the pathway connection 2012 may be satisfied.

At block 2112, the server 112 may cause a rendering of the second screen stitched to the first screen in response to a scroll request. In some examples, the server 112 may cause a rendering of Screen 3 (as shown in FIG. 22) or alternatively Screen 4 (as shown in FIG. 23) as the second screen stitched to the first screen ('Screen 2') in response to the scroll request. In an example, a learner user may utilize the scroll bar 2206 to move the viewing window over the set of screens, moving from one screen to a next screen. Accordingly, in response to an interaction detected via the scroll bar 2206 (e.g., indicative of a scroll request), the server 112 may render a next screen in a background instance, such that the next screen may be ready to display on the client device 106.

As shown in FIG. 22, the Screen 2 and Screen 3 are stitched together in that the bottom border of Screen 2 abuts the top border of Screen 3 such that downward scrolling through the screens will appear continuous to a user on the GUI at the client device 106. Similarly, as shown in FIG. 23, the Screen 2 and Screen 4 are stitched together in that the bottom border of Screen 2 abuts the top border of Screen 4. Although FIGS. 22 and 23 illustrate vertical scrolling from top to bottom, in some embodiments of the flowchart 2100, vertical scrolling may occur from bottom to top. Additionally, in some embodiments of the flowchart 2100, the scrolling is horizontal from left to right, or from right to left, such that stitched screens are stitched at left and right abutting boundaries. Additionally, in some embodiments, scrolling occurs in other directions or along other axes. Further, in some embodiments, the edges of screens are non-linear but abutting edges of stitched screens complement one another to form a continuous scrolling experience. Further, in some embodiments, the edges of screens are non-linear and do not complement one another. In such embodiments, the server 112 may render filler or padding content when stitched such edges of screens together to form a continuous scrolling experience.

After rendering the second screen (e.g., 'Screen 3' in FIG. 22), in some embodiments, the server 112 may loop back to execute block 2108 and may consider now consider the second screen ('Screen 3') currently being displayed as the "first screen." Thus, the server 112 may determine the next screen in block 2110 to follow and be stitched to 'Screen 3.' In the case of the example in FIG. 22, this next screen would be screen 2202D (e.g., 'Screen 5'). The server 112 may then cause a rendering of this next screen (e.g., 'Screen 5'). The server 112 may continue to loop back to block 2108 to continue scrolling through and stitching the screens of the first lesson. Accordingly, the screens of the first lesson that are in the stitched screen configuration may be scrolled through in a continue manner, with screens being stitched in real-time as the client device 106 receives scrolling input (e.g., via the scroll bar 2206/2306).

In some examples, a pathway connection between two screens of the first lesson do not include an associated condition. Rather, for example, with reference to FIG. 22, when Screen 1 is being displayed and connected by a single pathway connection to Screen 2, Screen 2 may always be determined as the next screen that is stitched to the bottom of Screen 1 without regard to evaluation of a condition. However, in other examples, a condition is associated with the pathway connection between Screen 1 and Screen 2. In the case that the server 112 determines the condition to not be satisfied, the server 112 may prevent scrolling down below Screen 1 (e.g., until the condition is satisfied).

Figure 24:
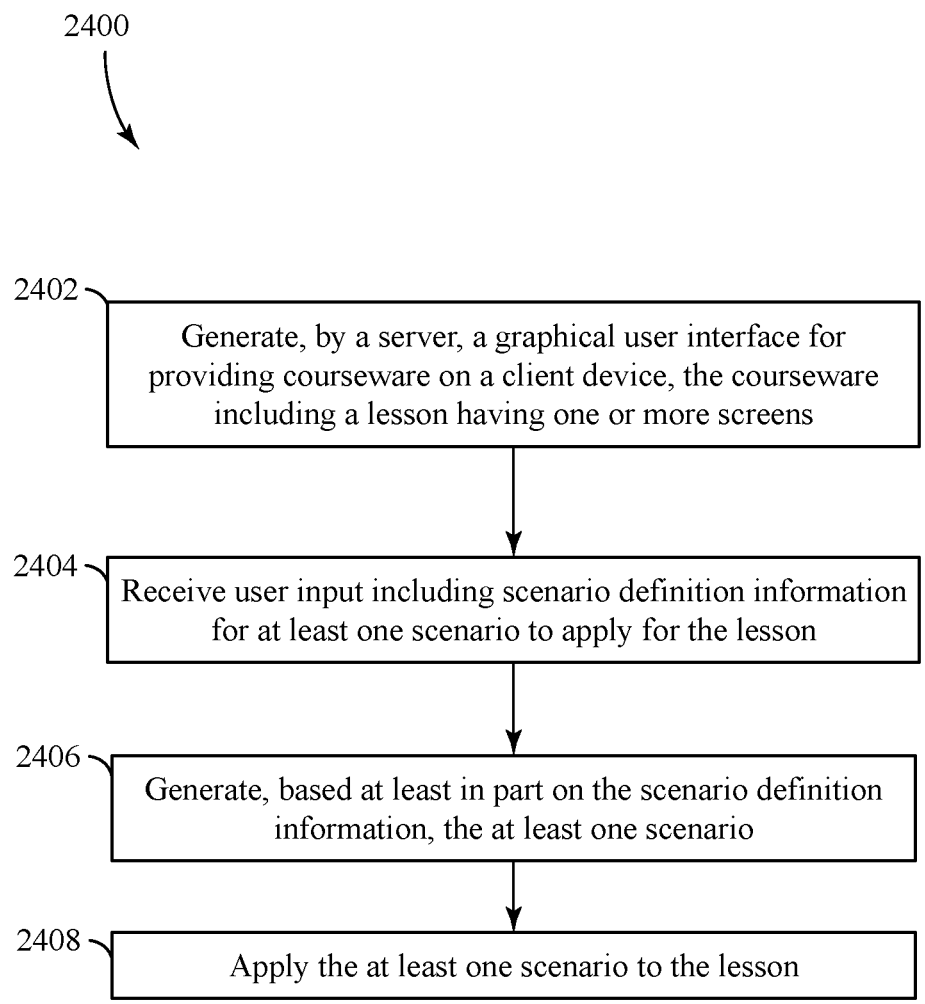
FIG. 24 is a flowchart illustrating an example method and technique for defining scenarios for the learning course content, in accordance with various aspects of the techniques described in this disclosure.

FIG. 24 is a flowchart 2400 illustrating an example method and technique for defining scenarios for the learning course content, in accordance with various aspects of the techniques described in this disclosure. In some examples, the process 2400 may be carried out by the server(s) 112 illustrated in FIG. 3, e.g., employing circuitry and/or software configured according to the block diagram illustrated in FIG. 2. In some examples, the process 2400 may be carried out by any suitable apparatus or means for carrying out the functions or algorithm described below. Although described with respect to the content management system 300 and particular GUI screens, in some examples, other systems and/or GUI screens are used to implement the flowchart 2400. Additionally, although the blocks of the flowchart 2400 are presented in a sequential manner, in some examples, one or more of the blocks may be performed in a different order than presented, in parallel with another block, or bypassed. The flowchart 2400, for illustration purposes, is described with reference to the GUI screens described with reference to FIGS. 25-29.

At block 2402, a server (e.g., one or more server(s) 112, also referred to as the server 112) may generate a graphical user interface (GUI) for providing courseware on a client device 106. In an example, the courseware may include a lesson and the lesson may include one or more screens. In such instances, the server 112 may generate the GUI for the GUI to display the lesson and the one or more screens of the lesson on a client device 106.

At block 2404, the server 112 may receive user input including scenario definition information for at least one scenario to apply for the lesson. In some examples, the server 112 may elicit scenario definition information, as shown in FIGS. 25-29, where the scenario definition information may include conditions and/or actions the server 112 may monitor and/or perform to apply a given scenario to the lesson.

Figure 25:
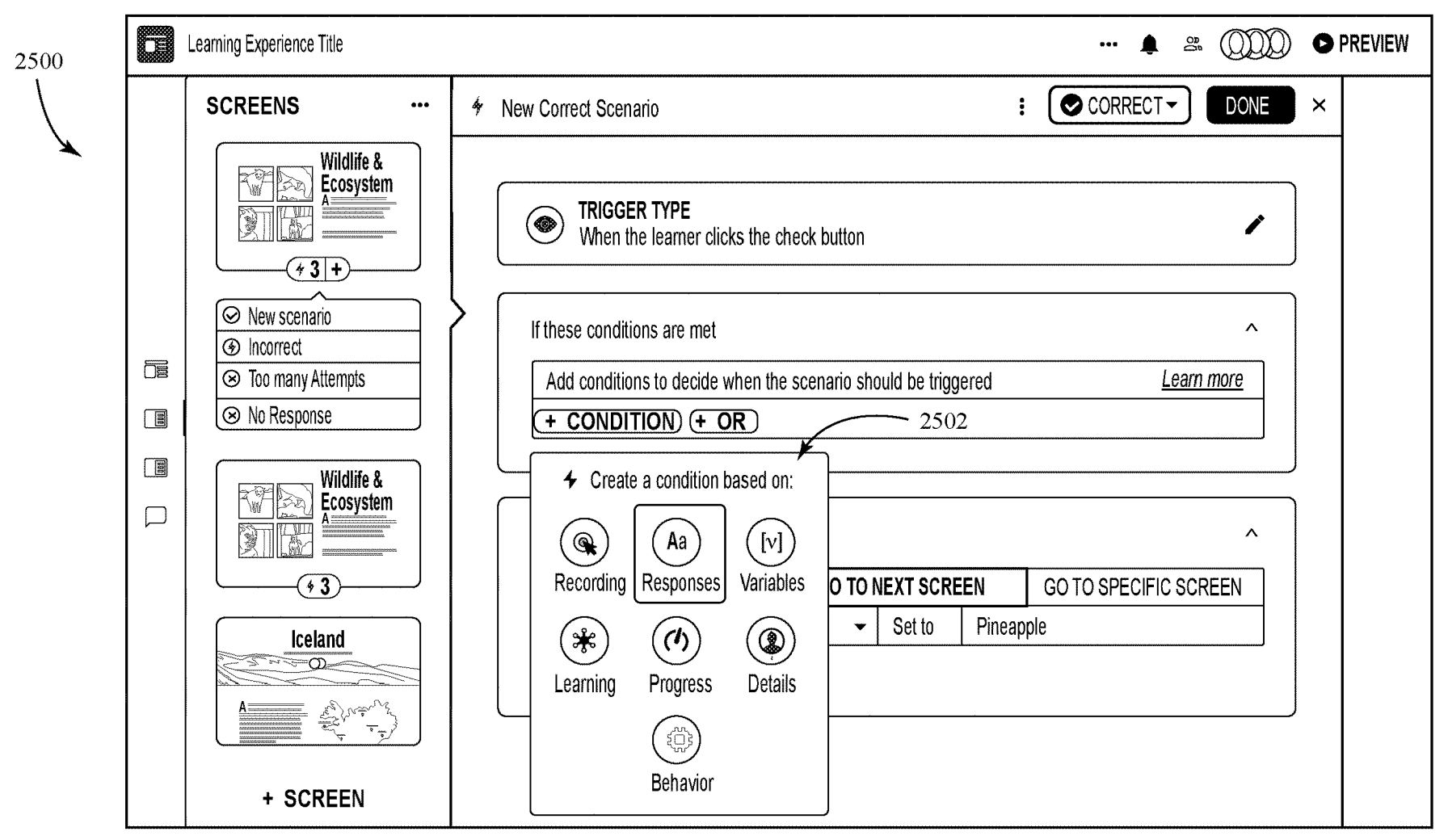
Figure 26:
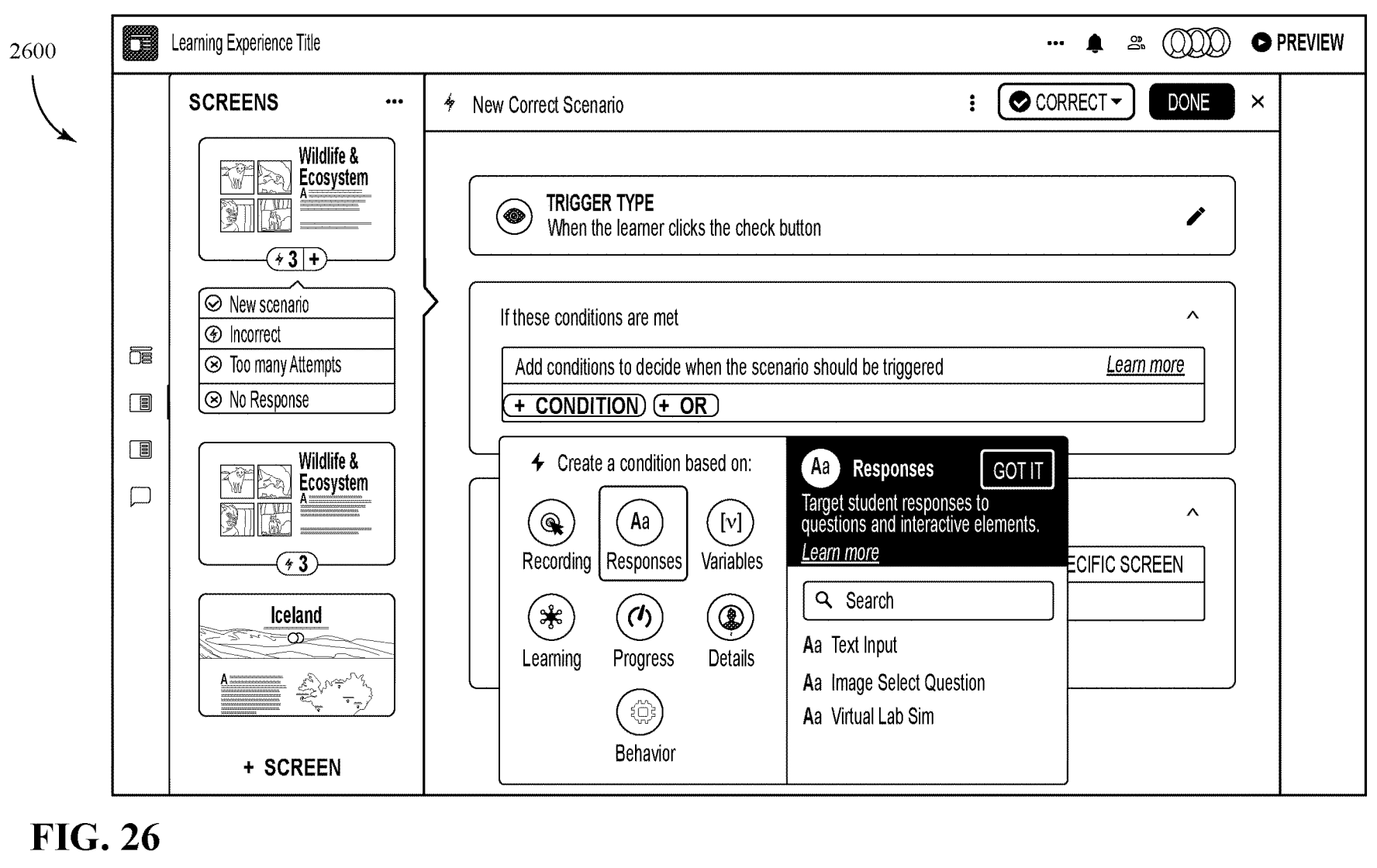
Figure 27:
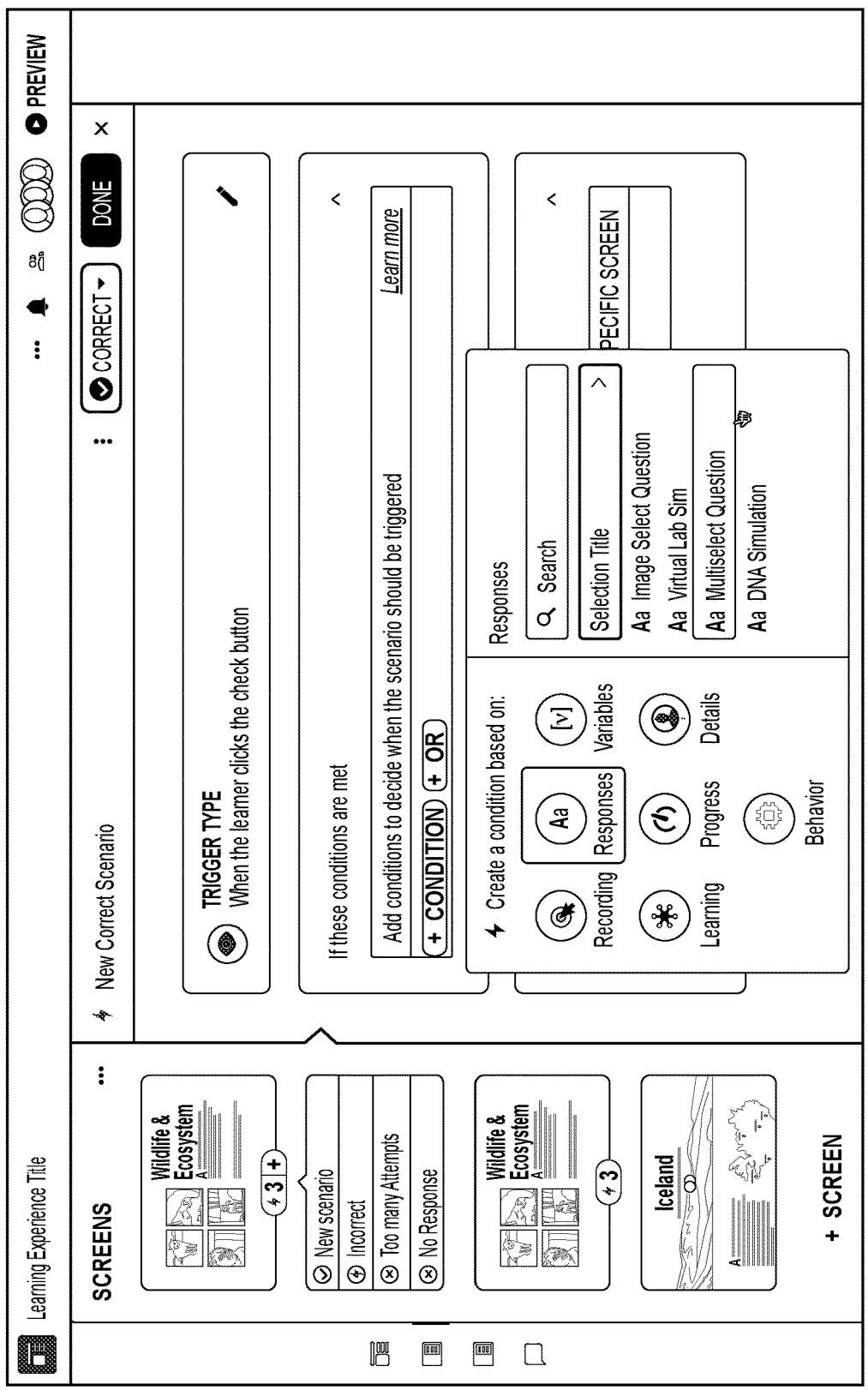
FIG. 27 is a schematic diagram conceptually illustrating an example GUI screen for defining actions for an example scenario, in accordance with various aspects of the techniques described in this disclosure.

FIG. 25 is a schematic diagram conceptually illustrating an example GUI screen 2500 for defining conditions for an example scenario, in accordance with various aspects of the techniques described in this disclosure. The GUI screen 2500, as well as the GUI screens of FIGS. 26-29, may generally be part of a content editor interface of the GUI enabling the client device 106, based on user input, to indicate to the server 112 to add, modifying, and/or remove content and/or scenarios to a screen of a lesson. In some examples, the server 112 may generate a GUI screen 2500 that provides a list of condition types 2502 for the content creator to select as user input. The GUI screen 2500 may be generated by the server 112 in response to receiving of a user indication to add a scenario to the screen of the lesson. The server 112 may present the list of condition types 2502 on the GUI screen 2500 in response to receiving an indication to add a condition (e.g., by selecting a soft "+condition" button on the GUI screen 2500). The list of conditions types 2502 may include conditions based on progress, behavior, responses, etc. In the next GUI screen 2600, the server 112 receives the user input selecting a condition type for the scenario (e.g., via selection of a condition on the list of condition types 2502). In an example, the server 112 may specify the condition is based on a learner user's response to questions and/or interactive elements in the lesson. FIG. 26 is a schematic diagram conceptually illustrating an example GUI screen 2600 for defining conditions for the example scenario, in accordance with various aspects of the techniques described in this disclosure. In the next GUI screen 2700, the server 112 receives the user input selecting a particular condition for the scenario. In an illustrative and non-limiting example, the server 112 may specify the condition is based on a learner user's response to multiselect questions. FIG. 27 is a schematic diagram conceptually illustrating an example GUI screen for defining actions for an example scenario, in accordance with various aspects of the techniques described in this disclosure.

Figure 28:
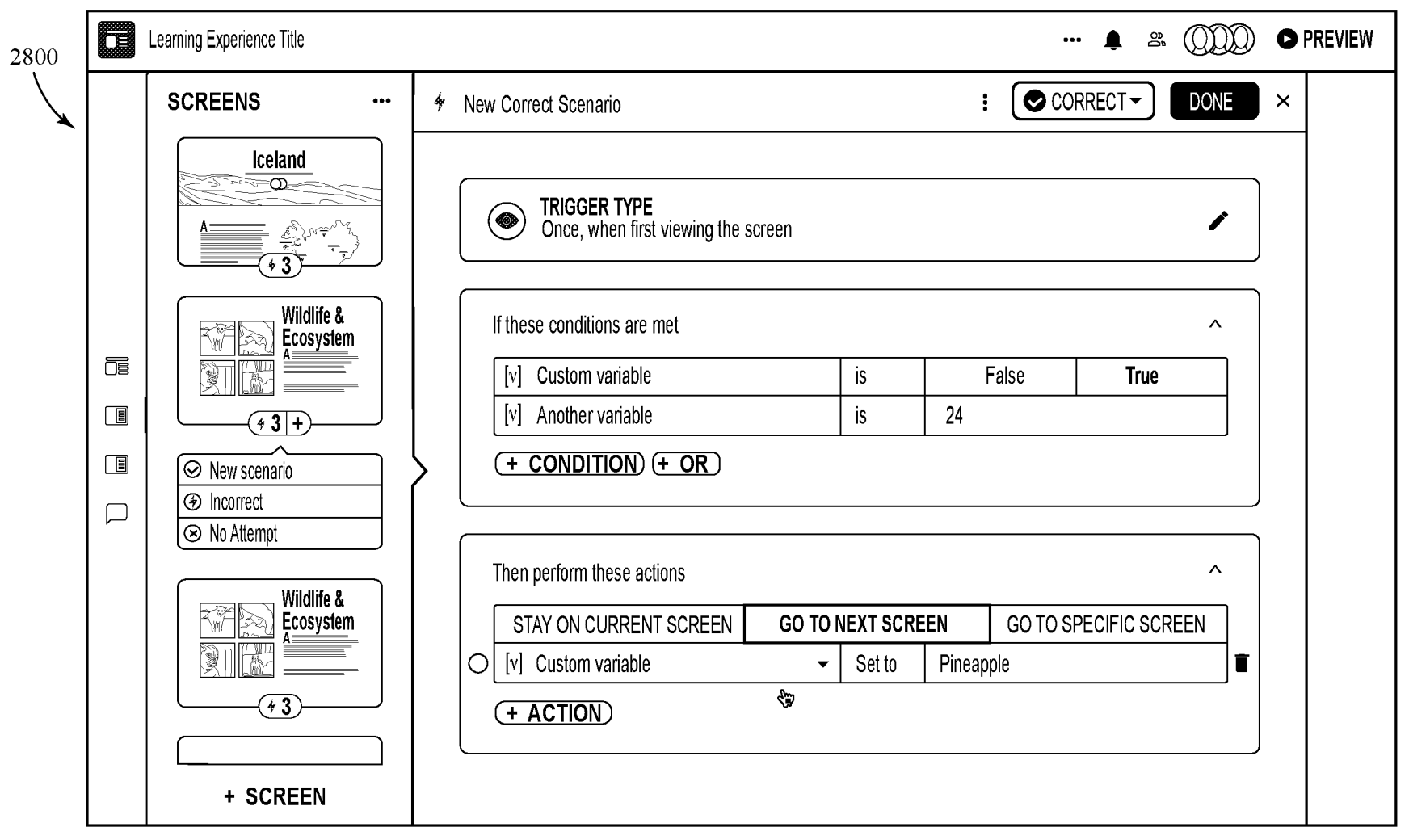
Figure 29:
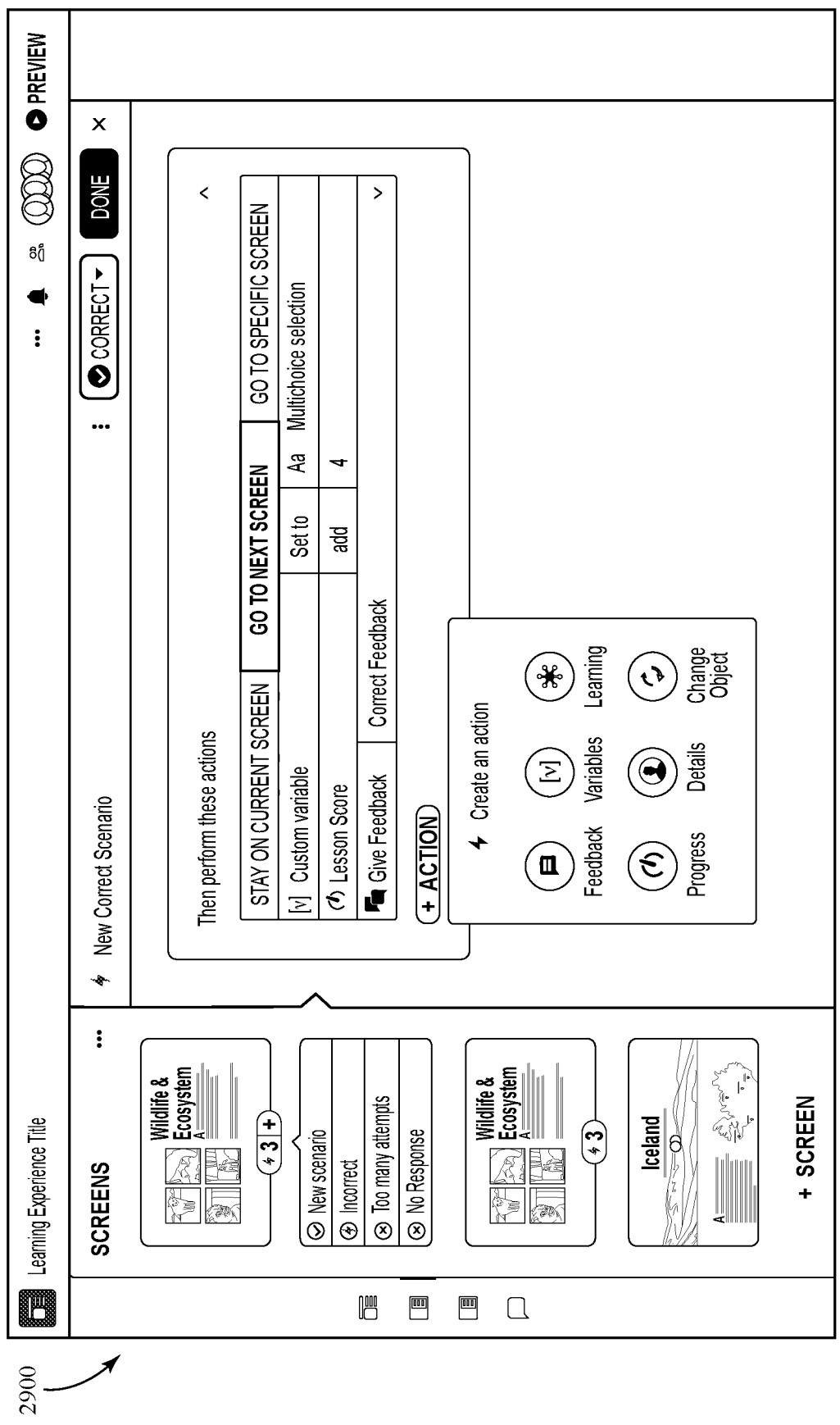
FIG. 29 is a schematic diagram conceptually illustrating an example GUI screen for defining conditions for an example scenario, in accordance with various aspects of the techniques described in this disclosure.

In addition, or alternatively, the server 112 may generate a GUI screen to elicit user input regarding an action. In an example, the GUI screen may resemble the GUI screen 2800 of FIG. 28. In such examples, the scenario definition information may include an action, such as an action for the server 112 to take when the condition is satisfied. In an example, the scenario definition information may include an action to advance to a particular screen, such as the next screen in a set of screens. Accordingly, in such examples, the scenario definition information may both define a pathway connection between screens (e.g., from the current screen to the particular screen specified) and a condition for that pathway connection (e.g., the condition evaluated to determine whether to proceed to the particular screen specified). Accordingly, defining a scenario, as described herein, may be used to define path connection information and condition definition information as described above (e.g., with respect to blocks 1208 and 1220 of FIG. 12). FIG. 28 is a schematic diagram conceptually illustrating an example GUI screen for defining actions for the example scenario, in accordance with various aspects of the techniques described in this disclosure. In another example, the server 112 may generate a GUI screen that resembles the GUI screen 2900 of FIG. 29. In such examples, the server 112 may receive user input defining an action for the scenario. In an illustrative example, the action may include action to change an object on a screen. In an illustrative and non-limiting example, a particular condition of the scenario may trigger a content component on a screen, such as an audio player, to change to another content component, such as a video player. In another illustrative example, the action may include the server 112 providing feedback for a lesson screen via the client device, e.g., in the form of text on the lesson screen, audio, or video. FIG. 29 is a schematic diagram conceptually illustrating an example GUI screen for defining conditions for an example scenario, in accordance with various aspects of the techniques described in this disclosure. As illustrated in FIGS. 24-28, a particular scenario definition may include one condition that is associated with multiple actions (e.g., that the server 112 executes when the condition is satisfied), multiple conditions (e.g., logically OR-ed or AND-ed together) that are associated with one action, or multiple conditions that are associated with multiple actions.

At block 2406, the server 112 may generate, based at least in part on the scenario definition information, the at least one scenario. In an example, generating the at least one scenario may include storing the defined scenario in association with the lesson and, in particular, a screen of the lesson during which the scenario is to be executed. Generating the at least one scenario may further include setting a scenario indicator or parameter of the lesson (or a screen thereof) to indicate the server 112 is to apply the scenario to perform an action responsive to a learner user that satisfies, or a class of learner users that satisfy, one or more predefined conditions.

At block 2408, the server 112 may apply the at least one scenario to the lesson. In an example, when the server 112 presents the lesson to a client device 106, the server 112 may monitor for a learner user of the client device 106 to satisfy the one or more conditions of the at least one scenario. When the learner user satisfies the one or more conditions of the at least one scenario, the server 112 may perform one or more actions defined for each scenario having a satisfied condition or conditions. In this way, the server 112 may apply the at least one scenario to the lesson. As can be understood from the discussion above, the method of FIG. 24 can enable a content creator with little or no programming experience to create and define scenarios, some of which that may have complex set of conditions and actions. Further, the method of FIG. 24 can simplify the creation and definition of complex conditions and actions even for those content creators with significant programming experience. Such advantages can result, for example, from intuitive graphical user interfaces, such as those described with respect to FIGS. 25-29.

Storyboard View

Figure 30:
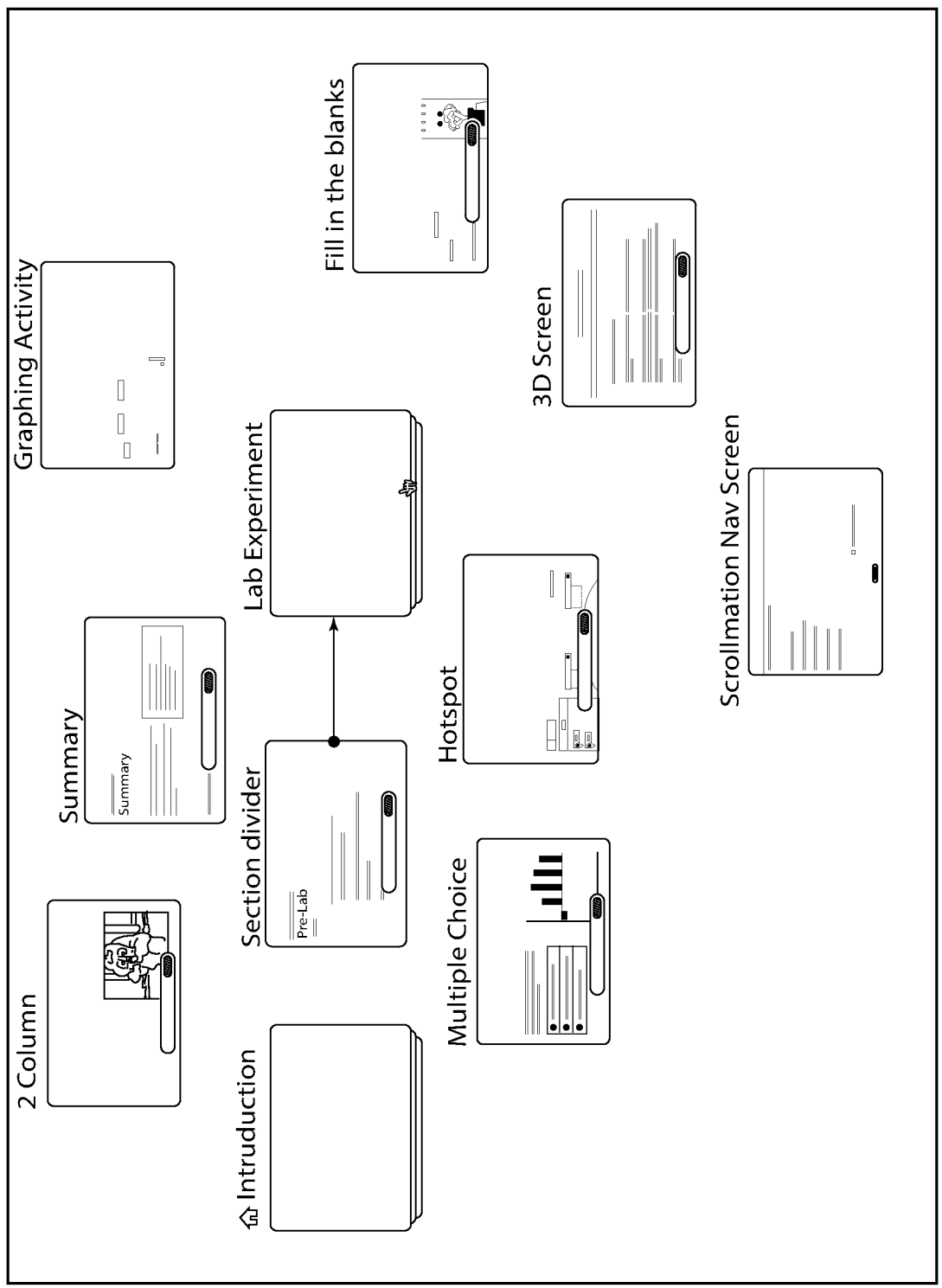
FIG. 30 is a schematic diagram conceptually illustrating an example GUI screen for defining pathway connections between courseware elements, in accordance with various aspects of the techniques described in this disclosure.

FIG. 30 is a schematic diagram conceptually illustrating an example GUI screen for defining and/or visualizing pathway connections between courseware elements, in accordance with various aspects of the techniques described in this disclosure. In some examples, a server (e.g., server 112) may generate, for display on a client device 106, a storyboard rendering 3000. In an example, the storyboard rendering 3000 graphically illustrates a subset of screen plugins and the one or more pathway connections between the subset of screen plugins. In an example, the subset of screen plugins corresponds to a subset of screens. In such examples, the storyboard rendering 3000 may illustrate pathway connections between screens in a graphical illustration. In response to receiving a user selection of a particular screen on the storyboard rendering 3000, the server 112 may proceed to generate a GUI screen such as shown in FIG. 16, 18, 25, 26, 27, 28, or 29 to enable editing or defining of the selected screen. As described above, pathway connections may be defined or modified (e.g., by defining or modifying one or more scenarios) for a screen. Accordingly, after such pathway connection(s) are defined or modified, the server 112 may display an updated version of the storyboard rendering 3000 that includes the additional or modified pathway connection(s).

Figure 31:
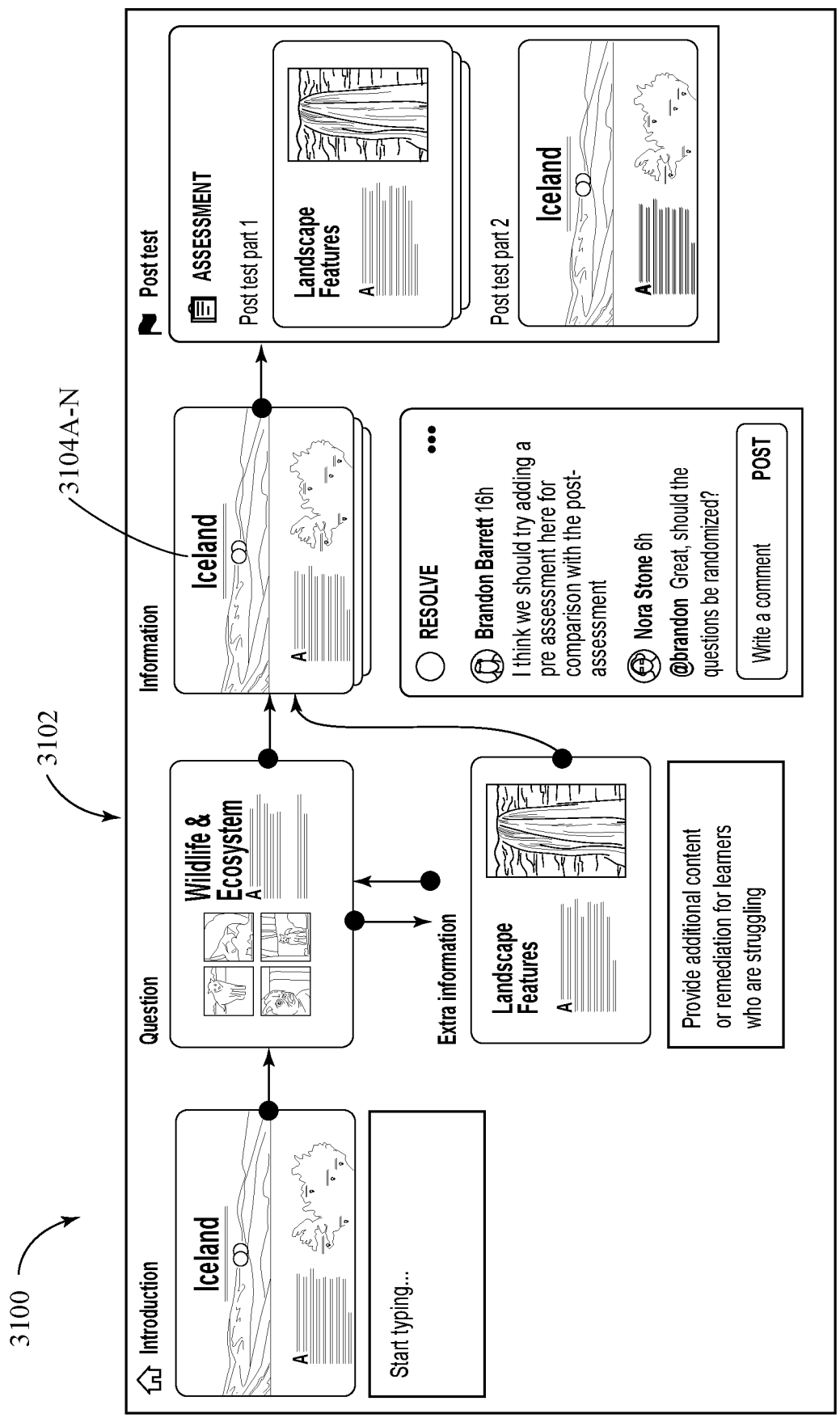
FIG. 31 is a schematic diagram conceptually illustrating an example GUI screen for visualizing pathway connections between courseware elements, in accordance with various aspects of the techniques described in this disclosure.

FIG. 31 is a schematic diagram conceptually illustrating an example GUI screen for visualizing pathway connections between courseware elements, in accordance with various aspects of the techniques described in this disclosure. In an example, FIG. 31 is a schematic diagram of another storyboard rendering 3100. In the storyboard rendering 3100, a set of pathway connections are shown between sets of screens (e.g., between screen 3102 and screens 3104A-N, etc.). In an example, the storyboard rendering 3100 may provide an optional viewing experience for content creator, in that the content creator may not utilize the storyboard rendering 3100 to visualize the screens of a lesson and the pathway connections between screens of the lesson. The storyboard rendering 3100 provides a visual representation reflecting the learning course content generated based on the specific input of the content creator (e.g., the content definition information, the pathway connection information, the selection of the screen plugins, etc.). Additionally, as illustrated in FIG. 31, a content creator and/or collaborating content creators can add notes within the storyboard rendering 3100. The notes may include, for example, a posted textual note or, conversation-style notes allowing postings and replies between collaborators.

Figure 32:
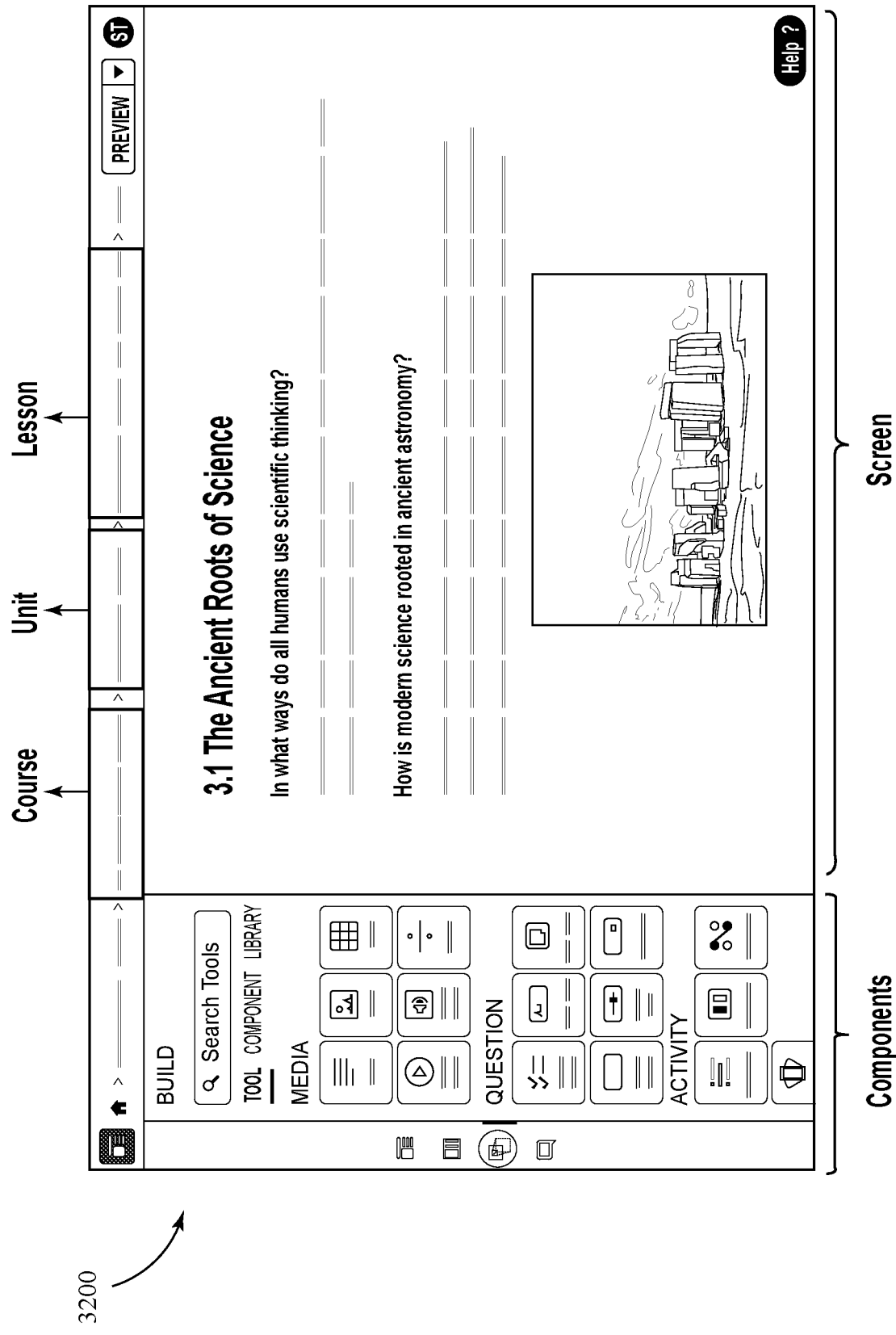
FIG. 32 is a schematic diagram conceptually illustrating an example GUI screen including lesson content predefined via the example GUI of any one or more of FIGS. 6-20, 24-31, 35, and/or 36, in accordance with various aspects of the techniques described in this disclosure.
Figure 33:
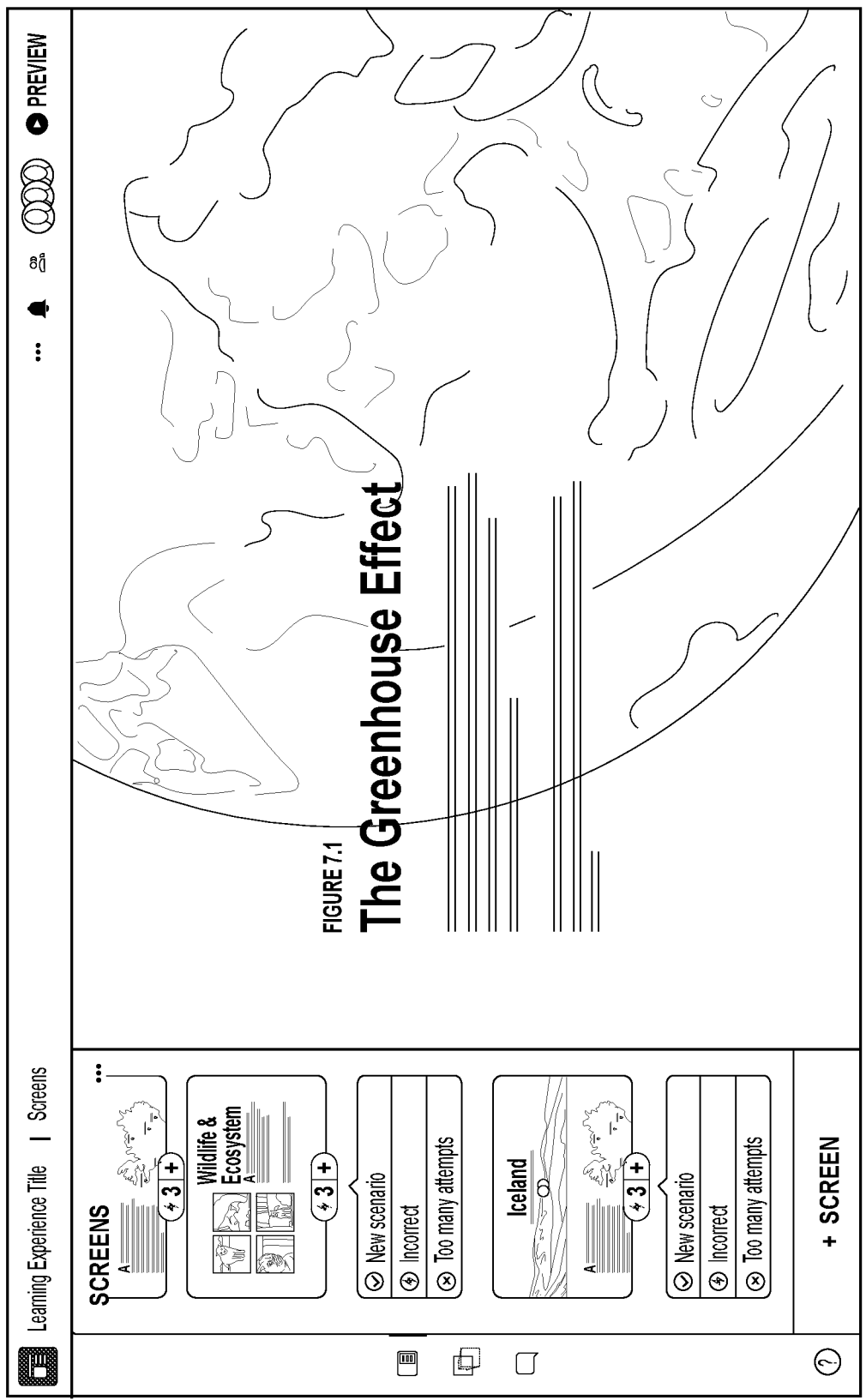
FIG. 33 is a schematic diagram conceptually illustrating an example GUI screen including lesson content predefined via the example GUI of any one or more of FIGS. 6-20, 24-31, 35, and/or 36, in accordance with various aspects of the techniques described in this disclosure.

FIG. 32 is a schematic diagram conceptually illustrating an example GUI screen including lesson content predefined via the example GUI of any one or more of FIGS. 6-20, 24-31, 35, and/or 36, in accordance with various aspects of the techniques described in this disclosure. FIG. 32 represents a GUI 3200 that the server 112 may generate for display on the client device 106 of a content creator user. The GUI 3200 may be part of a WYSIWYG editing interface and includes a screen that is presented in the same or similar manner as would be viewed by a learner user on a client device 106. FIG. 33 provides another example of a GUI 3300 the server 112 may generate for display on the client device 106 of a content creator user. In an example, the GUI 3300 may represent a cover screen as the screen in a particular viewing window of the GUI 3300. FIG. 33 is a schematic diagram conceptually illustrating an example GUI screen including lesson content predefined via the example GUI of any one or more of FIGS. 6-20, 24-31, 35, and/or 36, in accordance with various aspects of the techniques described in this disclosure. The GUI 3300 may be part of a WYSIWYG editing interface and the cover screen is presented in the same or similar manner as would be viewed by a learner user on a client device 106. FIG. 34 is yet another example of a screen 3400 that takes the form of a procedure screen type in this illustrative example. FIG. 34 is a schematic diagram conceptually illustrating an example GUI screen of lesson content in an example procedure screen context predefined via the example GUI of any one or more of FIGS. 6-20, 24-31, 35, and/or 36, in accordance with various aspects of the techniques described in this disclosure. FIG. 34 represents a GUI 3400 that the server 112 may generate for display on the client device 106 of a learner user.

The content management system 300 may further be extensible to receive or present data from emerging technologies, such as extended reality (XR) systems (e.g., augmented reality (AR), virtual reality (VR), mixed reality (MR), etc.). In an example, the content management system 300 could receive and aggregate data via these alternative methods. In some examples, the content management system 300 may provide this data as feedback to those systems (e.g., an XR system).

In some examples, a non-traditional learner user could, as non-limiting examples, participate in environment-driven courses based on triggers associated with the learner user's surroundings. In an illustrative and non-limiting example involving a biology course, a student may be outside hiking in a forest environment. The content management system 300 may receive user input related to the environment in which the learner user is hiking. In an illustrative and non-limiting example, the user input may include temperature, humidity, ecosystem, and/or other such data items. In an example, the content management system 300 may receive such user input via various device sensors (e.g., temperature sensors, geolocation sensors, etc.) and/or via manual input, such as through a keypad user entry. In another example, the content management system 300 may determine information related to the environment from an external source (e.g., via communication network(s) 120. In response, the content management system 300 may deliver content pertinent to the particular environment in which the learner user is in.

In some examples, the content management system 300 may further implement additional 3D and/or extended reality (XR) solutions (e.g., augmented reality (AR) solutions) that utilize gamification to further encourage user interaction, so that the application goes beyond, for example, web-based plugins and web-based experience. In some examples, the application may be further extensible, including any combination of a web-based experience, a mobile app, an XR experience, and the like, all within the same course, application, or architecture.

In short, the content management system 300 may be technology agnostic, as in the examples above, as long as there is a way to input data into the content management system 300, and as long as the content management system 300 can utilize the input data to identify conditions (e.g., triggering and/or tripping conditions) that result in the generation or creation of a customized pathway through the application.

Figure 35:
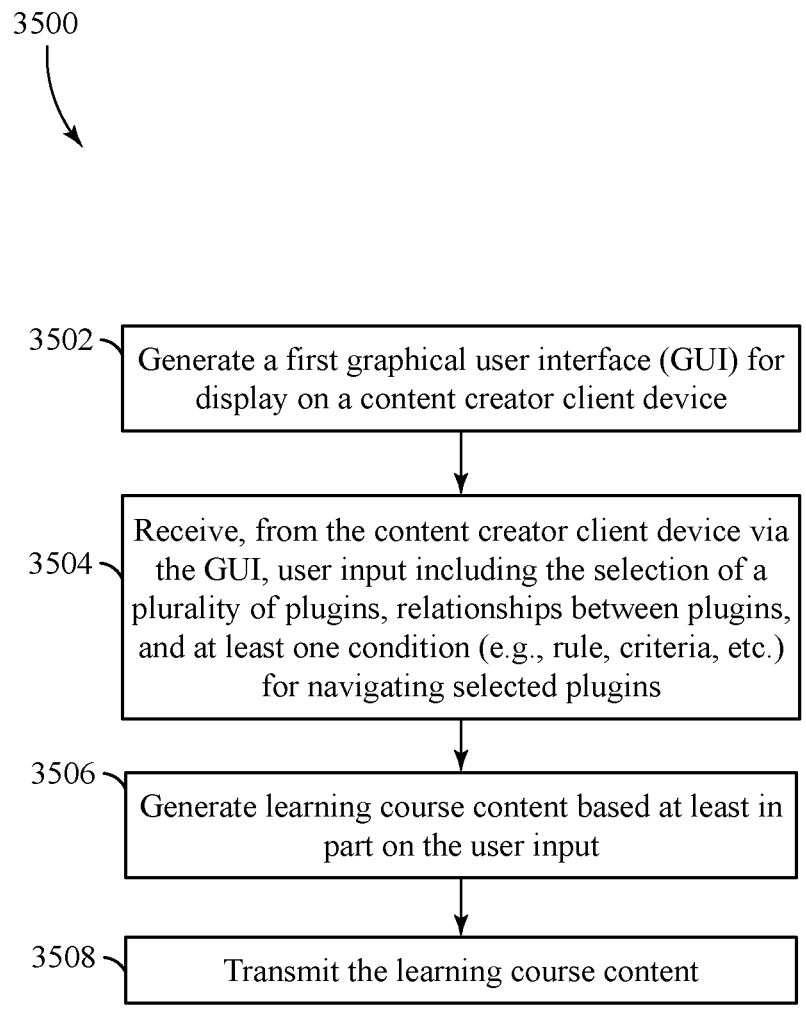
FIG. 35 is a flowchart illustrating an example method and technique for generating learning course content, in accordance with various aspects of the techniques described in this disclosure.

FIG. 35 is a flowchart 3500 illustrating an example method and technique for generating learning course content, in accordance with various aspects of the techniques described in this disclosure. In some examples, the process 3500 may be carried out by the server(s) 112 illustrated in FIG. 3, e.g., employing circuitry and/or software configured according to the block diagram illustrated in FIG. 2. In some examples, the process 3500 may be carried out by any suitable apparatus or means for carrying out the functions or algorithm described below. Although described with respect to the content management system 300 and particular GUI screens, in some examples, other systems and/or GUI screens are used to implement the flowchart 3500. Additionally, although the blocks of the flowchart 3500 are presented in a sequential manner, in some examples, one or more of the blocks may be performed in a different order than presented, in parallel with another block, or bypassed. The flowchart 3500, for illustration purposes, is described with reference to the GUI screen described with reference to FIG. 36.

Figure 36:
FIG. 36 illustrates a non-limiting example of a GUI for providing the disclosed plugin system and pathway architecture, in accordance with various aspects of the techniques described in this disclosure.

At block 3502, a server (e.g., one or more server(s) 112, also referred to as the server 112) may generate a first graphical user interface (GUI) 3600 for display on a content creator client device. In an example, the GUI 3600 of FIG. 36 may include various fields and/or dropdown menus for eliciting user input. FIG. 36 illustrates a non-limiting example of a GUI for providing the disclosed plugin system and pathway architecture, in accordance with various aspects of the techniques described in this disclosure.

At block 3504, the server 112 may receive, from the content creator client device via the GUI 3600, user input from a client device 106. In an example, the user input may include a selection of a plurality of plugins, relationships between plugins, and at least one condition (e.g., rule, criteria, etc.) for navigating selected plugins (e.g., navigating lessons, navigating screens of a lesson, etc.). The GUI 3600 includes GUI elements that allow for and elicit the selection of plugin(s), definition of relationship(s), and definition of condition(s) by a user of the client device 106. The client device 106 may provide the selection(s) and definitions received via the GUI 3600 to the server 112.

The selected plurality of plugins may be, for example, a subset of plugins from the plugins catalog of the database 110. The plurality of plugins may include one or more of a plurality of unit plugins, a plurality of lesson plugins, a plurality of screen plugins, and/or a plurality of component plugins, as described herein. The relationships between plugins may be or include, for example, pathway connections. Accordingly, each relationship of the user input may define a pathway connection between two plugins (e.g., between two unit plugins, between two lesson plugins, between two screen plugins, or between two component plugins). The at least one condition may include one or more conditions, with each condition associated with a relationship (or pathway connection). Similar to the discussion with respect to FIG. 24, during presentation of a lesson or other courseware portion, in response to a condition being satisfied (e.g., based on user input during presentation of a lesson) for a relationship connecting a current plugin and a next plugin, the server 112 may proceed from the current plugin to the next plugin.

At block 3506, the server 112 may generate learning course content based at least in part on the user input. In an example, the server 112 may utilize the user input, including the selection of a plurality of plugins, relationships between plugins (e.g., connection pathways between screens), and the at least one condition (e.g., rule, criteria, etc.) for navigating the selected plugins, to generate the learning course content for a learning application (e.g., for a course, for a group of learner users in a class, etc.). In some examples, generating the learning course content includes the server 112 storing the learning course content, as defined based on the user input received in block 3504, in a memory as one or more files.

At block 3508, the server 112 may transmit the learning course content. In an example, the server 112 may transmit the learning course content to the client device 106 over a network (e.g., the network 120). The client device 106 may receive the learning course content and display the learning course content on a display. In some examples, the client device 106 may be operated by a learner user and the server 112 may be presenting the learning course content to the learner in an educational context. In some examples, the client device 106 may be operated by a content creator user and the server 112 may be providing the learning course content in real-time as a content creator is editing the learning course content in a WYSIWYG editor.

Further Examples Having a Variety of Features:

The disclosure may be further understood by way of the following examples:

Example 1: A system including: a database storing: a plurality of content plugins; a server including a computing device coupled to the network and including at least one processor executing instructions within a memory which, when executed, cause the system to: generate a first graphical user interface (GUI) for display on a content creator client device coupled to the network, the first GUI including: a first at least one GUI component for selecting a subset of the plurality of plugins, a second at least one GUI component for defining a relationship between the plurality of plugins within the subset of the plurality of plugins, and a third at least one GUI component for defining a custom pathway through the subset of the plurality of plugins, including at least one rule or condition for navigating the subset of the plurality of plugins; receive, from the content creator client device, user input including the selection of the subset of the plurality of plugins, the relationship, and the at least one rule or condition; generate, from the subset of the plurality of plugins, the relationships, and the at least one rule or condition, a learning course content for a learning application; and transmit the learning course content to at least one client device for display.

Example 2: A system according to Example 1, wherein the instructions, when executed, further cause the system to: store, in the database, a plurality of user profile data; select a user profile in the plurality of user profile data; and update the at least one rule or condition according to the user profile.

Example 3: A system according to any of Examples 1 or 2, wherein the instructions, when executed, further cause the system to: determine, from the at least one rule or condition and a relationship between at least one plugin in the subset of the plurality of plugins, a next course content to be displayed on a second GUI; and transmit the second GUI to a learner client device (e.g., a client device corresponding to a particular learner user) associated with the user profile.

Example 4: A method including: storing in a database coupled to a network, by a server including a computing device coupled to the network and including at least one processor executing instructions within a memory, a plurality of content plugins; generating, by the server, a first graphical user interface (GUI) for display on a content creator client device coupled to the network, the first GUI including: a first at least one GUI component for selecting a subset of the plurality of plugins, a second at least one GUI component for defining a relationship between the plurality of plugins within the subset of the plurality of plugins, and a third at least one GUI component for defining a custom pathway through the subset of the plurality of plugins, including at least one rule or condition for navigating the subset of the plurality of plugins; receiving, by the server, from the content creator client device, user input including the selection of the subset of the plurality of plugins, the relationship, and the at least one rule or condition; generating, by the server, from the subset of the plurality of plugins, the relationships, and the at least one rule or condition, a learning course content for a learning application; and transmitting the learning course content to at least one client device for display.

Example 5: A method according to Example 4, further including the steps of: storing in the database, by the server, a plurality of user profile data; selecting, by the server, a user profile in the plurality of user profile data; and updating, by the server, the at least one rule or condition according to the user profile.

Example 6: A method according to any of Examples 4 or 5, further including the steps of: determining, by the server, from the at least one rule or condition and a relationship between at least one plugin in the subset of the plurality of plugins, a next course content to be displayed on a second GUI; and transmitting, by the server, the second GUI to a learner client device associated with the user profile.

Other examples and uses of the disclosed technology will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

What is claimed is:

1. A computing system for managing learning content, the system comprising:
   a database configured to store:
      a set of screen plugins, and
   a server comprising a computing device coupled to a communication network and comprising at least one processor executing instructions within a memory which, when executed, cause the system to:
      generate, for display on a client device, a graphical user interface (GUI) comprising a content editor for defining courseware, where the courseware includes a first lesson;
      receive, via the communication network, user input comprising:
         a pathway type selection, via the GUI, selecting a pathway type for the first lesson, the pathway type defining permissible pathway connections between at least two screen plugins of the first lesson;

a selection of screen plugins, from the set of screen plugins, indicating a subset of screen plugins to be added to the first lesson, each screen plugin of the subset of screen plugins including at least one screen;
content definition, via the GUI, defining content on each screen of the subset of screen plugins;
pathway connection information, via the GUI, defining one or more pathway connections between the screens corresponding to the subset of screen plugins in accordance with the pathway type; and
condition definition information, via the GUI, defining at least one condition for navigating the one or more pathway connections between the screens corresponding to the subset of screen plugins;
generate, from the pathway type selection, the selection of screen plugins, the content definition, the pathway connection information, and the condition definition information, a learning course content for a learning application; and
transmit, via the communication network, the learning course content to the client device.

2. The computing system of claim 1, wherein the first lesson is one of a plurality of lessons of a unit or course of the courseware, and wherein the instructions, when executed, cause the system further to:
receive, via the communication network, additional user input comprising:
a second pathway type selection, via the GUI, selecting a second pathway type for a second lesson of the plurality of lessons;
a second selection of screen plugins, via the GUI, indicating a second subset of screen plugins to be added to the second lesson, each screen plugin of the second subset of screen plugins including at least one screen;
second content definition, via the GUI, defining content on each screen of the second set of screen plugins;
second pathway connection information, via the GUI, defining one or more pathway connections between the second subset of screen plugins in accordance with the second pathway type; and
second condition definition information, via the GUI, defining at least one second condition for navigating the one or more pathway connections between the second subset of screen plugins; and
generate, based at least in part on the second pathway type selection, the second selection of screen plugins, the second content definition, the second pathway connection information, and condition definition information, the learning course content for the learning application.

3. The computing system of claim 2, wherein the first pathway type and the second pathway type comprise different pathway types.

4. The computing system of claim 2, wherein the instructions, when executed, cause the system further to:
receive, via the communication network, user input comprising:
a third pathway type selection indicating a third pathway type for the unit or course, the third pathway type defining permissible pathway connections between at least the first lesson and the second lesson.

5. The computing system of claim 4, wherein the instructions, when executed, cause the system further to:
receive, via the communication network, user input comprising:
a selection of the first lesson and the second lesson to include in the learning course content for the learning application; and
generate the learning course content for the learning application, in accordance with each of the first, second, and third pathway type selections, to include at least the first lesson and the second lesson.

6. The computing system of claim 5, wherein the first, second, and third pathway type selections include one or more of a free pathway type, a linear pathway type, a graph pathway type, and a hub and spoke pathway type.

7. The computing system of claim 1, wherein the content definition defines content, for a first screen of the first screen plugin, to include a sub-lesson component, the sub-lesson component including:
a second subset of screen plugins selected from the set of screen plugins,
a second pathway type defining permissible pathway connections between screen plugins of the second subset of screen plugins,
second pathway connection information defining one or more pathway connections between the second subset of screen plugins in accordance with the second pathway type, and
second condition definition information defining at least one condition for navigating the one or more pathway connections between the second subset of screen plugins.

8. The computing system of claim 1, wherein the pathway connection information defines, according to the pathway type, one or more relationships between the subset of screen plugins.

9. The computing system of claim 1, wherein the instructions, when executed, cause the system further to:
determine the pathway type selection represents selection of a graph pathway type for the first lesson;
determine the pathway connection information defines, according to the graph pathway type:
a first pathway connection between a first set of screens corresponding to at least one first screen plugin of the subset of screen plugins and a second set of screens corresponding to at least one second screen plugin of the subset of screen plugins, and
a second pathway connection between the first set of screens to a third set of screens corresponding to at least one third screen plugin of the subset of screen plugins;
determine the condition definition information defines at least one first condition for activating at least one of: the first pathway connection, or the second pathway connection; and
generate the learning course content for the learning application with the first lesson comprising the graph pathway type with the at least one first condition.

10. The computing system of claim 9, wherein the at least one first condition corresponds to an assessment question.

11. The computing system of claim 1, wherein the set of screen plugins in the database includes a stitched screen plugin, and wherein the stitched screen plugin configures a selection of screens in a stitched screen configuration.

12. The computing system of claim 11, wherein the stitched screen configuration configures the selection of screens to be stitched together for continuous scroll through the selection of screens.

13. The computing system of claim 1, wherein the at least one screen includes at least one of:

a stitched screen comprising a plurality of screens having a stitched screen configuration to provide for continuous scroll through the plurality of screens, a standard screen decoupled from scrolling onto other screens along the corresponding pathway connection, or a cover screen configured to introduce one or more portions of the learning course content for the learning application.

14. The computing system of claim 1, wherein the content definition defines content including component plugins for adding to one or more screens of the subset of screens.

15. The computing system of claim 1, wherein the instructions, when executed, cause the system further to:
generate, for display on the client device, a storyboard rendering that graphically illustrates the subset of screen plugins and the one or more pathway connections between the subset of screen plugins.

16. The computing system of claim 1, wherein the GUI comprises a "What You See Is What You Get" (WYSIWYG) content editor.

17. The computing system of claim 1, wherein the instructions, when executed, further cause the system to:
store, in the database, a plurality of user profile data;
select a user profile in the plurality of user profile data; and
update the learning course content according to the user profile.

18. A method for managing learning content, the method comprising:
generating, for display on a client device, a graphical user interface (GUI) comprising a content editor for defining courseware, where the courseware includes a first lesson;
receiving, via a communication network, user input comprising:
a pathway type selection, via the GUI, selecting a pathway type for the first lesson, the pathway type defining permissible pathway connections between at least two screen plugins of the first lesson;
a selection of screen plugins, from a set of screen plugins, indicating a subset of screen plugins to be added to the first lesson, each screen plugin of the subset of screen plugins including at least one screen;
content definition, via the GUI, defining content on each screen of the subset of screen plugins;
pathway connection information, via the GUI, defining one or more pathway connections between the screens corresponding to the subset of screen plugins in accordance with the pathway type; and
condition definition information, via the GUI, defining at least one condition for navigating the one or more pathway connections between the screens corresponding to the subset of screen plugins;
generating, from the pathway type selection, the selection of screen plugins, the content definition, the pathway connection information, and the condition definition information, a learning course content for a learning application; and
transmitting, via the communication network, the learning course content to the client device.

19. The method of claim 18, wherein the first lesson is one of a plurality of lessons of a unit or course of the courseware, wherein the method further comprises:
receiving, via the communication network, additional user input comprising:
a second pathway type selection, via the GUI, selecting a second pathway type for a second lesson of the plurality of lessons;
a second selection of screen plugins, via the GUI, indicating a second subset of screen plugins to be added to the second lesson, each screen plugin of the second subset of screen plugins including at least one screen;
second content definition, via the GUI, defining content on each screen of the second set of screen plugins;
second pathway connection information, via the GUI, defining one or more pathway connections between the second subset of screen plugins in accordance with the second pathway type; and
second condition definition information, via the GUI, defining at least one second condition for navigating the one or more pathway connections between the second subset of screen plugins; and
generating, based at least in part on the second pathway type selection, the second selection of screen plugins, the second content definition, the second pathway connection information, and condition definition information, the learning course content for the learning application.

20. The method of claim 18, wherein the content definition defines content, for a first screen of the first screen plugin, to include a sub-lesson component, the sub-lesson component including:
a second subset of screen plugins selected from the set of screen plugins,
a second pathway type defining permissible pathway connections between screen plugins of the second subset of screen plugins,
second pathway connection information defining one or more pathway connections between the second subset of screen plugins in accordance with the second pathway type, and
second condition definition information defining at least one condition for navigating the one or more pathway connections between the second subset of screen plugins.

21. The method of claim 18, further comprising:
determining the pathway type selection represents selection of a graph pathway type for the first lesson;
determining the pathway connection information defines, according to the graph pathway type:
a first pathway connection between a first set of screens corresponding to at least one first screen plugin of the subset of screen plugins and a second set of screens corresponding to at least one second screen plugin of the subset of screen plugins, and
a second pathway connection between the first set of screens to a third set of screens corresponding to at least one third screen plugin of the subset of screen plugins;
determining the condition definition information defines at least one first condition for activating at least one of: the first pathway connection, or the second pathway connection; and
generating the learning course content for the learning application with the first lesson comprising the graph pathway type with the at least one first condition.

22. The method of claim 18, wherein the at least one screen includes at least one of:
a stitched screen comprising a plurality of screens having a stitched screen configuration to provide for continuous scroll through the plurality of screens, a standard screen decoupled from scrolling onto other screens along the corresponding pathway connection, or a cover screen configured to introduce one or more portions of the learning course content for the learning application.

23. The method of claim 18, further comprising:

generating, for display on the client device, a storyboard rendering that graphically illustrates the subset of screen plugins and the one or more pathway connections between the subset of screen plugins.

\* \* \* \* \*